United States Patent
Eggleton et al.

(10) Patent No.: US 6,768,577 B2
(45) Date of Patent: Jul. 27, 2004

(54) TUNABLE MULTIMODE LASER DIODE MODULE, TUNABLE MULTIMODE WAVELENGTH DIVISION MULTIPLEX RAMAN PUMP, AND AMPLIFIER, AND A SYSTEM, METHOD, AND COMPUTER PROGRAM PRODUCT FOR CONTROLLING TUNABLE MULTIMODE LASER DIODES, RAMAN PUMPS, AND RAMAN AMPLIFIERS

(75) Inventors: Benjamin J. Eggleton, Summit, NJ (US); Paul Steinvurzel, Jersey City, NJ (US); Yoshihiro Emori, Chiyoda-Ku (JP); Shu Namiki, Chiyoda-Ku (JP); Akira Fujisaki, Chiyoda-Ku (JP); Toshio Kimura, Chiyoda-Ku (JP)

(73) Assignee: Fitel USA Corp., Norcross, GA (US)

( * ) Notice: Subject to any disclaimer, the term of this patent is extended or adjusted under 35 U.S.C. 154(b) by 8 days.

(21) Appl. No.: 10/097,744

(22) Filed: Mar. 15, 2002

(65) Prior Publication Data

US 2003/0174387 A1 Sep. 18, 2003

(51) Int. Cl.$^7$ ................................................. H01S 3/00
(52) U.S. Cl. .............. 359/335; 359/341.33; 359/341.31
(58) Field of Search ............................ 359/334, 341.33, 359/341.31

(56) References Cited

U.S. PATENT DOCUMENTS

| | | | |
|---|---|---|---|
| 4,616,898 A | 10/1986 | Hicks, Jr. | |
| 4,669,452 A | 6/1987 | Osawa | |
| 5,664,131 A | 9/1997 | Sugiya | |
| 5,673,280 A | 9/1997 | Grubb et al. | |
| 5,715,263 A | 2/1998 | Ventrudo et al. | |
| 5,887,093 A | 3/1999 | Hansen et al. | |
| 5,912,761 A | 6/1999 | Jander et al. | |
| 5,940,209 A | 8/1999 | Nguyen | |
| 5,995,275 A | 11/1999 | Sugaya | |
| 6,038,063 A | 3/2000 | Tsuda et al. | |
| 6,115,174 A | 9/2000 | Grubb et al. | |
| 6,178,038 B1 | 1/2001 | Taylor et al. | |
| 6,188,705 B1 | 2/2001 | Krainak et al. | |
| 6,229,631 B1 | 5/2001 | Sato et al. | |
| 6,246,510 B1 | 6/2001 | BuAbbud et al. | |
| 6,292,288 B1 | 9/2001 | Akasaka et al. | |
| 6,310,716 B1 | 10/2001 | Evans et al. | |
| 6,313,940 B1 | 11/2001 | Bode et al. | |
| 6,317,255 B1 | 11/2001 | Fatehi et al. | |
| 6,320,884 B1 | 11/2001 | Kerfoot, III et al. | |
| 6,433,920 B1 * | 8/2002 | Welch et al. | 359/334 |
| 6,433,921 B1 * | 8/2002 | Wu et al. | 359/334 |
| 2001/0036004 A1 | 11/2001 | Ackerman et al. | |

FOREIGN PATENT DOCUMENTS

WO    WO 01/51986    7/2001

OTHER PUBLICATIONS

Elizabeth Bruce, Tunable Lasers, IEEE Spectrum, Feb. 2002, pp. 35–39.

Emori, Y. and Namiki, S. "100 nm bandwidth flat gain Raman amplifiers pumped and gain–equalized by 12–wavelength–channel WDM high power laser diodes." OFC/IOOC 1999, Technical Digest. PD 19/1–19/3, Feb. 1999.

* cited by examiner

Primary Examiner—Mark Hellner

(57) ABSTRACT

A tunable multimode wavelength division multiplex Raman pump and amplifier, and a system, method, and computer program product for controlling a tunable Raman pump and amplifier. The tunability of the pump source is accomplished by either straining or heating an external fiber grating, thereby causing a different wavelength of light to be emitted by the pump source. The system includes a microprocessor-based controller that monitors an amplifier's performance and adjusts the drive current and/or wavelength of the tunable pumps of an amplifier to achieve a target performance.

61 Claims, 44 Drawing Sheets

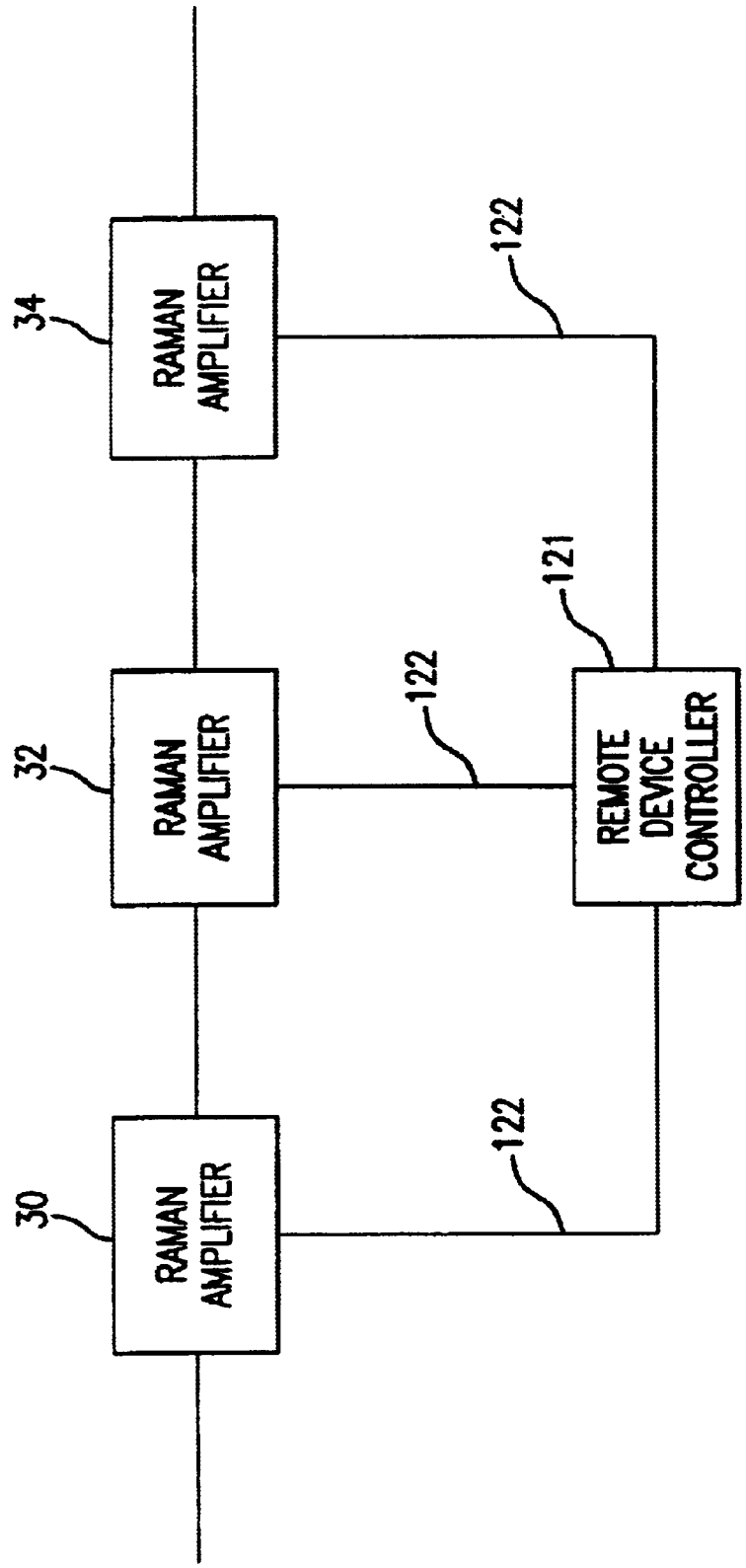

US 6,768,577 B2

TUNABLE MULTIMODE LASER DIODE MODULE, TUNABLE MULTIMODE WAVELENGTH DIVISION MULTIPLEX RAMAN PUMP, AND AMPLIFIER, AND A SYSTEM, METHOD, AND COMPUTER PROGRAM PRODUCT FOR CONTROLLING TUNABLE MULTIMODE LASER DIODES, RAMAN PUMPS, AND RAMAN AMPLIFIERS

CROSS-REFERENCE TO RELATED PATENT DOCUMENTS

This document contains subject matter related to that disclosed in U.S. Pat. No. 6,292,288 to Akasaka et al., filed on Mar. 17, 2000, entitled "RAMAN AMPLIFIER, OPTICAL REPEATER, AND RAMAN AMPLIFICATION METHOD"; and U.S. patent application Ser. No. 09/775,632, filed on Feb. 5, 2001, entitled "RAMAN AMPLIFIER SYSTEM, APPARATUS, AND METHOD FOR IDENTIFYING, OBTAINING, AND MAINTAINING AN ARBITRARY RAMAN AMPLIFICATION PERFORMANCE" (Attorney Docket No. 199455US-8) the entire contents of each of which being incorporated herein by reference.

BACKGROUND OF THE INVENTION

1. Field of the Invention

The present invention relates to a tunable multimode wavelength division multiplex Raman pump and amplifier, and a system, method, and computer program product for controlling the same.

2. Discussion of the Background

With the explosion of the information age has come a demand for larger data transmission capacity for optical communication systems. Conventionally, optical communication systems transmitted data on a single optical fiber using a single wavelength of light (e.g., 1310 nm or 1550 nm). Signals at these wavelengths were desirable since they have reduced light absorption properties for optical fibers. However, in order to increase the data transmission capacity of these single fiber systems, it was necessary to increase the number of optical fibers laid on a transmission route which greatly increased the cost of optical fiber networks.

To mitigate this problem, wavelength division multiplexing (WDM) optical communications systems such as the dense wavelength division multiplexing (DWDM) system have become desirable. In a WDM system, a plurality of optical signals, each having a different wavelength, can be transmitted simultaneously through a single optical fiber.

Optical fiber communication systems transmit optical signals over considerable distances. However, the signal strength of the optical signals attenuates with distance because of absorption and scattering. Signal strength attenuation ultimately results in signal reception degradation if the signal strength is not kept above background noise (or other sources of noise) by a predetermined amount. Amplifiers are used to keep the signal strength above background noise by a predetermined amount. In general, there are two approaches to amplifying an optical signal: the first, is to use an electronic repeater, which converts the optical signal into an electric signal, amplifies the electrical signal, and then converts the amplified electrical signal back into an optical signal for further transmission along an optical fiber; the second, is to amplify the optical signal itself. Two types of amplifiers that can be used to amplify an optical signal according to the second approach are rare earth doped fiber amplifiers such as erbium doped fiber amplifiers (EDFA), and Raman amplifiers.

EDFAs are currently the most widely used optical amplifiers for WDM systems and are effective and reliable for optically amplifying WDM signals. However, EDFAs have an amplification bandwidth that is limited in range, and produce a wavelength-dependent gain profile. These two characteristics of EDFAs are undesirable for WDM signals, which are spectrally distributed, since a non-uniform amount of gain will be applied to the various WDM channels, depending on the wavelength of the channels. To offset this effect, a gain flattening filter may be used to obtain a uniform or flat gain profile (having a gain deviation of less than 1 dB) across the entire communication band. The gain flattening filter is designed to have a loss profile having a shape that is the inverse of the shape of the gain profile. Gain flattening filters, however, are limited to a particular gain profile, and are not dynamically adjustable to compensate for changes in a magnitude of the gain of the EDFA. Therefore, a flat gain profile cannot be maintained when the gain of the EDFA is changed, or if the attributes of the communications network are changed, such as by adding more WDM signals. In addition, the gain flattening filter decreases the total amount of power launched into an optical fiber.

Raman amplifiers use a phenomenon known as Stimulated Raman Scattering (SRS) of light within an optical fiber to achieve a gain in a particular wavelength band. The inelastic scattering process generates an optical phonon and a co-propagating Stokes wave, light that is downshifted in frequency from the pump light by an amount equal to the phonon frequency (i.e. total energy is conserved). In silica fibers, the peak SRS gain occurs at about 13 THz below the pump light frequency (or conversely, at a wavelength that is longer than a wavelength of the light pumped into the optical fiber by about 100 nm). Since Raman amplification is a scattering process, unassociated with the resonance properties of any particular material, one can generate a Raman gain spectrum for pump light at any wavelength. Therefore, changing a wavelength of the pump light, changes the wavelength at which a peak gain is applied to WDM signals, thereby amplifying some WDM signals more than others. By multiplexing several different pump wavelengths into the same fiber, one can generate a reasonably flat gain spectrum over an arbitrary bandwidth. Because Raman amplifiers require a greater pumping power to obtain the same gain as an EDFA, Raman amplifiers have primarily been used in signal wavelength bands outside of the amplification bandwidth of EDFAs.

Although a Raman amplifier amplifies a signal over a wide wavelength band, the gain of a Raman amplifier is relatively small and, therefore, it is preferable to use a high output laser device as a pumping source. However, increasing the output power of a single mode (or frequency) pumping source beyond a certain threshold leads to undesirable stimulated Brillouin scattering and increased noise at high peak power values. As recognized by the present inventors, to prevent this problem, a multimode laser device is preferably used as a pumping source in a Raman amplifier. A multimode laser has a plurality of oscillating longitudinal modes, each providing output power at less than the threshold at which stimulated Brillouin occurs. A multimode laser can provide a sufficient amount of output power to achieve Raman amplification distributed over the various modes (i.e., wavelengths of output light), as opposed to providing the power all at a single wavelength.

To control the wavelength of the light emitted from the pumping source, and therefore, determine what wavelength of signal will be amplified, it is well known to use fiber gratings. A fiber grating selectively reflects certain wavelengths of light causing a laser beam of a specific wavelength to be output. Fiber gratings are known to be included in the core of an optical fiber, separate from the laser device itself.

Spectroscopy is one application for using a tunable fiber grating is described in U.S. Pat. No. 6,188,705, the entire contents of which being incorporated herein by reference. A tunable fiber grating is described as being coupled to a quasi-monochromatic light source for selecting a single frequency of light output from the light source. Although the light source is capable of producing multiple modes of light, the tunable fiber grating is configured so that only a single frequency output of the light source results. As explained in U.S. Pat. No. 6,188,705, for spectroscopy applications, signal frequency operation is highly desirable, if not required, in order to detect substances with narrow bandwidth absorption lines ('705 patent, col. 1, lines 54–57). A wavelength tuning mechanism may tune the fiber grating by way of temperature change, compression, or through the application of stress of strain ('705 patent, col. 6, lines 14–42).

The present inventors have recognized, however, that the single frequency aspect of the tunable fiber grating described in the '705 patent would render it unsuitable for use as a Raman amplifier pump device because, as discussed above, multimode pump sources are superior to single frequency pump sources when used in Raman applications.

As described in Bruce, E. "Tunable Lasers," IEEE Spectrum, pages 35–39, February 2002, there are a variety of other types of tunable lasers made for use in WDM systems, although the primary application is for generating a WDM signal at a particular frequency (or wavelength). As recognized by the present inventors, since none of these tunable lasers are made for operation as a Raman pump source that intentionally outputs light at more than one frequency, it is unclear from the literature how, or whether, these devices could be adapted for use in multimode applications.

As described in U.S. Pat. No. 6,292,288, in order to achieve a uniform gain profile over a broad range of wavelengths, a Raman amplifier can include multiple pump lasers, each providing multimode light having a predetermined spectral width, centered at a different central wavelength. By properly spacing in wavelength the pump lasers with predetermined optical output levels, it is possible to achieve a composite gain profile that is flat over a broad range of wavelengths, and therefore to provide Raman amplification over a broad range of wavelengths.

U.S. patent application Ser. No. 09/775,632 describes a system through which Raman amplification performance can be controlled. As described in that application, by controlling an output power of each of the lasers of a particular Raman amplifier, the desired gain characteristics can be maintained. Moreover, by monitoring and controlling a portion of a network, the Raman amplification performance of that portion can be controlled through cooperative adjustments made to one or more of the Raman amplifiers (or of individual pump lasers of a particular Raman amplifier) that impact that portion of the network.

FIG. 1 is a block diagram of a conventional Raman amplifier 100. The Raman amplifier 100 includes an amplifier fiber (optical fiber) 103, a WDM coupler 104, a pumping device 107, a control unit 119, and optional polarization independent isolators 102, 105. The Raman amplifier 100 is connected (or merely coupled) to an input fiber 101 and an output fiber 106, which may be optical transmission fibers such as single mode fibers (SMF), dispersion compensation fibers (DCF), dispersion flattening fibers, etc.

The Raman amplifier 100 is connected to a network 122 via a communication link 123. The network 122 is also connected to other amplifiers 124, 125 fiber as well as a remote device controller 121. The remote device controller 121 monitors the operational status of the Raman amplifier 100 as well as the other amplifiers 124, 125. The network 122 may be a proprietary wireless or wired network, or another network that is publicly accessible, such as the Internet or a hybrid network, part proprietary and part publicly accessible. While the Raman amplifier 100 may operate autonomously, it may receive additional information about the overall system performance, such that the control unit 119 can adapt the amplification performance of the Raman amplifier 100 to help offset any adverse affects to the system's performance, as might be necessitated by a change in conditions, described in the additional information. As an example, this additional information may be that a replacement fiber with different attenuation characteristics is being used to interconnect two cascaded Raman amplifiers in a WDM system. In this case, the Raman amplifier 100 may set a new "target" amplification performance so as to normalize the channel characteristics for all of the WDM channels, despite the fact that the new fiber may attenuate some of the channels by a lesser amount than others.

The pumping device 107 includes Fabry-Perot type semiconductor lasers 109, 110, 111, 112, wavelength stabilizing fiber gratings 113, 114, 115, 116, polarization couplers 117, 118, and a WDM coupler 108. The central wavelengths of the semiconductor lasers 109 and 110 and wavelengths of the fiber gratings 113 and 114 are the same wavelength $\lambda_1$, and the central wavelengths of the semiconductor lasers 111 and 112 and reflection wavelengths of the fiber gratings 115 fiber and 116 are the same wavelength $\lambda_2$. The central wavelengths of the semiconductor lasers 109, 110, and 111 and 112 are respectively stabilized to $\lambda_1$ and $\lambda_2$ via the wavelength stabilizing fiber gratings 113, 114 and 115, 116.

Multimode light generated by the semiconductor lasers 109, 110 and 111, 112 is combined by polarization combiners 117, 118 for each central wavelength $\lambda_1$ and $\lambda_2$, respectively. The light output from the polarization combiners 117, 118 is combined by the WDM coupler 108. Polarization maintaining fibers 126 are used in the connections between the semiconductor lasers 109, 110, 111, 112 and the polarization combiners 117, 118 to maintain two different polarization planes. This ensures that an input signal to the Raman amplifier 100 will be adequately amplified regardless of its orientation in the signal fiber 101 or amplification fiber 103.

The pumping device 107 in this example includes two pumps that provide light having two different wavelengths $\lambda_1$ and $\lambda_2$ to the amplifier fiber 103 (i.e., a first pump that provides light having a central wavelength of $\lambda_1$, and a second pump that provides light having a central wavelength of $\lambda_2$). Further, as noted in U.S. Pat. No. 6,292,288, a wavelength interval between the wavelengths $\lambda_1$ and $\lambda_2$ is selected to be in a range of 6 nm to 35 nm in order to provide a flat gain profile over a range including both $\lambda_1$ and $\lambda_2$.

The light output from the pumping device 107 is coupled to the amplifier fiber 103 via the WDM coupler 104. An optical signal (e.g., a WDM signal) is incident on the amplifier fiber 103 via the input fiber 101. The optical signal is then boosted in signal level after the gain medium has being excited by the light pumped into the amplifier fiber 103, the net result being that the optical signal is Raman-amplified. In addition, the Raman-amplified optical signal is passed through the WDM coupler 104 and is transmitted toward the control unit 119, where a part of the amplified optical signal is branched to form a monitor signal (or sampled output signal), while the majority of the signal is output on the output fiber 106.

The control unit 119 includes a processor to assert control over the amplification performance of the Raman amplifier. The control can be based on either the monitored signal or an external source, such as, for example, a control signal received from the remote device controller 121. The control unit 119 generates a control signal on a bus 120, that includes a sufficient number of control lines, so as to allow for control of the drive currents and for the individual semiconductor lasers 109, 110, 111, 112 to achieve a small gain deviation relative to a target gain profile (e.g., a flat amplification profile).

As compared with EDFAs, for example, Raman amplifiers are more complex devices since they contain more laser diode modules, operate over wider bandwidths that are determined by system parameters, and require controllers that are able to establish predetermined amounts of gain across the amplification bandwidth, consistent with network requirements. As recognized by the present inventors, part of the complexity is manifested in a controller that is able to adjust pump output levels when environmental or network requirements change. For example, the central wavelengths of the pump modules will change as a function of temperature. This change in central wavelength will result in change in gain shape, which must be detected by the controller and compensated. However, changing pump power level also effects the Raman amplifier's gain characteristic, and thus optimum control is not always possible due to temperature induced wavelength shifts in pump light.

Likewise, changes in system requirements may create a situation where the amplification bandwidth of the amplifier must be changed (i.e., widen, or shift to another band). While some changes are possible by switching-in or switching-out pumps to accommodate bandwidth changes, this leads to more expensive amplifiers, because more pumps are needed in the amplifier, albeit not used until needed. Likewise, some of the pumps may degrade overtime or fail. On-board spares may be used to mitigate reliability concerns, however this solution is expensive to implement if all pumps are provided with an on-board spare.

The addition of channels within the amplification bandwidth is another possible scenario. In such a scenario, it may be necessary to increase amplifier power to avoid pump depletion. Since Raman scattering is a non-linear process, the amplifier gain cannot be increased by simply increasing the laser pump power, since doing so will change the power partitioning in the output wavelengths, which will likely result in a non-flat gain spectrum. Furthermore, the non-linear gain characteristics may give rise to undesirable four-wave mixing products, which may result in in-band (signal band) noise spurs that compromise signal to noise (or spurious) ratio requirements. As recognized by the present inventors, the four-wave mixing products are the result of operating at too high of an input pump light level at a particular pump central wavelength. When this occurs, the amplification characteristic of the gain medium at that central wavelength is substantially non-linear, and undesirable spurious responses are created. Given the number pumps that operate at different wavelengths in a Raman amplifier, the risk of four-wave mixing can be intractable if not detected and controlled by reducing the pump levels. However, if reducing the pump levels results in insufficient amplification, the problem can be circumvented by reconfiguring the pump wavelengths in such a way that they provide sufficient gain with sufficient flatness, and their four-wave mixing products are either suppressed or lie out-of-band.

SUMMARY OF THE INVENTION

The inventors of the present invention have recognized that conventional optical communication systems are limited as to their flexibility and adaptability. Accordingly, one object of the present invention is to provide a tunable multimode wavelength division multiplex Raman pump and amplifier, and a system, method and computer program product for controlling the same, which address the above-identified and other limitations of conventional systems.

In order to achieve flat gain (or an arbitrary gain shape, such as to compensate for a non-flat fiber attenuation characteristic) for a Raman amplifier, as discussed above, the wavelengths and power levels of each Raman pump are carefully chosen. The present inventors have recognized that, unfortunately, the term "flat gain" can mean different things depending on the particular characteristics of a given communications system. Furthermore, the present inventors have recognized that the requirements for a particular system may change over time. For example, new channels may be added or dropped at different wavelengths, bit rates may be increased, or in-line components that are not easily replaced may fail. A one-size-fits-all approach to Raman pumping does not exist. The inventors of the present invention have recognized that it would be advantageous to have a Raman pump module that can be reconfigured by tuning the central wavelength and setting the optical output of each Raman pump individually, allowing the controller to alter the gain profile as needed. Accordingly, another object of the present invention is to provide a tunable multimode Raman pump and a tunable Raman amplifier that uses tunable stabilizer fiber Bragg gratings (FBG) to shift the reflection bandwidth. By providing a tunable Raman pump and a tunable Raman amplifier, more flexible optical communication systems can be built that can be controlled to adjust to either changes in the requirements of the network, or to sub-optimal performance caused by a variety factors.

To achieve these and other objects, the present invention provides a tunable multimode WDM Raman pump, amplifier, control system, method and software that uses a plurality of multimode pumps, whose optical outputs and central wavelengths are controlled by a control unit. Controlling both the wavelength and optical output of the pumps to predetermined levels and/or wavelengths enables a flexible approach toward Raman amplifying a WDM optical signal that propagates through the optical fiber that serves as the Raman gain medium. The control unit ensures that the Raman amplification profile (e.g., a predetermined amplifier gain profile across the amplification bandwidth, and/or the amplification wavelength span) is set and maintained to be consistent with system requirements.

The control unit monitors the amplified WDM signal and, subsequently, determines if the monitored amplified WDM signal is within a predetermined threshold of the target amplification profile. If the Raman-amplified signal is not within the predetermined threshold, the control unit actively controls the pumps (by adjusting at least one of the optical output and central wavelength) to bring the monitored amplified WDM signal within the predetermined threshold of the target amplification profile. The control of the individual pumps may include adjustments made to the output power of the pump and/or the output wavelength of pumping light provided by the pump.

The control unit is also configured to respond to control signals from an external source (e.g., an central controller or other source) that directs the Raman amplifier to create a new target amplification profile. This new target amplification profile may be based on, for example, a change in system operating conditions or system requirements.

The control unit is also configured to monitor for presence of four-wave mixing by observing in-band noise products that are more narrowband than background noise. When detected, the control unit adjusts the central wavelengths of the contributing pumps so as to "steer" the narrowband noise out of the signal band.

In one embodiment of the present invention a reconfigurable Raman pump module includes a multiplexed array of wavelength tunable laser diodes. Tuning is achieved by uniformly shifting the reflection bandwidth of the pump's stabilizer FBG. This approach allows for a single module design that is applicable for many different systems, thereby reducing the manufacturing and inventory problems associated with custom-built equipment. It also reduces the costs associated with future system upgrades.

One embodiment of the reconfigurable Raman pump includes a semiconductor laser diode with an electronic input optically coupled to a waveguide output. A grating structure is inscribed in the waveguide output to provide a small amount of feedback to the diode. The grating is coupled to a tuning mechanism that changes either the grating period, the effective index of the waveguide in the grating region, or both. The reflected feedback from the grating causes the lasing linewidth (or bandwidth of optical output) of the laser diode to roughly correspond to the grating bandwidth. When the grating is tuned, its reflection bandwidth uniformly shifts, resulting in a corresponding uniform shift in the multimode output of the laser diode, thereby achieving tunability of the Raman pump.

The tuning of the grating in the context of the present invention may be through, for example, thermal effects or strain effects (compressive or tensile). Thermal tuning works by inducing changes in the effective index of the waveguide, known as the thermo-optic effect. Changes in the grating period due to the thermal expansion of the waveguide are a second order effect, at least for silica-based materials. Strain tuning works by both changing the effective index via the stress-optic effect and causing small changes in the grating period.

Another feature of the present invention is that each Raman amplifier in an optical communication system need not operate alone, but rather may operate in an internetworked fashion with other amplifiers in the system. Since Raman amplification is a distributed amplification, the present invention exploits this distributed effect by shifting amplification duties between adjacent, cascaded Raman amplifiers so as to compensate for unforeseen changes in component operations or system requirements.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS," and more generally throughout the entire document.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 46 is a schematic of cascaded Raman amplifiers and an associated control unit according to the present invention.

DESCRIPTION OF THE PREFERRED EMBODIMENTS

Figure 1:
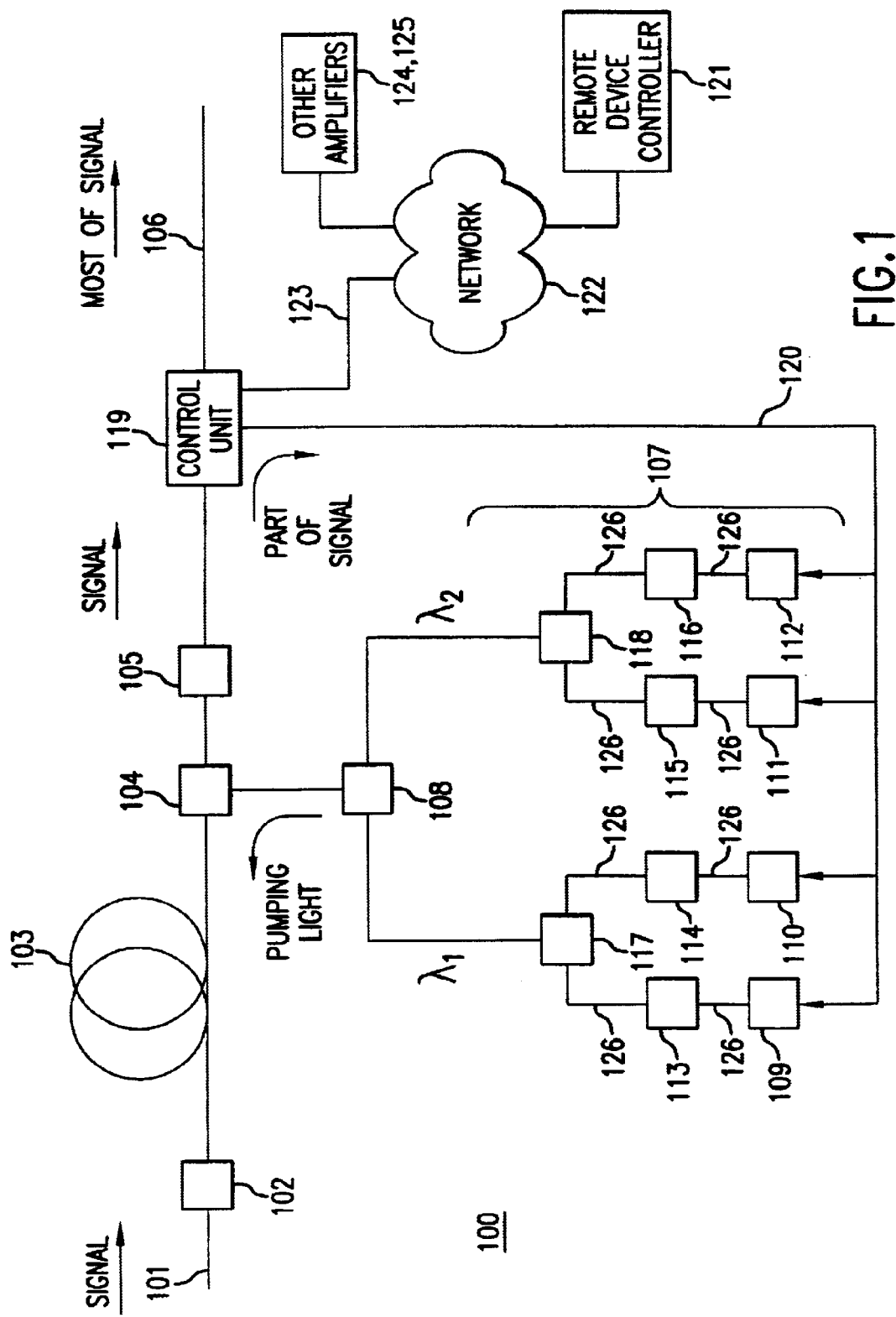
FIG. 1 is a block diagram illustrating a conventional Raman amplifier.
Figure 2:
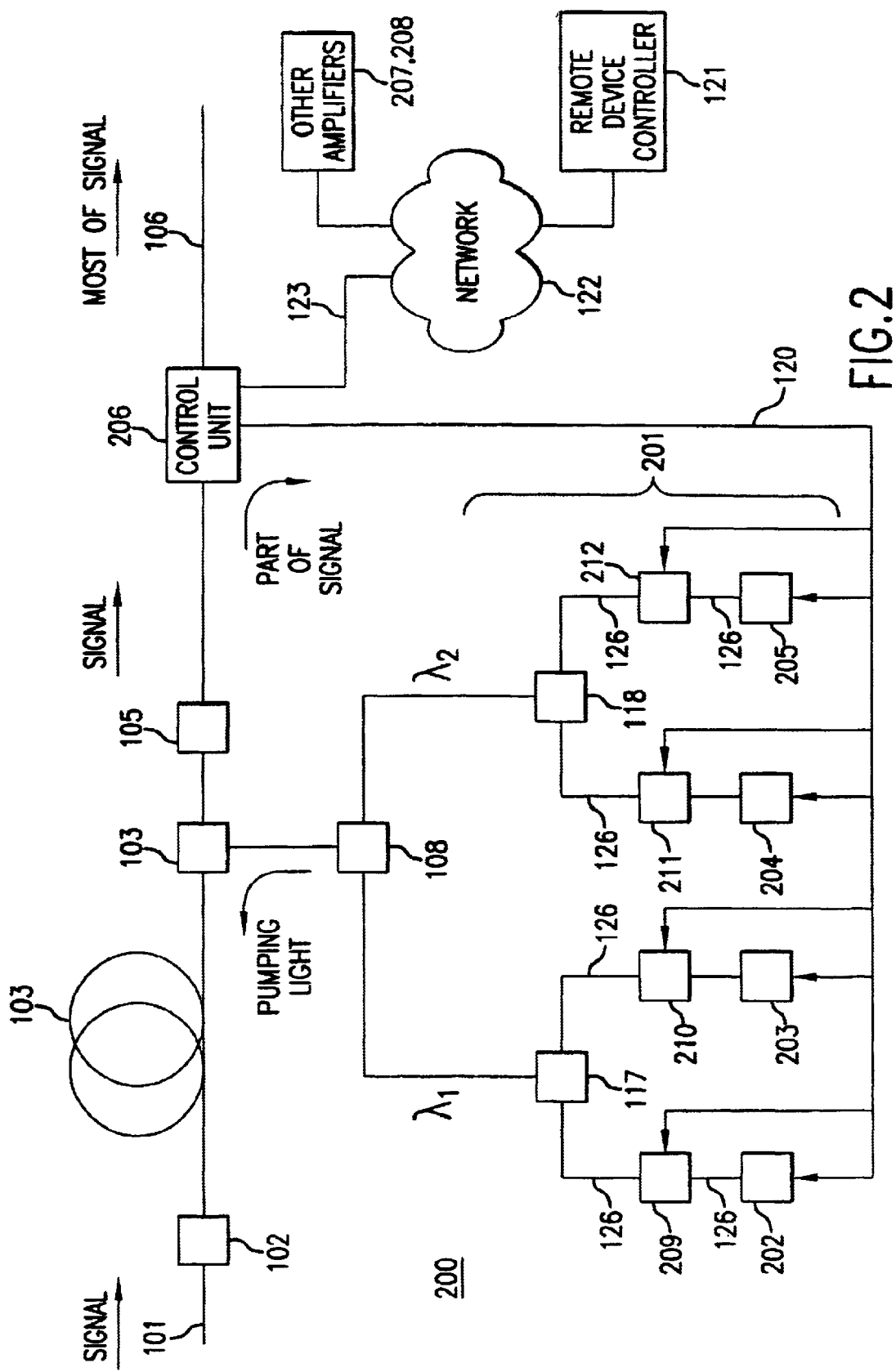
FIG. 2 is a block diagram illustrating a Raman amplifier according to one embodiment of the present invention.

Referring now to the drawings, FIG. 2 is a block diagram of a Raman amplifier 200 according to one embodiment of the present invention. The Raman amplifier 200 includes an amplification fiber (optical fiber) 103, a WDM coupler 104, a pumping device 201, a control unit 206, and optional polarization independent isolators 102, 105. The Raman amplifier 200 is connected to an input fiber 101 and an output fiber 106, which may be optical transmission fibers such as single mode fibers, dispersion compensation fibers (DCF), dispersion flattening fibers, etc. The input fiber 101, amplification fiber 103 and output fiber 106 may be the same fiber.

The Raman amplifier 200 is connected to a network 122 via a communication link 123. The network 122 is also connected to other amplifiers 207, 208 as well as a remote device controller 121. The remote device controller 121 monitors the operational status of the Raman amplifier 200 as well as the other amplifiers 207, 208. The network 122 may be a proprietary wireless or wired network, or another network that is publicly accessible, such as the Internet or a hybrid network, part proprietary and part publicly accessible. While the Raman amplifier 200 may operate autonomously, it may also be provided with additional information about the overall system performance, such that the control unit 206 can adapt the amplification performance of the Raman amplifier 200 to help offset any adverse affects to the system's performance as indicated by a change in conditions, reflected in the additional information. As an example, the additional information may be that a replacement fiber with different attenuation characteristics is being used to interconnect two cascaded Raman amplifiers in a WDM system. In this case, the Raman amplifier 200 may employ a new "target" amplification performance so as to normalize the channel characteristics for all of the WDM channels, despite the fact that the new fiber may attenuate some of the channels by a lesser amount than others.

The pumping device 201 includes Fabry-Perot type semiconductor lasers 202, 203, 204, 205, tunable wavelength stabilizing fiber gratings 209, 210, 211, 212, polarization couplers 117, 118, and a WDM coupler 108. The tunable fiber gratings 209, 210 are tuned to the same central wavelength $\lambda_1$, and the tunable fiber gratings 211, 212 are tuned to the same central wavelength $\lambda_2$.

The light output from the polarization combiners 117, 118 is combined by the WDM coupler 108. Polarization maintaining fibers 126 are used in the connections between the semiconductor laser devices 202, 203, 204, 205, the tunable fiber gratings 209, 210, 211, 212, and the polarization combiners 117, 118 to maintain two different polarization planes, thus ensuring an input signal to the Raman amplifier 200 will be adequately amplified regardless of its orientation in the signal fiber 101 or amplification fiber 103.

The pumping device 201 in this example includes two pumps that provide light having wavelengths $\lambda_1$ and $\lambda_2$ to the amplifier fiber 103. However, since the pumping device 201 includes tunable fiber gratings 209, 210, 211, 212, the two wavelengths $\lambda_1$ and $\lambda_2$ are adjustable, and need not be different. Moreover, the semiconductor lasers need not be preconfigured to generate light at any particular wavelength. In one embodiment of the present invention, the pumping devices 201 are configured in central wavelength and optical output by the customer for a particular application. The inventors of the present invention have recognized that by providing "field configurable" Raman amplifiers, customers have more flexibility to adjust the operational performance of their system. Moreover, customers need not maintain an inventory of Raman amplifiers for each configuration included in their system since the tunable Raman pumps and amplifiers of the present invention are configurable by the customer. Thus, one "generic" Raman amplifier with tunable multimode Raman pumps may be stocked by a system operator, and then programmed in the field (locally at the control unit 206, or remotely via the remote device controller 121) to operate with a predetermined gain shape and amplification bandwidth.

The light output from the pumping device 201 is coupled to the amplifier fiber 103 via the WDM coupler 104. An optical signal (e.g., a WDM signal) is incident on the amplifier fiber 103 via the input fiber 101. The optical signal is then combined with the light pumped into the amplifier fiber 103 so the incident optical signal is Raman-amplified. In addition, the Raman-amplified optical signal is passed through the WDM coupler 104 and is transmitted toward the control unit 206, where a part of the amplified optical signal is branched to form a monitor signal (or sampled output signal), while the majority of the signal is output on the output fiber 106. The monitor signal is analyzed at separate wavelengths by the control unit 206 to determine if the output level of the optical signal complies with the intended level. If not corrective action is taken to make an adjustment to the amplification profile. The controller may include other detection techniques as well, such as narrowband noise detection, so as to assess whether four-wave mixing is a problem, and if so to identify the offending pump laser.

The control unit 206 uses a processor to assert control over the output power and/or tune the central wavelength of light provided by each of the semiconductor lasers 202, 203, 204, 205 fiber by controlling the tunable fiber gratings 209, 210, 211, 212, thereby controlling the overall amplification performance of the Raman amplifier 200. The control can be based on either the monitor signal or an external source, such as, for example, a control signal received from the remote device controller 121. The control unit 206 generates a control signal on a bus 120, that includes a sufficient number of control lines, so as to allow for control of the drive currents to achieve a small gain deviation relative to a target gain profile (e.g., a flat amplification profile), and/or control individual tunable fiber gratings 209, 210, 211, 212, to adjust the central wavelengths of the individual semiconductor lasers 202, 203, 204, 205.

While there are a number of different embodiments of the control unit 206, a common feature of each embodiment is that a processor is employed to assert control over the amplification performance and/or the central wavelength of light provided by the Raman amplifier 200. While some embodiments include a signal monitoring feature in the control unit 206, it should be understood that the control unit 206 can receive a monitored output signal or other control information from an external source. For example, as shown in FIG. 2, a remote device controller 121 may provide control information via the network 122. Likewise, the control unit 206 may include a laser driver circuit, or simply an interface to a driver circuit that is external to the control unit 206. In each case, however, the control unit 206 is equipped with a processor that is able to execute a series of instructions (e.g., by way of a PAL, or ASIC) to interpret whether the output of the Raman amplifier 200 is within a predetermined tolerance of a target amplification performance and/or a central wavelength of light output, and take corrective action as appropriate. Furthermore, the control unit 206 is capable of implementing a change in the operational characteristics of the Raman amplifier 200 based on control information provided to the control unit 206.

U.S. patent application Ser. No. 09/775,632 describes how to control the output power of the Raman amplifier 200. It should be understood that the control unit 206 may include a software (or firmware/hardware equivalent) output power control mechanism as described in Ser. No. 09/775,632. However, the remainder of the description herein will primarily focus on the control unit's 206 control over the central wavelength of the output pumping light of the Raman amplifier 200 through tuning of the tunable fiber gratings 209, 210, 211, 212.

The control unit 206 monitors the post-amplification signal and generates a control signal on a bus 120 that includes a sufficient number of control lines to control the semiconductor laser devices 202, 203, 204, 205 (e.g., including control lines to control the drive currents of the semiconductor laser devices 202, 203, 204, 205 and control lines to control the tunable fiber gratings 209, 210, 211, 212). For example, when the control unit 206 is configured to control both the output power and the wavelength of a Raman amplifier 200 including four semiconductor laser devices 202, 203, 204, 205, at least eight control lines are included on the bus 120 (i.e., one drive current control line and one fiber grating tuning control line for each of the four semiconductor laser devices 202, 203, 204, 205). Alternatives are possible as well where the control unit 206 outputs a digital signal on bus, which is interpreted by another processor (or firmware/hardware equivalent) located near the drive circuits and gratings and converted into discrete control signals.

The control unit 206 performs the function of controlling the gain profile of the multimode Raman amplifier 200, and then monitoring the signal output from the Raman amplifier 200 to ensure the amplifier is actually operating within a predetermined tolerance of the target gain profile. The control unit 206 will initially identify and set the target central wavelengths of the semiconductor laser devices 202, 203, 204, 205, but it is also configured to make adjustments to the target gain profile of the amplifier 200 if it is provided with additional information about the system-level performance that has not yet been taken into account when establishing the target gain profile. For example, if a failure in a pump laser of an adjacent downstream amplifier is reported to the control unit 206, the control unit 206 may be able to compensate for this failure, which would manifest itself by a less than ideal amount of amplification in a portion of the amplification by increasing the amplification profile for that portion of the amplification band in the Raman amplifier 200.

A first functional feature of the control unit 206 is that it is configured to obtain a target Raman amplification performance and then monitor an actual output (Raman amplified) WDM signal to determine if the monitored amplification performance is within a predetermined tolerance of the target performance. The control unit 206 performs this monitoring operation by identifying deviations between the actual performance and the target performance. If the control unit 206 determines that the monitored amplification performance is within the allowable tolerance of the target amplification performance throughout the amplification band, the control unit 206 does not alter the conditions for the pumping device and continues monitoring the actual amplification performance. However, if the control unit 206 determines that the actual amplification is not within the allowable tolerance of the target amplification performance, the control unit may increase or decrease pumping power and/or tune the central wavelengths of one or more of the pumps so as to maintain the target amplification performance.

Another feature of the control unit 206 is that it is configured to change the target performance as well as the conditions for a pumping device to produce a new target performance for Raman amplification. This function may be performed as a configuration function when the Raman amplifier 200 is initially installed, or may be performed in response to a change in system requirements. For example, a particular communication band may need to be expanded to accommodate additional channels on the network. To accommodate this change in system requirements, the control unit 206 may be configured to set another set of conditions for the pumping device, such as turning on or off or changing the output power or central wavelength of one or more of the semiconductor laser devices 202, 203, 204, 205 included in the Raman amplifier 200 so as to achieve a different target performance for increasing a communication bandwidth.

A third feature of the present invention is that the control unit 206 is networked with other amplifiers (e.g., amplifiers 207, 208) in a cascaded arrangement, such that by coordinating amplification profiles between the cascaded amplifiers, the overall system performance remains optimum for WDM signals, despite the fact that the communication conditions may have changed in some way from an original system design. For example, by coordinating the amplification profiles between adjacent amplifiers, the failure of selected pumps may be compensated for by adjusting the amplification profile of one or more adjacent amplifiers. For example, the control unit 206 may adjust the amplification performances of pre-cascaded and/or post-cascaded Raman amplifiers to offset a problem that has arisen with a Raman amplifier connected therebetween. Other conditions may be compensated for as well, such as the use of a different fiber, with different attenuation characteristics than the original fiber, the insertion of another network component (e.g., switch or amplifier) between two Raman amplifiers, or drifts in a central wavelength of a Raman amplifier due to variations in temperature.

Figure 3:
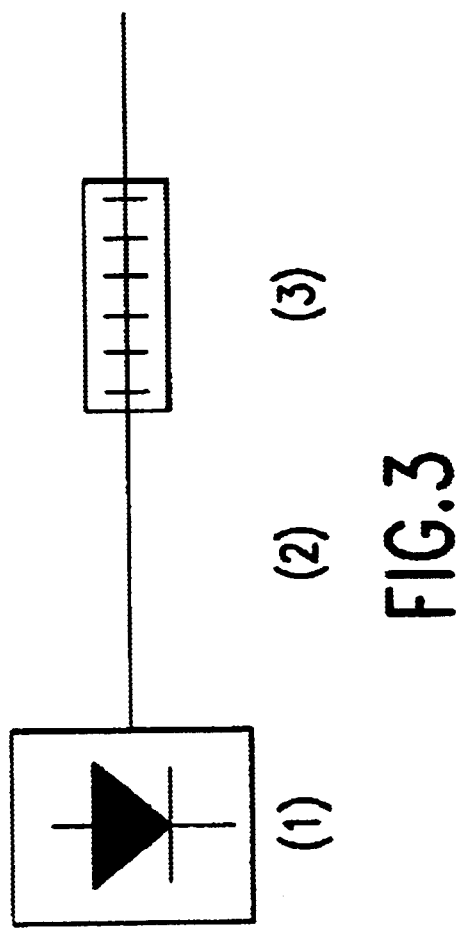
FIG. 3 is a high-level schematic diagram of a tunable laser diode according to one embodiment of the present invention.

FIG. 3 is a schematic diagram of tunable diode device according to one embodiment of the present invention. The solid state diode laser device 1 is electrically pumped and lases over a fairly wide bandwidth (e.g., 5–20 nm), depending on an injection current provided to the laser device 1. The light generated by the laser device 1 is optically coupled into a waveguide 2 which, for example, would be a length of a single mode fiber. A tunable Bragg grating 3, such as the tunable fiber gratings 209, 210, 211, 212 shown in FIG. 2, is written into the waveguide 2, and provides optical feedback to the laser device 1. The grating 3, described in detail below, is located sufficiently far from the laser device 1 so that the feedback it provides is completely out of phase with the light field in the cavity of the diode laser device 1. The feedback destroys the coherence of the laser cavity field; which in turn causes the laser to rearrange its spectral properties to maximize the feedback and restore coherence. In doing so, the output of the laser device 1 spectrally collapses to lie within the bandwidth of the tunable grating 3, which may be, for example, between 0.5 nm and 1 nm. This acts to both stabilize the center wavelength of the laser device 1 output, regardless of the bias current on the laser device 1, and increase the slope efficiency of the laser device 1, since all of the optical power is confined to within a small bandwidth. When the grating is tuned, the diode laser device 1 output shifts in wavelength.

Figure 4:
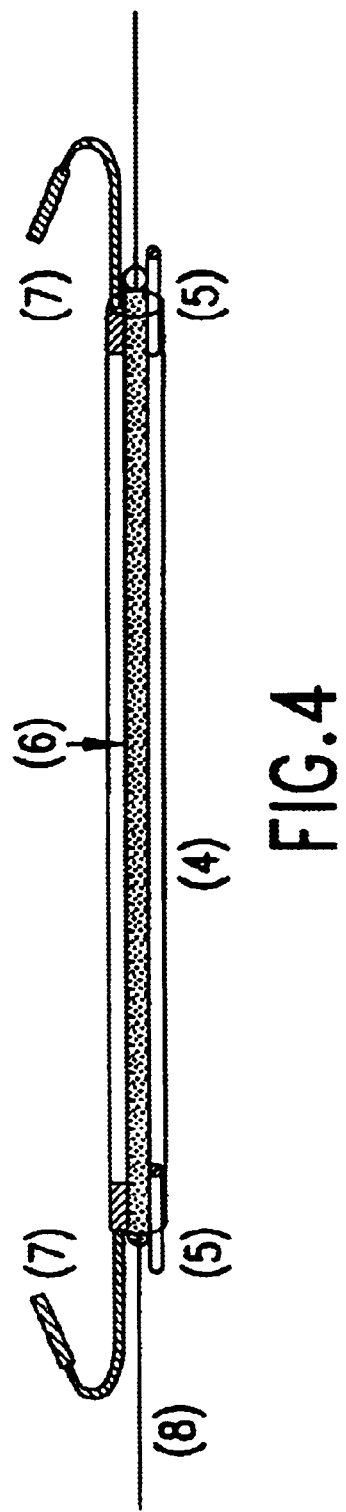
FIG. 4 is a schematic diagram of a heat-tuned grating package according to one embodiment of the present invention.
Figure 5:
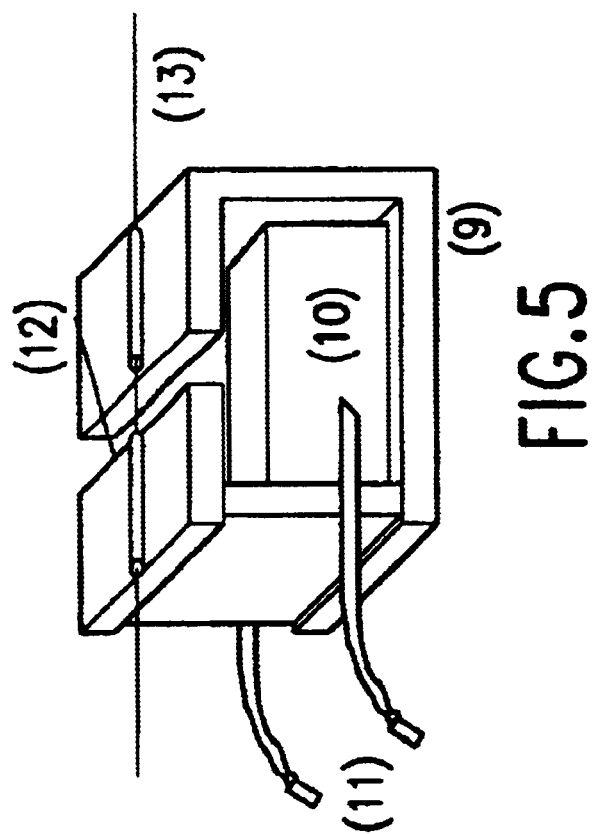
FIG. 5 is a schematic diagram of a strain-tuned grating package according to one embodiment of the present invention.

FIGS. 4 and 5 fiber are representative schematic diagrams of packages that employ two tuning mechanisms, thermal tuning and strain tuning, for tuning a tunable fiber grating 209, 210, 211, 212 according to different embodiments of the present invention. The thermally tuned package shown in FIG. 4 includes a silica microcapillary tube 6 coated with a thin metal film. This capillary is housed in a larger glass tube 4, with two ferrules 5, one on either side, to support the capillary 6 and the electrical leads 7. When a voltage is applied across the thin resistive film, it dissipates the electrical power in the form of heat. The capillary tube 6 is sufficiently small such that it is power efficient, heats up quickly, and there are no radial thermal gradients inside of it when it is heated. Based on this configuration, it can be assured that a fiber Bragg grating 8 placed inside this package will be uniformly heated. The thermal tuning coefficient for silica is only 0.011 nm/C, which provides for about 2–3 nm of tunability. At higher temperatures, the grating will degrade. Strain tuning, and in particular, compressive strain tuning, can achieve up to 20 times that range in the laboratory. Thermal tuning may nevertheless complement other tuning mechanism in which an external mechanical force is applied to the grating.

FIG. 5 illustrates an exemplary compact and reliable configuration for strain tuning a fiber Bragg grating according to one embodiment of the present invention. In this embodiment, a tunability range of at least 10–15 nm is achievable. As shown in FIG. 5, the apparatus includes a lever package 9, made of a rigid material, that houses a piezoelectric actuator 10, the dimensions of which are matched to the package. A voltage is applied to the leads 11 of the piezoelectric actuator 10 causing it to expand horizontally. This expansion causes the two arms of the lever package 9 to push outward. A fiber Bragg grating 13 is mounted on the lever package 9 between the two arms, and is bonded on either end to, for example, two ferrules 12 that ensure proper alignment. The fiber Bragg grating 13 is tuned as the outward motion of the two arms of the lever package 9 stretches it. Stretching the fiber corresponds to tensile strain tuning, which has a much lower tuning range than compressive strain tuning because it mechanically weakens the fiber. However, in another embodiment of the present invention, the package shown in FIG. 5 is used for compressive strain tuning by bonding the fiber when the arms of the lever package 9 are extended. A compressive strain increases when the piezoelectric is turned off (i.e., the voltage is removed from the leads 11). The gratings used for diode stabilization are preferably very short (e.g., sub-millimeter) and therefore well suited for this sort of tuning. By compressing only a very short length of fiber, the likelihood of the fiber buckling is minimized.

Figure 6:
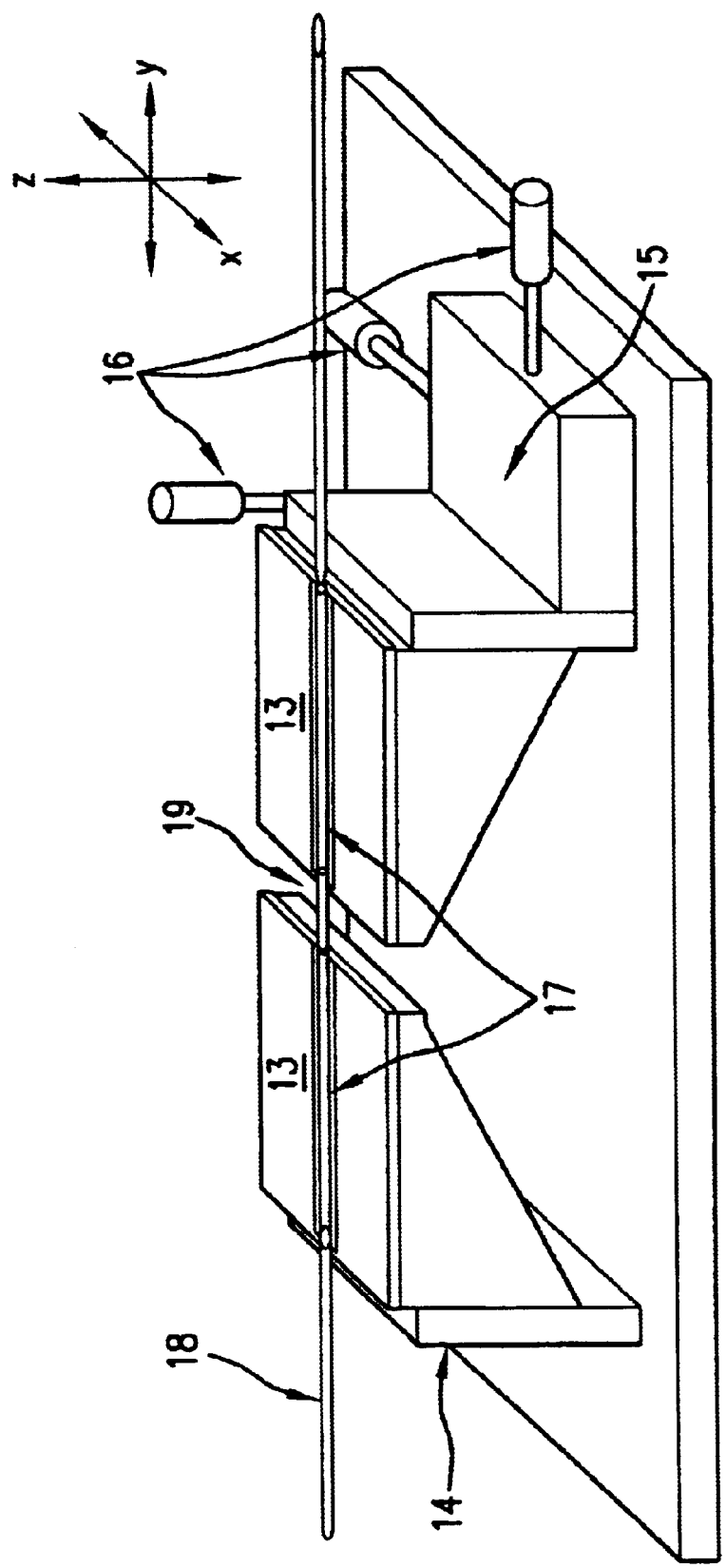
FIG. 6 is an illustration of an apparatus for demonstrating a strain-tuned grating package according to one embodiment of the present invention.

FIG. 6 illustrates an apparatus though which one embodiment of the present invention has been demonstrated. As shown in FIG. 6, two plates 13 are mounted on two separate stages 14, 15. The stage on the right 15 can be adjusted along its x, y, and z axes with a set of three micrometers 16. The stages 14, 15 may be electromechanical stages that are controlled by, for example, stepper motors, MEMS or micromachines that are used to convert control signals into translation motion in the X, Y and Z axes. In one exemplary configuration, each mounting plate 13 has a 180 μm radius semicircle trench running along its surface. A length of silica capillary tubing 17 having, for example, a 250 μm inner diameter and a 360 μm outer diameter is bonded into each trench using, for example, a heat-curable epoxy. The capillary tube mounted on the right hand stage 15 is aligned with respect to the tube mounted on the left hand stage 14 along the x and z axes using a microscope. The y axis micrometers 16 is adjusted so that the gap between the two capillary tubes is 1.25 mm. A length of fiber 18 that has a 1 mm fiber Bragg grating 19 written in it is strung through the two tubes 17 and adjusted so that the grating 19 lies within the 1.25 mm gap.

The grating 19 is then bonded to the capillary tubes 17 by filling each tube with, for example, a heat curable epoxy. The ends of capillary tubes 17 are cleaved before they are bonded to the plates 13 so that the bond line around the fiber 18 is symmetric in the y direction. When the epoxy is finished curing, the Bragg wavelength of the grating 19 can be tuned by adjusting the y-axis micrometer 16, which tenses or compresses the grating region in the gap depending on the travel direction.

Figure 7:
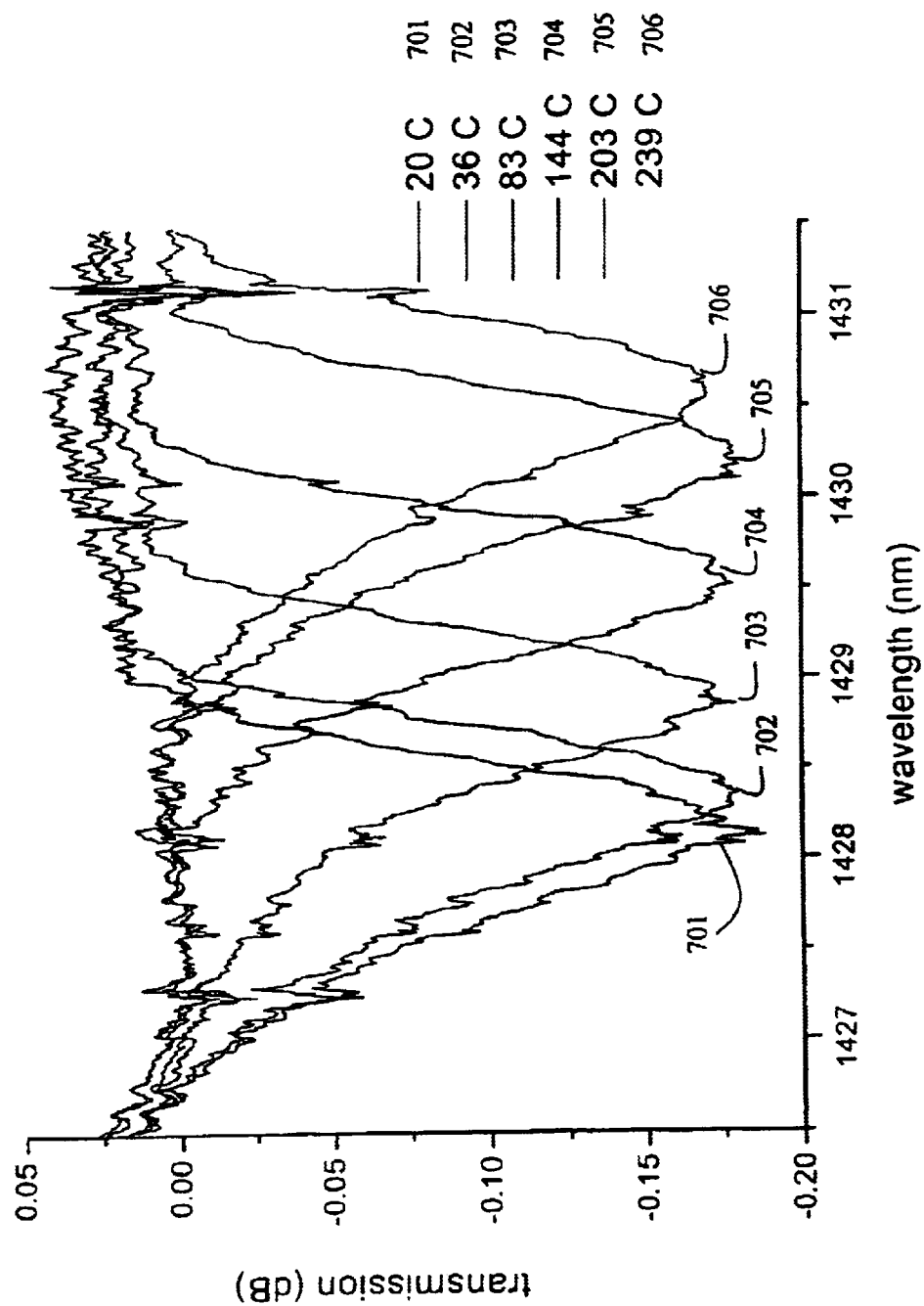
FIG. 7 is a graph showing the transmission spectrum of a heat-tuned stabilizer grating at various tuning states according to one embodiment of the present invention.

FIG. 7 is a graph showing transmission data for a heat-tuned stabilizer grating according to one embodiment of the present invention. The grating strength (4.4%) and bandwidth (~1.1 nm) are typical for known stabilizer gratings, although slightly stronger, weaker, wider, or narrower gratings may also be used, depending on the application. FIG. 7 illustrates transmission data at six different temperatures ranging from 20° C. (identified by figure element 701) to 239° C. (identified by figure element 706).

Figure 8:
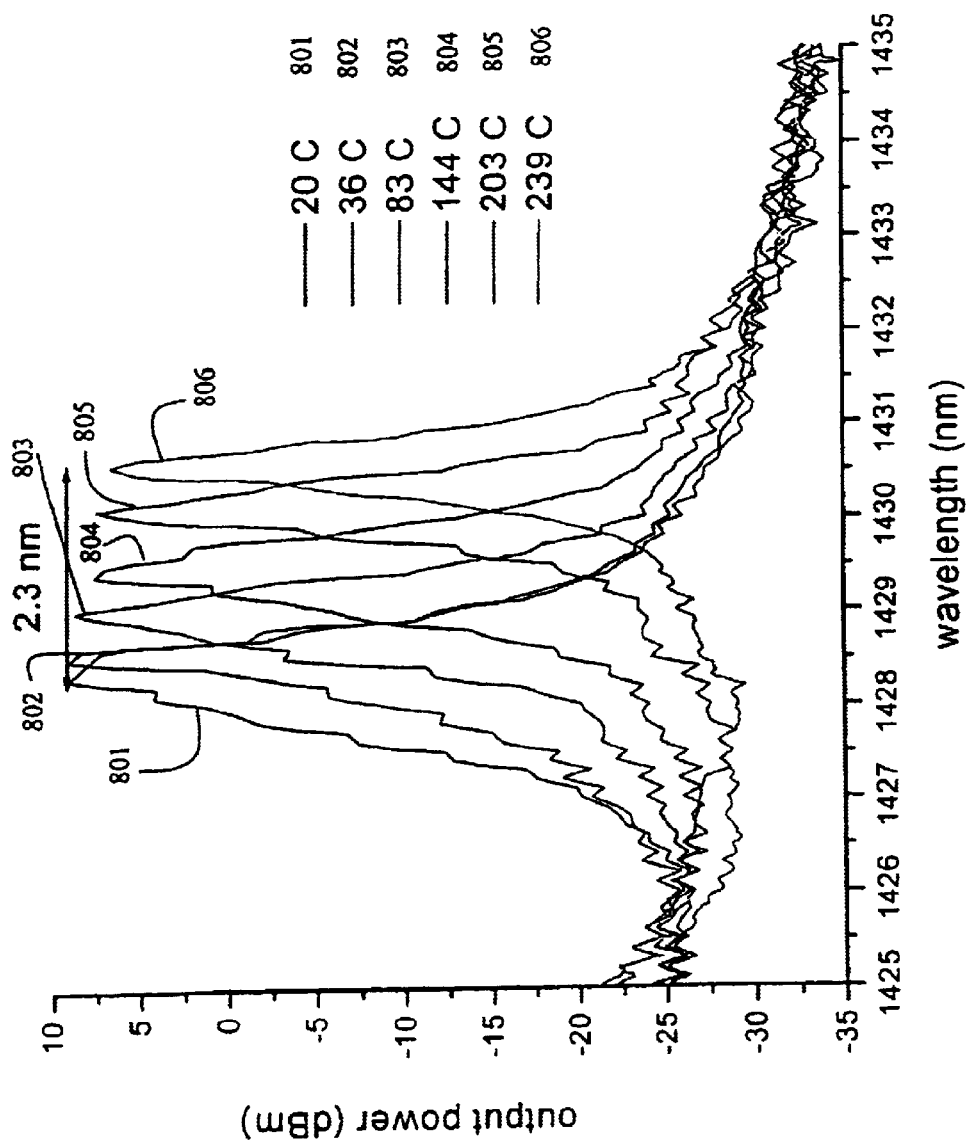
FIG. 8 is a graph showing output power for a laser diode with a stabilizer grating thermally tuned to various wavelengths according to one embodiment of the present invention.

FIG. 8 is a graph showing the output spectrum of a diode laser with the grating used to generate the graph of FIG. 7 providing feedback at the same six temperatures according to one embodiment of the present invention.

Figure 9:
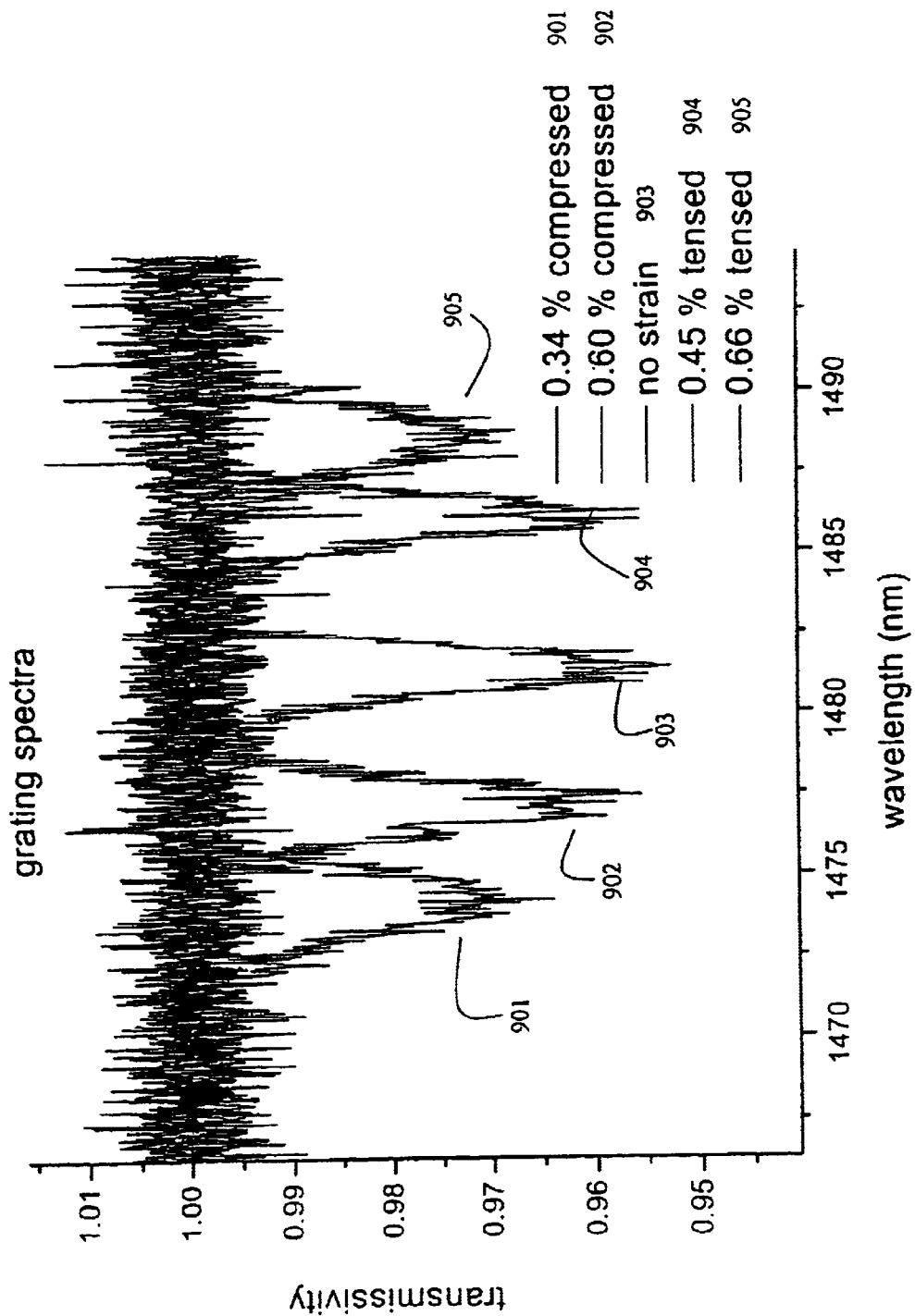
FIG. 9 is a graph showing the transmission spectrum of a strain-tuned stabilizer grating at various tuning states according to one embodiment of the present invention.

FIG. 9 is a graph showing transmission data taken for a strain-tuned stabilizer grating according to one embodiment of the present invention. The grating strength in this example is 3% and the bandwidth is ~1.7 nm. FIG. 9 illustrates transmission data at six different points ranging from 0.34% compressed (identified by figure element 901) through no strain (identified by figure element 903) to 0.66% tensed (identified by figure element 905).

Figure 10:
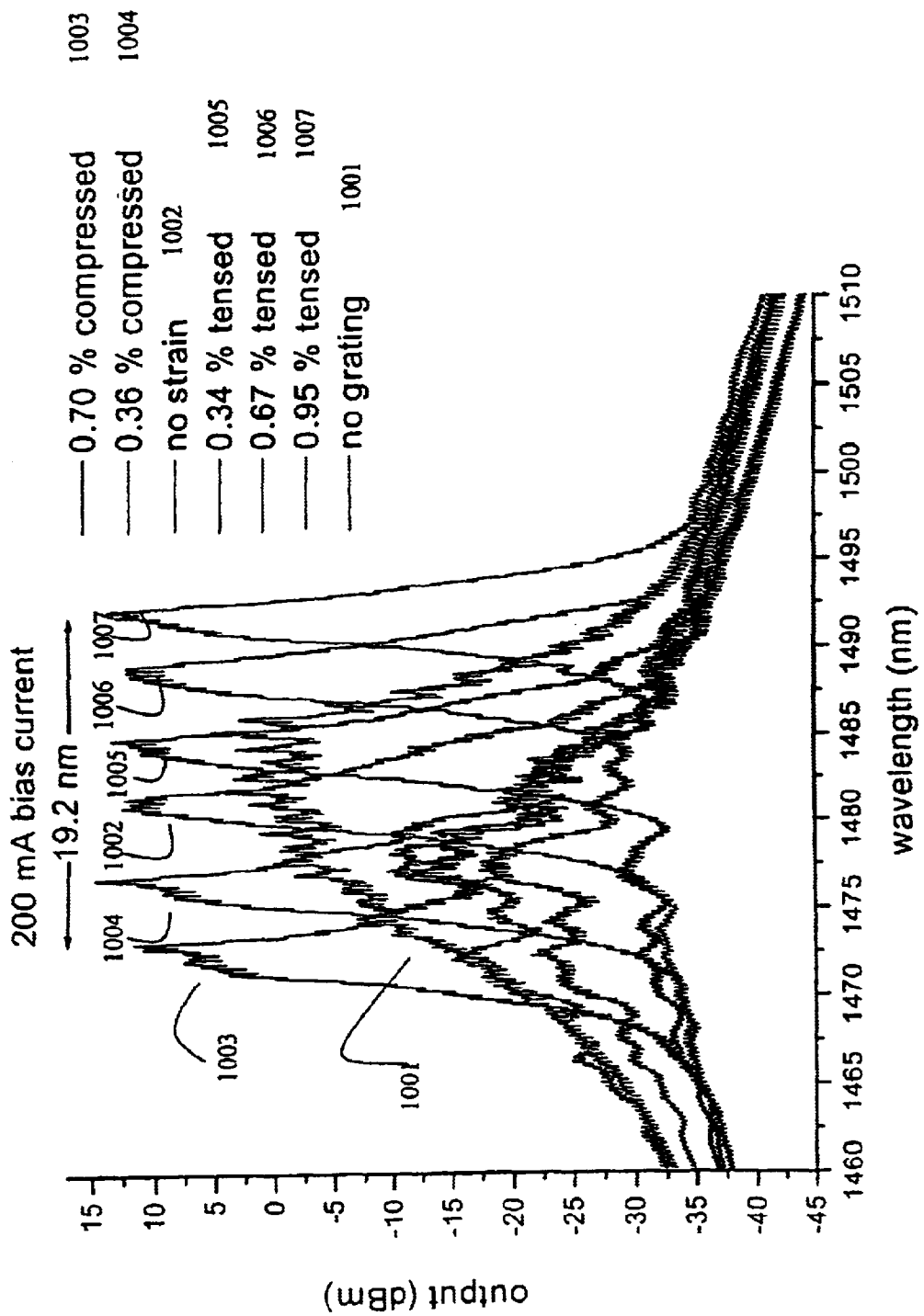
FIG. 10 is a graph showing output power for a laser diode without a stabilizer grating and with a stabilizer grating strain-tuned to various wavelengths according to one embodiment of the present invention.

FIG. 10 is a graph showing the output spectrum of a diode laser with the grating used to generate the graph of FIG. 9 providing feedback according to one embodiment of the present invention. The curve identified by figure element 1001 shows the output of the diode without a grating, has peak power of only 23 mW, and is quite broad. With the grating, however, the peak power increases to 90 mW for the same bias current. The output spectrum is also significantly narrowed with the grating, which is desirable for many applications, including use as a pump in a Raman amplifier When the grating is strain-tuned, the main lasing peak simply shifts over uniformly, as expected. The curves for various strain tunings (both compression and tensile) are illustrated by the curves identified by figure elements 1002, 1003, 1004, 1005, 1006, and 1007.

Figure 11:
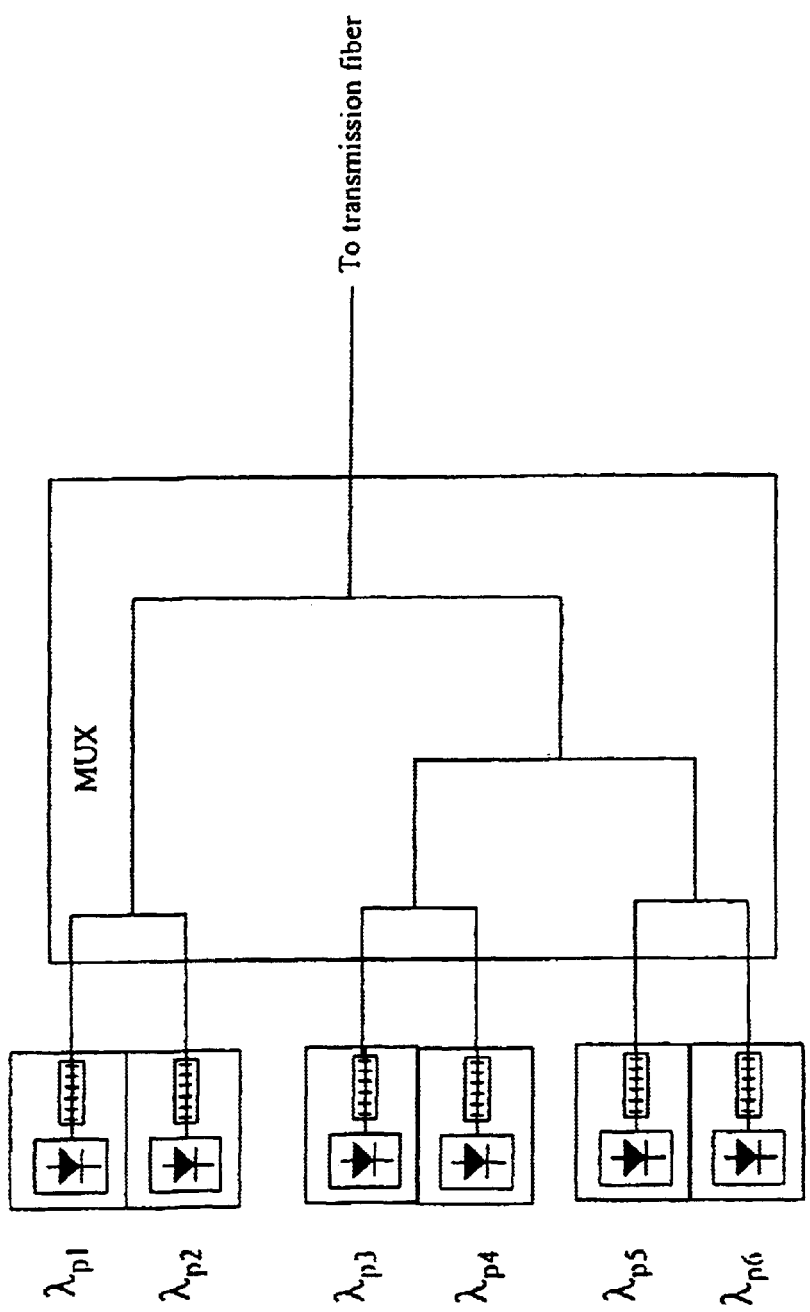
FIG. 11 is a schematic diagram of an amplifier module including a plurality of multiplexed tunable laser diodes according to one embodiment of the present invention.

FIG. 11 is an exemplary rough schematic diagram illustrating multiple Raman pumps being multiplexed onto a single transmission fiber according to one embodiment of the present invention. In this example a set of four 2×2 multiplexers is used.

Figure 12:
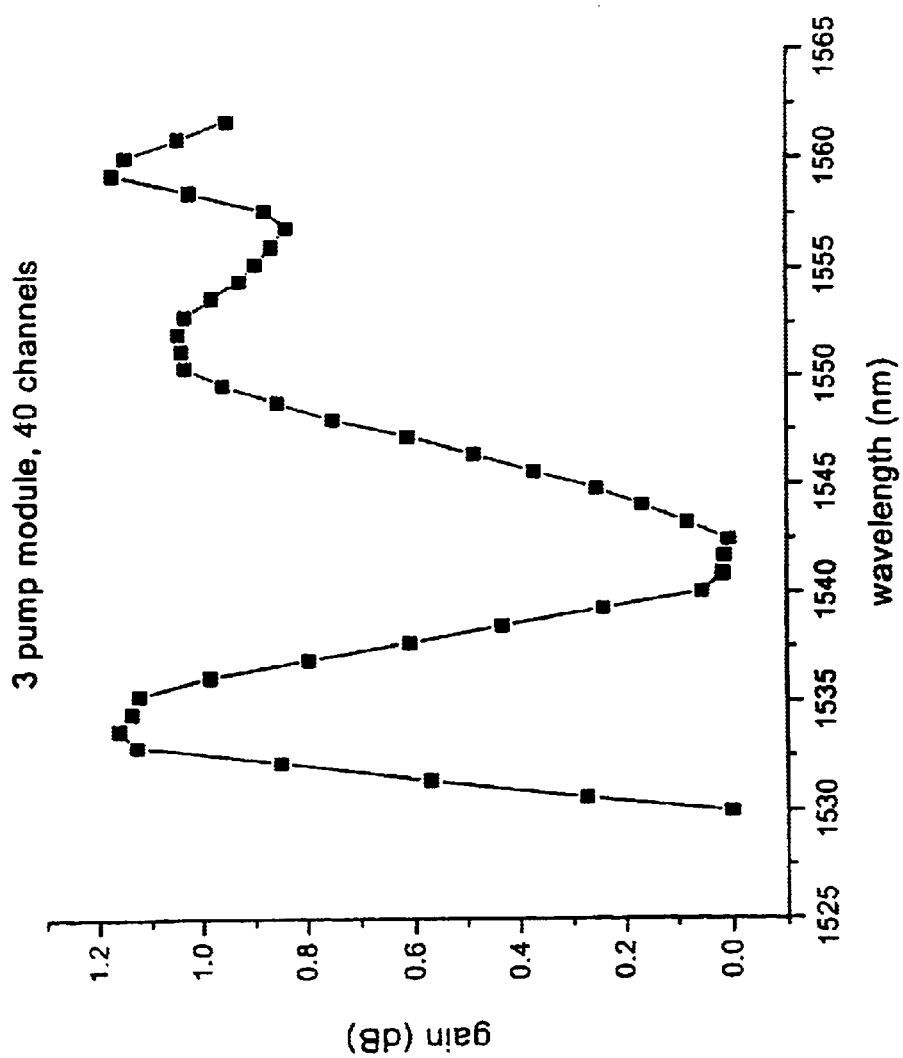
FIG. 12 is graph showing the simulated Raman gain for a 3 diode pump module amplifying 40 channels according to one embodiment of the present invention.

FIG. 12 shows a simulated optimized Raman gain spectrum for a three-diode pump module according to one embodiment of the present invention. As shown in FIG. 12, 40 channels, spaced by 100 GHz, are amplified to transparency on a 100 km length of TRUEWAVE-reduced slope fiber with a gain ripple of only 1.18 dB. The wavelengths and output powers used in this example to yield these results were 1425.9 nm @ 332.7 mW, 1451 nm @ 335 mW, and 1470 nm @ 25 mW.

Figure 13:
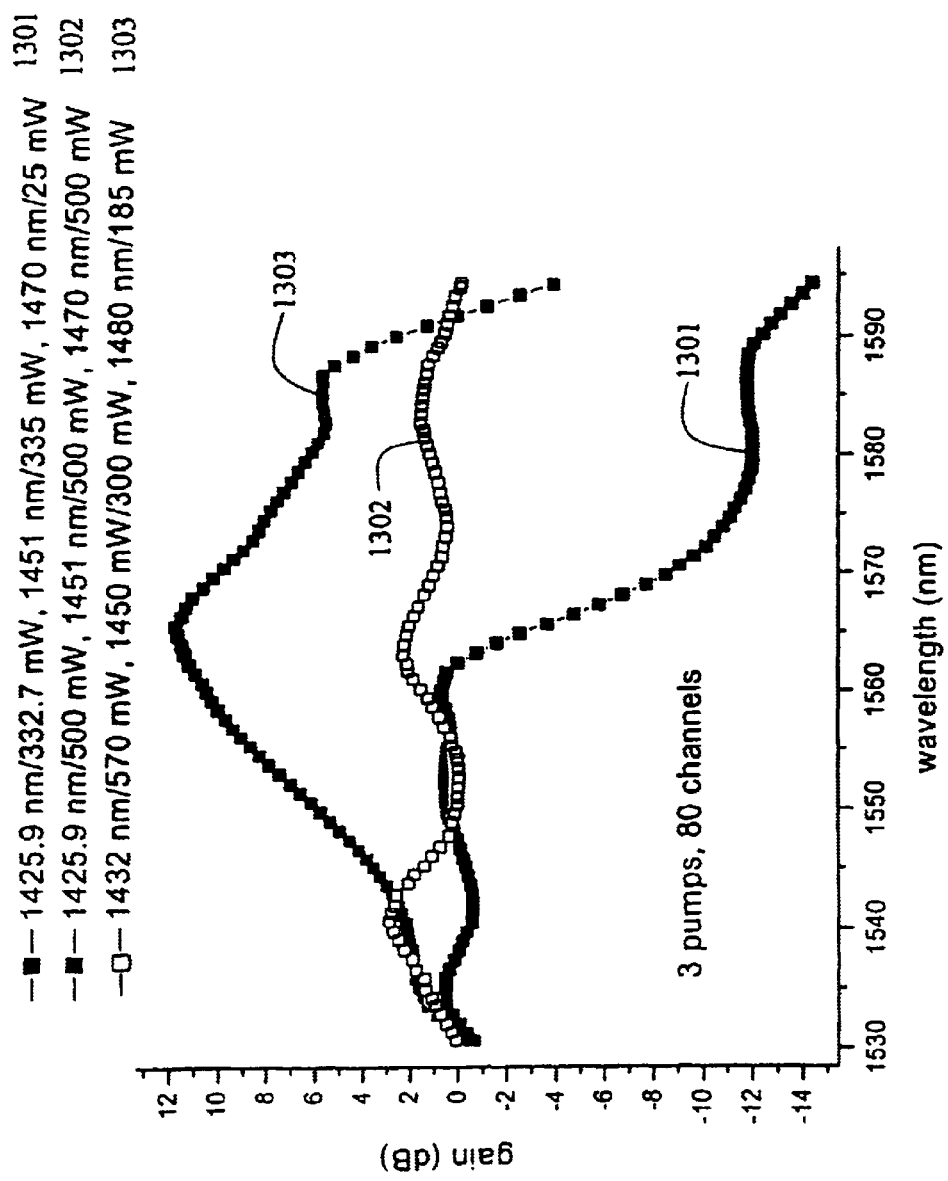
FIG. 13 is a graph showing the simulated Raman gain for a 3 diode pump module amplifying 80 channels with and without the wavelength tunability feature according to one embodiment of the present invention.

FIG. 13 is a graph illustrating that if 40 more channels at longer wavelengths were added to the system described in the context of FIG. 12, the pump configuration would no longer be adequate. This is illustrated by the curve identified by figure element 1301, where the longer wavelengths are not being amplified. The curve identified by figure element 1303 illustrates an attempt to reconfigure the pump module without using wavelength tuning (e.g., by adjusting the pump powers). In order to amplify the longer wavelengths, the 1470 nm pump power clearly needs to be increased. However, even when the 1470 nm line is increased to 400 mW, the longest wavelengths are still not amplified to transparency. Furthermore, the gain ripple approaches 15 dB, and the signal channels in the 1570 nm range are amplified so much that non-linearity problems such as self-phase modulation may arise. However, when the pump module is reconfigured using high wavelength tunability, as illustrated by the curve identified by figure element 1302, transparency can be achieved with a more reasonable gain ripple of 2.9 dB. In this example, the favorable result was primarily enabled by the fact that the long wavelength pump was tuned to be placed at 1480 nm rather than 1470 nm.

Figure 14:
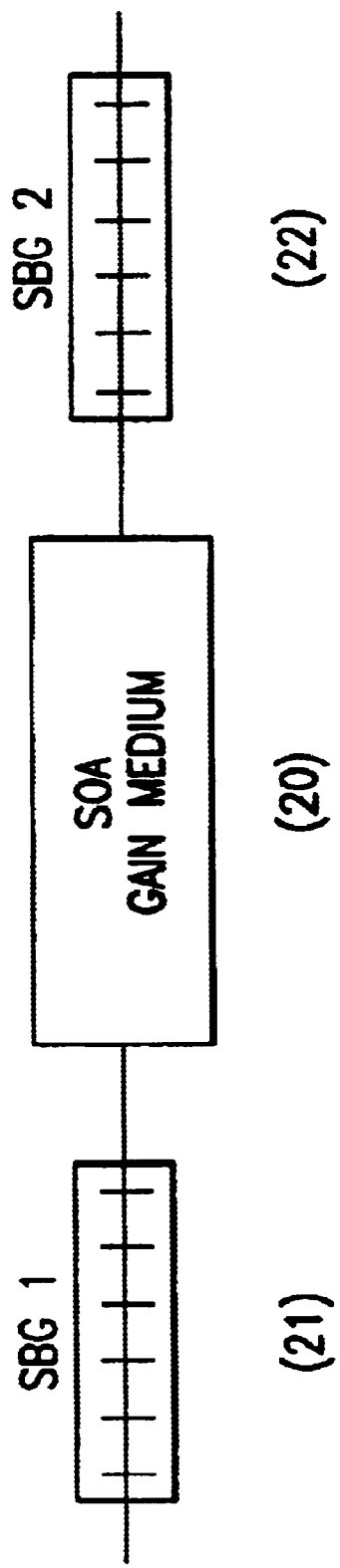
FIG. 14 is a schematic diagram of a Vernier effect distributed feedback (DFB) laser including a semiconductor optical amplifier (SOA) gain medium and two offset sampled gratings, where one of the sampled gratings is tunable according to one embodiment of the present invention.
Figure 15:
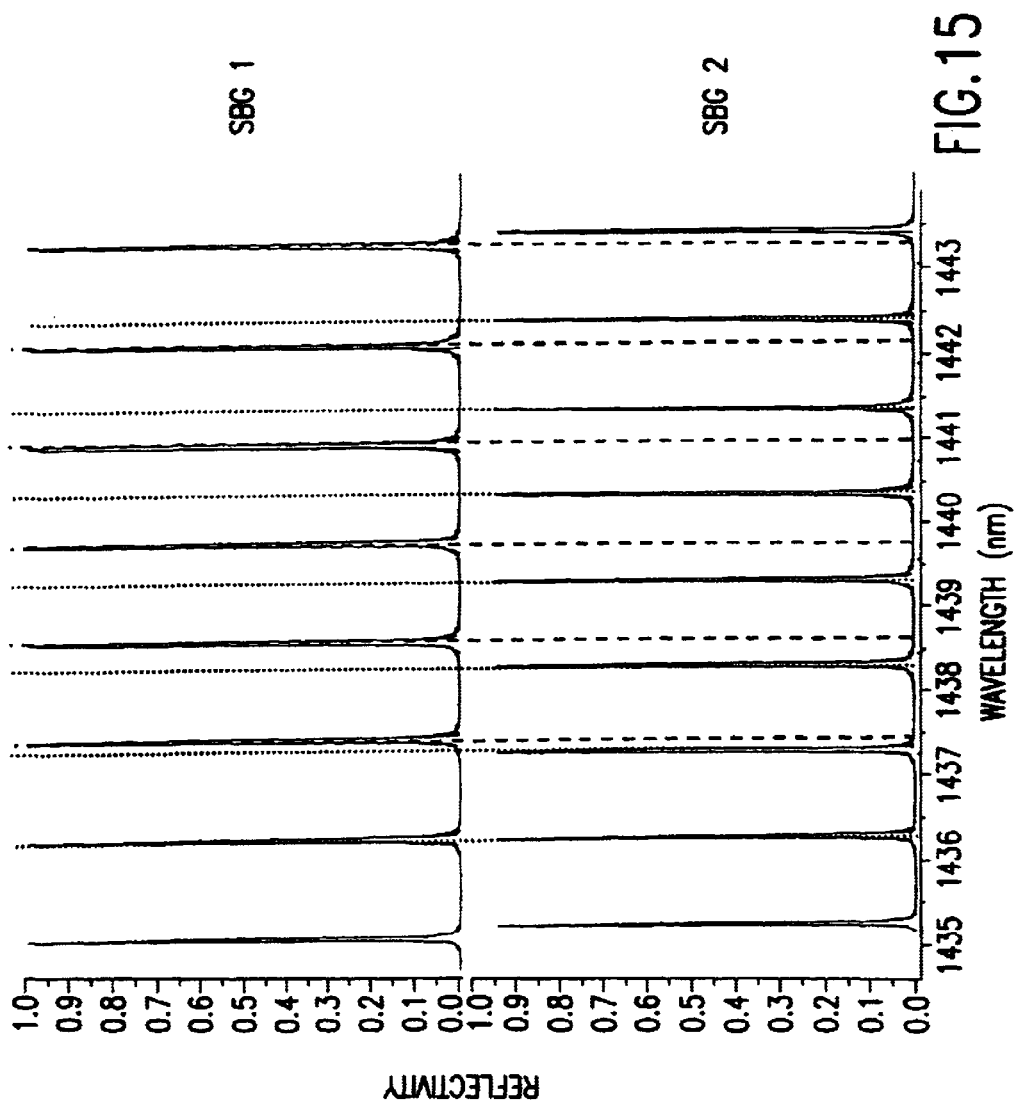
FIG. 15 is a graph showing the reflection spectra of two offset sampled gratings according to one embodiment of the present invention.

FIG. 14 illustrates an alternate heat tuning approach for tuning a fiber grating according to one embodiment of the present invention. Heat tuning can achieve a wider tunability than 2–3 nm when used with a different pump light source. Rather than using a diode laser, the light source used in the example illustrated in FIG. 14 is a semiconductor optical amplifier 20 (SOA) which acts as a gain medium. Two sampled Bragg gratings (SBG 1 21, SBG 2 22) placed on either side of the semiconductor optical amplifier 20 form the laser cavity. Sampled Bragg gratings, unlike conventional gratings, have multiple reflection peaks, the spacing between which is determined by the sampling period. Representative reflection spectra for the sampled Bragg gratings 21, 22 are illustrated in the graph of FIG. 15. Lasing in this device only occurs when two of the reflection peaks are aligned with one another. However, by using a tunable sampled Bragg grating for the second sampled Bragg grating 22, the tuning of the SBG 2 22 causes discrete jumps in the output wavelength of the laser. For example, if the second sampled Bragg grating 22 were tuned by 0.2 nm, the wavelength at which one of its peaks is aligned with the first sampled grating 21 could shift by 1 nm from the original wavelength. Accordingly, the tuning efficiency of this device is quintupled, making heat tuning a viable option for achieving wide tunability.

In some embodiments of the present invention, the tunability range of the fiber grating exceeds the bandwidth of light provided by the laser device. In one of these embodiments, when it is desirable to tune the fiber grating beyond the bandwidth of light provided, the laser device is switched out and substituted with another laser device that provides light that will be reflected by the tuned fiber grating, thereby allowing the full tunable range of the tunable fiber grating to used. In another embodiment, multiple diode/grating pairs having diffreeent tunability ranges are switched in and out to achieve a wider range of tuning. In this embodiment, the control algorithmn is simplified and losses of optical power are avoided.

Figure 16:
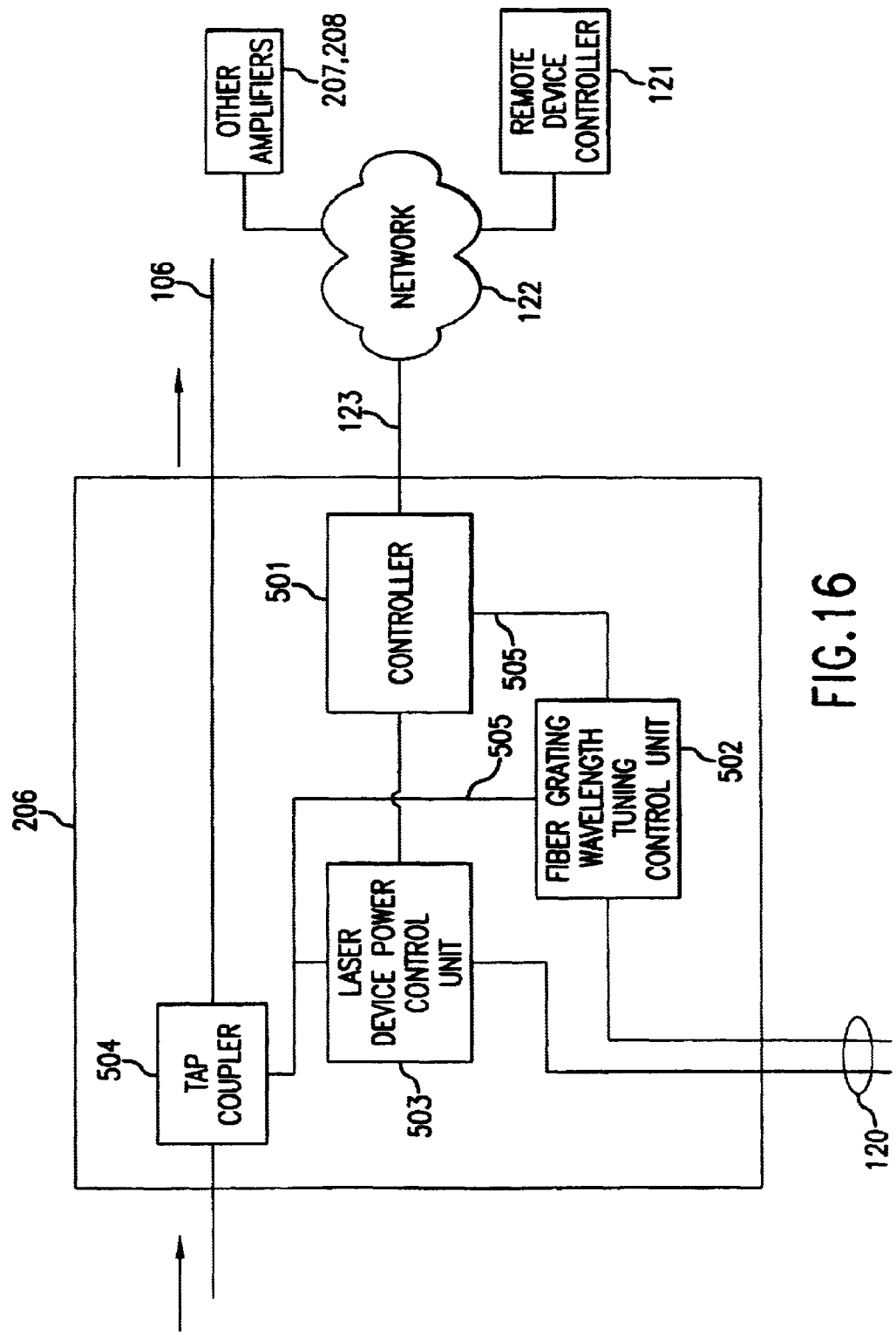
FIG. 16 is a block diagram illustrating the details of the control unit for a Raman amplifier according to one embodiment of the present invention.

FIG. 16 is a block diagram illustrating the details of the control unit 206 for a Raman amplifier according to one embodiment of the present invention. As shown in FIG. 16, the control unit 206 includes a tap coupler 504 that is connected to a fiber grating wavelength tuning control unit 502 and a laser device power control unit 503 through an optical fiber that carries a fraction of the WDM optical signal to both the fiber grating wavelength tuning control unit 502 and the laser device power control unit 503. While the tap coupler 504 is shown to be housed within the control unit 206, it may also be an external component that connects to the control unit 206. Furthermore, the separate components of the control unit 206 (i.e., the fiber grating wavelength tuning control unit 502, the laser device power control unit 503 and the controller 501) may be discrete components that need not be housed within a common control unit enclosure. Furthermore, the various components shown in FIG. 16 may be designed as either separate units, or as units made up of some combination thereof.

The fiber grating wavelength tuning control unit 502 and the laser device power control unit 503 demultiplex the WDM monitor signal (i.e., the portion of the amplified WDM signal provided by the tap coupler 504), and then convert the demultiplexed signals into electrical signals. Samples of the electrical signals are provided to the controller 501 for performing the amplification control processes (e.g., to adjust an amplitude and/or wavelength of the individual semiconductor lasers 202, 203, 204, 205). Since one of the functions performed by the control unit 206 is to monitor the actual amplification performance of the Raman amplifier 200, the fiber grating wavelength tuning control unit 502 and the laser device power control unit 503 sample the electrical signals and compare this series of samples against a target amplification performance. The sampling process performed by the fiber grating wavelength tuning control unit 502, the laser device power control unit 503, and the controller 501 does not necessarily have to be performed on a WDM channel-by-WDM channel basis. Rather, these units may perform the control processes with greater or a lesser spectral resolution than one sample set per WDM channel. The fiber grating wavelength tuning control unit 502 and the laser device power control unit 503 provide output control lines 120 for controlling the wavelengths and optical output levels of each pump laser 202, 203, 204, 205, respectively. The fiber grating wavelength tuning control unit 502 and the laser device power control unit 503 also exchange sample data and control information with the controller 501. A controller 501 is configured to connect to a data communication network 122 such as the Internet for exchanging data and control information with, for example, a remote device controller 121 and other amplifiers 207, 208.

Figure 17:
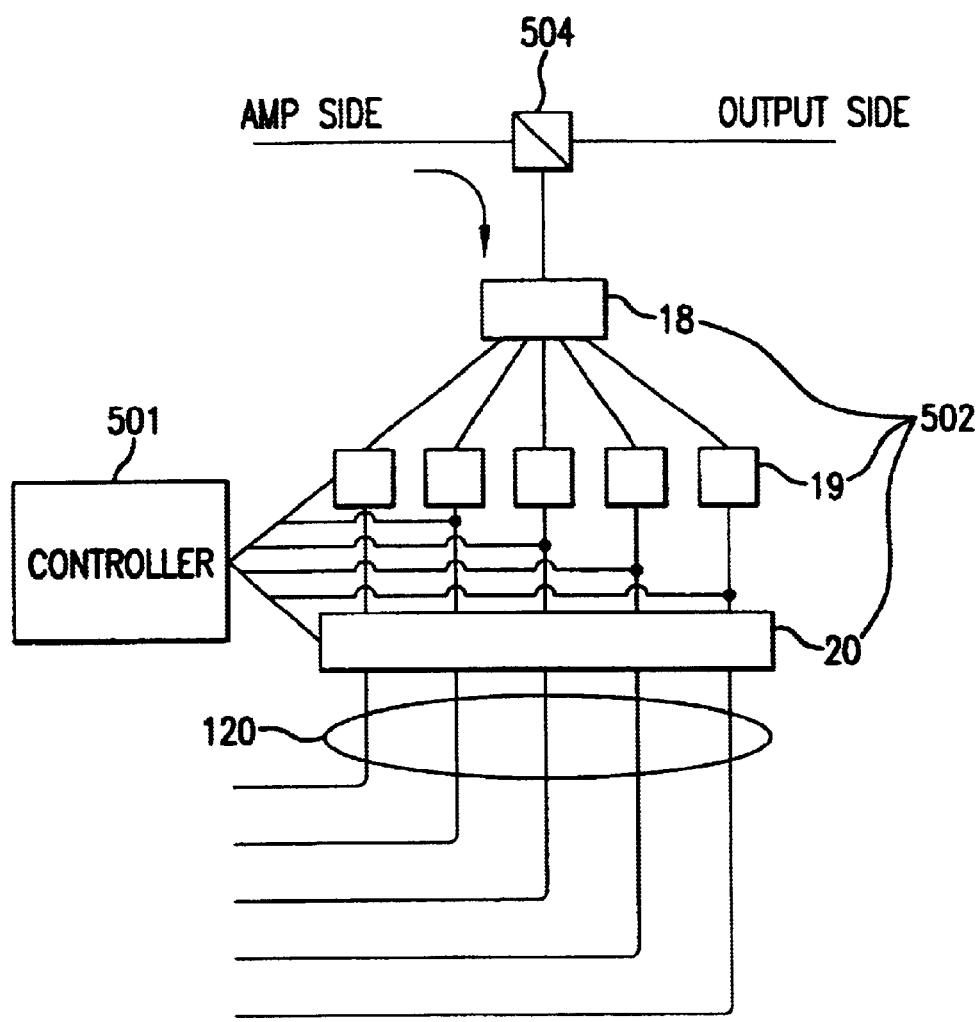
FIG. 17 is a schematic illustrating components included in the control unit according to the present invention.
Figure 18:
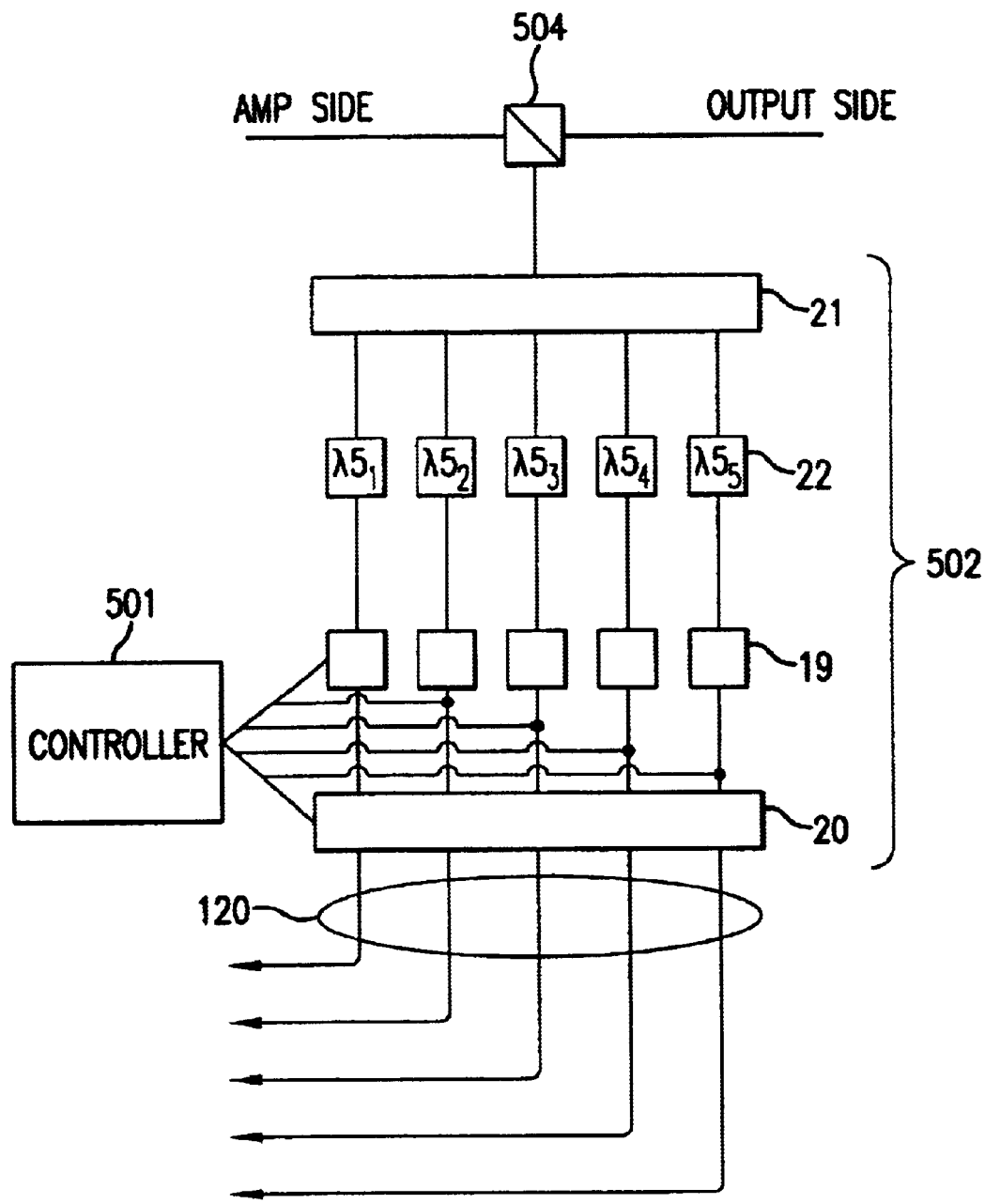
FIG. 18 is a schematic illustrating other components included in the control unit according to the present invention.

FIGS. 17 and 18 provide more detailed descriptions of subcomponents of the fiber grating wavelength tuning control unit 502. In FIG. 17, the fiber grating wavelength tuning control unit 502 includes a wavelength demultiplexer 18, an optical/electrical converting mechanisms 19 (e.g., photodiodes) and an fiber grating wavelength tuning control circuit 20 connected in series. The wavelength demultiplexer 18 separates the monitored WDM optical signal into a plurality of optical sample-signals, each having a different central wavelength. The demultiplexed optical sample may, for example, correspond to channels of the WDM signal, as discussed above. Once again, the function performed by the demultiplexer 18 is to isolate separate spectral components of the WDM signal that is being amplified by the Raman amplifier 200. For basic control schemes, the de-multiplexer 18 may only provide two sample-signals, perhaps one at shorter wavelengths within the amplification band and another at longer wavelengths in the amplification band. A limitation, however, with having too few sample-signals is that the resolution of the sampled signal is not sufficient to observe sub-bands where the gain profile of the Raman amplifier is not within a predetermined tolerance (e.g., 1 dB) of the target amplification performance. On the other hand, having too many sample-signals unnecessarily increases the expense and complexity of the processing resources in the control unit 206. Thus, as a practical guideline, the number of sample-signals to be developed is set to correspond with either a number of WDM channels to be handled by the Raman amplifier 200, or a number of pump lasers 202, 203, 204, 205 employed in the Raman amplifier 200. Thus, typical numbers of sample-signals developed by the de-multiplexer for dense WDM signals will range between about 10 to 100. However, smaller numbers, such as 2 mentioned above, or up to, or exceeding, 1000 are possible as well.

The optical/electrical converting mechanisms 19 convert the demultiplexed optical sample signals into electrical signals. Output currents provided by the converting mechanisms 19 vary depending on the respective magnitudes of the demultiplexed sample-signals. The controller 501 receives the electrical currents via a bus 505, where the controller 501 then samples the respective currents to create a digital rendition of the sample-signals. Alternatively, the controller 501 receives the digital rendition of the sample-signals from the fiber grating wavelength tuning control circuit 20 which digitizes the sample-signals. Likewise, the converting mechanisms 19 provide a digitized output.

The fiber grating wavelength tuning control circuit 20 is shown to be a separate controller from controller 501, but the two can be incorporated into a single processor-based controller. As shown in FIG. 17, however, the controller 501 is configured to implement a digital signal processor based-embedded controller, while the main analog processing is performed in the fiber grating wavelength tuning control circuit 20. For example, in one embodiment of the present invention, the controller 501 holds in memory appropriate tuning values corresponding to a certain strain and/or heat tuning of the individual tunable fiber gratings 209, 210, 211, 212 that achieves a particular target central wavelength to be provided by the individual pump lasers 202, 203, 204, 205. Once the tuning values are identified, the controller 501 then informs the fiber grating wavelength tuning control circuit 20 (either via a digital message or separate analog signals), so the fiber grating wavelength tuning control circuit 20 may control the tunable fiber gratings 209, 210, 211, 212 to produce the desired pump laser wavelength. However, in another embodiment, the fiber grating wavelength tuning control circuit 20 may operate digitally and may itself hold in memory the tuning values that are associated with achieving the target output central wavelength. In this case, the fiber grating wavelength tuning control circuit 20 dispatches control signals to the tunable fiber gratings 209, 210, 211, 212, which contain their own wavelength tuning circuits that respond to the control signals or are interconnected with separate wavelength tuning circuits.

FIG. 18 illustrates another exemplary embodiment of the control unit 206. Unlike the embodiment of FIG. 17, the embodiment of FIG. 18 includes a power splitter 21 and bandpass filters 22. The power splitter 21 splits the monitored WDM optical signal branched by the tap coupler 504 into a plurality of sample-signals. For example, the power splitter 21 may be configured to divide the branched WDM signal into a corresponding number of channels of the WDM signal. The bandpass filters 22 have different central wavelengths and fixed-width passbands that only permit the portion of the respective sample-signals having optical energy within the specific passband to pass therethrough. The optical/electrical converters 19, controller 501 and fiber grating wavelength tuning control circuit 20 are like that described above in reference to FIG. 17.

Figure 19:
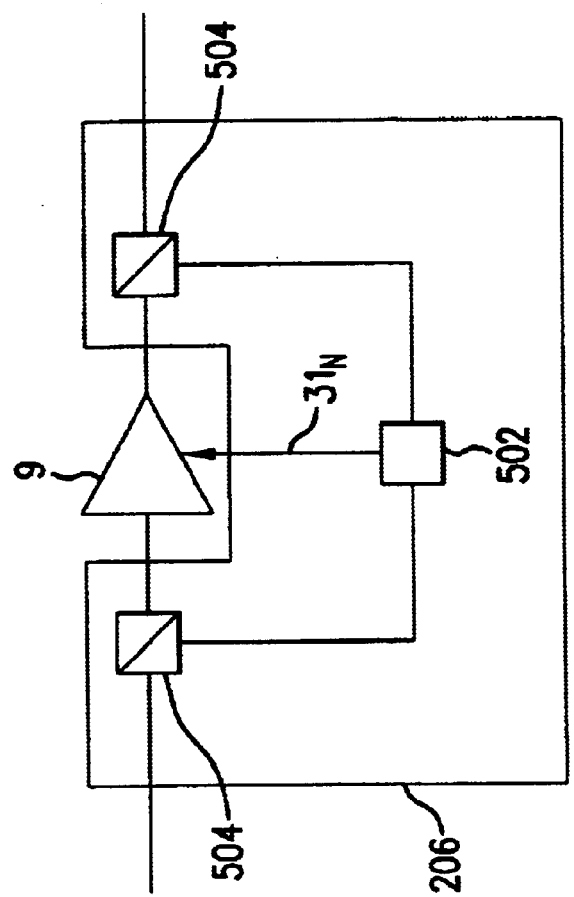
FIG. 19 is a schematic which illustrates controlling an output power from a Raman amplifier by monitoring optical signals input to and output from the Raman amplifier.

It should be noted that although the discussion has been primarily focused on sampling the amplified output from the Raman amplifier 200 to perform the control operation, the control unit 206 may also sample the input signal to the Raman amplifier 200, as shown in FIG. 19. By directly measuring the input optical signal and the output optical signal, the control unit 206 is able to establish a direct measurement of amplifier gain, and the profile of the amplification gain. As an alternative to measuring the profile of the amplification gain, the controller 501 may receive a message from a downstream Raman amplifier which describes an output level of the WDM signal as it leaves Raman amplifier. Since the fiber loss characteristics are generally known for the fiber that interconnects two amplifiers, the controller 501 in the downstream amplifier can calculate the apparent level of the WDM signal that is input to that downstream Raman amplifier.

Figure 20:
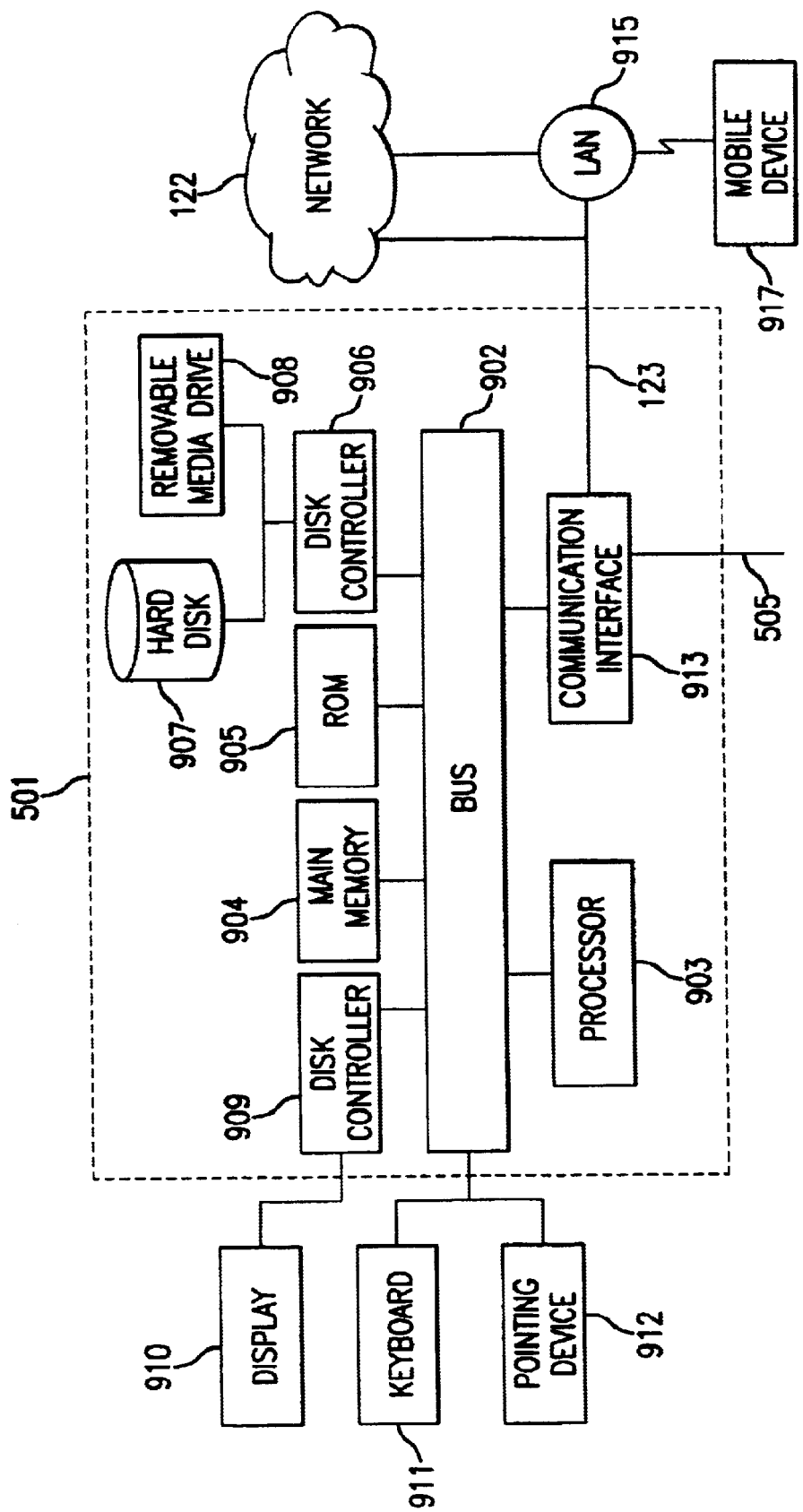
FIG. 20 is a schematic illustrating a computer system included in the control unit according to the present invention.

FIG. 20 illustrates an exemplary embodiment of a processor based controller 501. The controller 501 includes a bus 902 or other communication mechanism for communicating information, and a processor 903 coupled with the bus 902 for processing the information. The controller 501 also includes a main memory 904, such as a random access memory (RAM) or other dynamic storage device (e.g., dynamic RAM (DRAM), static RAM (SRAM), and synchronous DRAM (SDRAM)), coupled to the bus 902 for storing information and instructions to be executed by processor 903. In addition, the main memory 904 may be used for storing temporary variables or other intermediate information during the execution of instructions by the processor 903. The controller 501 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The controller 501 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the controller 501 using an appropriate device interface (e.g., small computer system interface (SCSI), integrated device electronics (IDE), enhanced-IDE (E-IDE), direct memory access (DMA), or ultra-DMA).

The controller 501 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The controller 501 may also include a display controller 909 coupled to the bus 902 to control a display 910, such as a cathode ray tube (CRT), for displaying information to a computer user. The computer system includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the controller 501.

The controller 501 performs a portion or all of the processing steps of the invention in response to the processor 903 executing one or more sequences of one or more instructions contained in a memory, such as the main memory 904. Such instructions may be read into the main memory 904 from another computer readable medium, such as a hard disk 907 or a removable media drive 908, or downloaded from another processor, for example, the remote device controller 121. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the controller 501 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the controller 501, for driving a device or devices for implementing the invention, and for enabling the controller 501 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 903 for execution. A computer readable medium may take many forms, including but not limited to, non-volatile media, volatile media, and transmission media. Non-volatile media includes, for example, optical, magnetic disks, and magneto-optical disks, such as the hard disk 907 or the removable media drive 908. Volatile media includes dynamic memory, such as the main memory 904. Transmission media includes coaxial cables, copper wire and fiber optics, including the wires that make up the bus 902. Transmission media also may also take the form of acoustic or light waves, such as those generated during radio wave and infrared data communications.

Various forms of computer readable media may be involved in carrying out one or more sequences of one or more instructions to processor 903 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the controller 501 may receive the data on the telephone line and use an infrared transmitter to convert the data to an infrared signal. An infrared detector coupled to the bus 902 can receive the data carried in the infrared signal and place the data on the bus 902. The bus 902 carries the data to the main memory 904, from which the processor 903 retrieves and executes the instructions. The instructions received by the main memory 904 may optionally be stored on storage device 907 or 908 either before or after execution by processor 903.

The controller 501 also includes a communication interface 913 coupled to the bus 902. The communication interface 913 provides a two-way data communication coupling to a network link 123 that is connected to, for example, a local area network (LAN) 915, or to another communications network 122 such as the Internet. The communication interface 913 also provides a two-way coupling to the fiber grating wavelength tuning control unit 502 and the laser device power control unit 503 via the bus 505. The communication interface 913 may be a network interface card to attach to any packet switched LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 123 typically provides data communication through one or more networks to other data devices. For example, the network link 123 may provide a connection to a another computer through a local network 915 (e.g., a LAN) or through equipment operated by a service provider, which provides communication services through a communications network 122. The local network 123 and the communications network 122 use, for example, electrical, electromagnetic, or optical signals that carry digital data streams. The signals through the various networks and the signals on the network link 123 and through the communication interface 913, which carry the digital data to and from the controller 501, are exemplary forms of carrier waves transporting the information. The controller 501 can transmit and receive data, including program code, through the network(s) 915 and 122, the network link 123 and the communication interface 913. Moreover, the network link 123 may provide a connection through a LAN 915 to a mobile device 917 such as a personal digital assistant (PDA) laptop computer, or cellular telephone.

Figure 21:
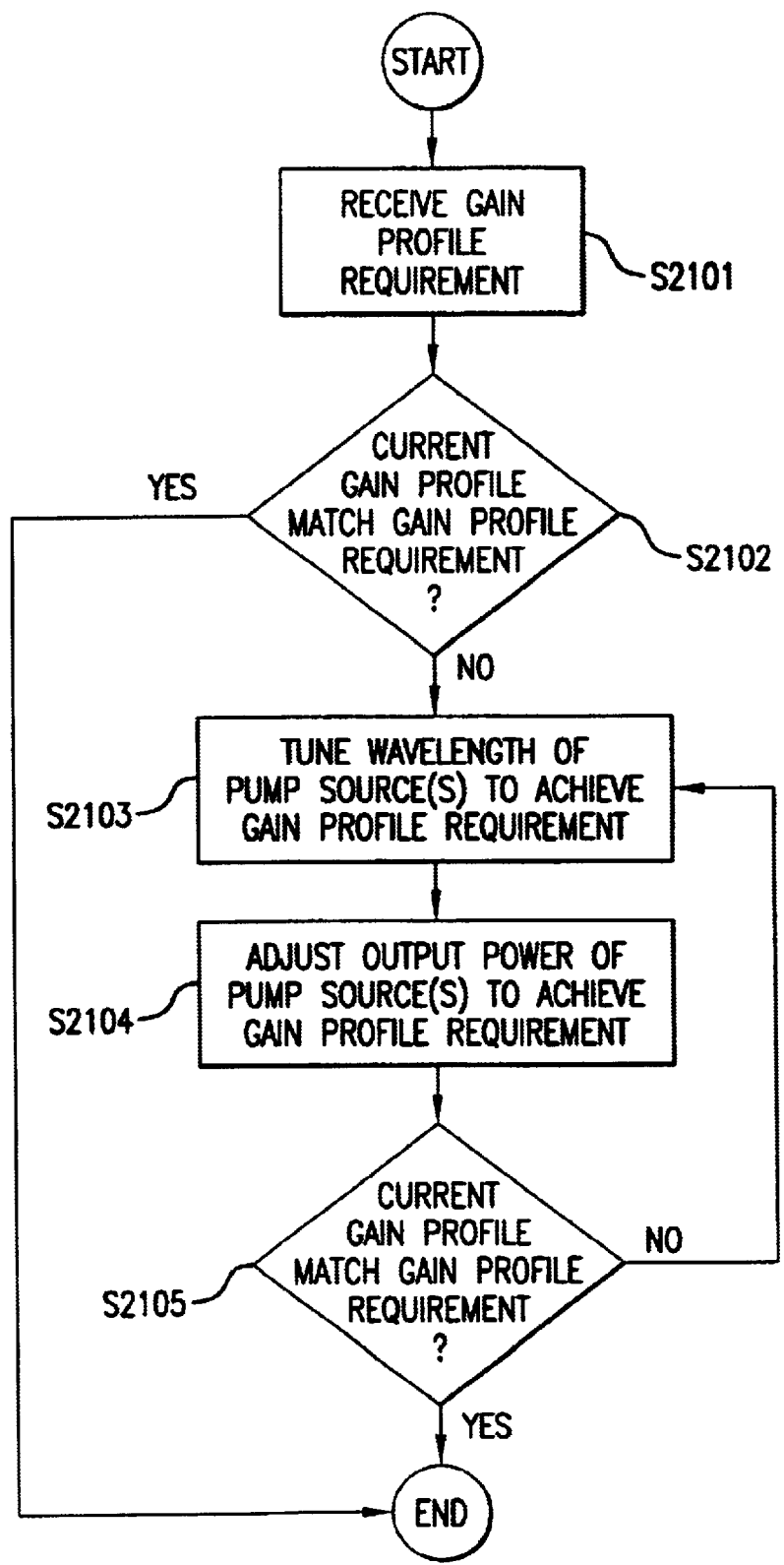
FIG. 21 is a flowchart illustrating an exemplary high level control process performed by a control unit according to one embodiment of the present invention.

FIG. 21 is a flowchart illustrating an exemplary high level control process performed by the control unit 206 according to one embodiment of the present invention. As shown in FIG. 21, the process begins with step S2101 where a gain profile requirement is received by the control unit 206. As discussed above, the gain profile may be stored locally in the control unit 206, or may be received, for example, from a remote device controller 121 via the network connection 123 to the network 122. The gain profile requirement may be an initial gain profile requirement, or may reflect a change in a current gain profile requirement. The gain profile requirement identifies a target performance for one or more pumping devices 201 under the control of the control unit 206.

Once the gain profile requirement has been received, the process proceeds to step S2102, where it is determined whether the current gain profile matches the gain profile received in step S2101. If it is determined that the current gain profile matches the received gain profile (i.e., "Yes" at step S2102), the process ends. If, on the other hand, it is determined that the current gain profile does not match the received gain profile requirement (i.e., "No" at step S2102), the process proceeds to step S2103. At step S2103, the control unit 206 generates control signals and transmits them via the bus 120 to one or more pumping devices 201 to tune the wavelengths of one or more pump sources 202, 203, 204, 205 to achieve the required gain profile. If the pumping device 201 includes more than one pump source 202, 203, 204, 205, the control signals generated by the control unit 206 will be directed to the appropriate pump source 202, 203, 204, 205 to tune the wavelengths of those individual pump sources 202, 203, 204, 205.

In one embodiment of the present invention, the tuning of the individual pump sources 202, 203, 204, 205 provided by the control unit 206 is a continuous tuning capability. The tuning implemented in some cases is a "fine tuning" where, for example, a particular pump source 202, 203, 204, 205 has drifted from its targeted central wavelength and is corrected to its proper wavelength. In other cases, the control unit 206 implements an entirely new gain profile that requires a significant change in the central wavelength of one or more of the pump sources 202, 203, 204, 205.

Once the wavelengths have been tuned, the process proceeds to step S2104 where the control unit 206 similarly adjusts the output power of one or more pump sources 202, 203, 204, 205 in order to achieve the required gain profile. As with the tuning of the wavelengths, the control signals will be provided to the appropriate pump sources 202, 203, 204, 205 via the bus 120. After the wavelengths and output power of the appropriate pump sources 202, 203, 204, 205 have been adjusted, the process proceeds to step S2105 where, as in step S2102, the current (i.e., adjusted) gain profile is compared with the required gain profile received in step S2101. If it is determined that the current gain profile matches the required gain profile (i.e., "Yes" at step S2105), the process ends. If, on the other hand, it is determined that the current gain profile does not match the required gain profile (i.e., "No" at step S2105), the process returns to step S2103 where the wavelengths and output power of appropriate pump sources 202, 203, 204, 205 are further tuned and adjusted.

Figure 22:
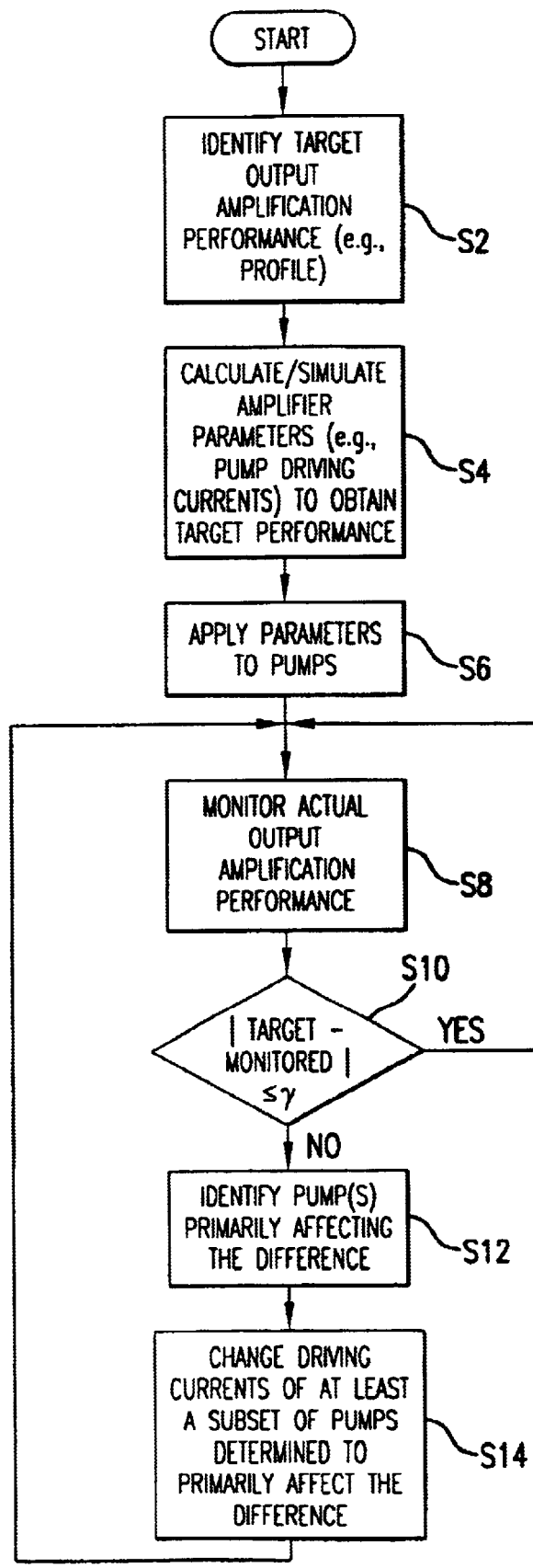
FIG. 22 is a flowchart illustrating a control operation of the Raman amplifier according to the present invention.

FIG. 22 is a flowchart illustrating an operational process performed by the control unit 206. This control process is followed for (1) establishing a predetermined target amplification performance (e.g., an amplification profile or output signal power profile over a predetermined amplification bandwidth), (2) monitoring whether an actual amplification performance is within a predetermined tolerance of the target amplification performance, and (3) taking corrective action when the actual amplification performance is not within the predetermined tolerance. In particular, steps S2, S4 and S6 respectively identify the target output amplification performance, determine the amplifier parameters (e.g., pump laser central wavelengths) that are used to achieve the target output amplification performance and apply the parameters to achieve the target performance. Steps S8, S10, S12, and S14 are directed to ensuring that the actual amplification performance stays within a predetermined tolerance of the target amplification profile and/or at least adopts an acceptable profile shape (such as a flat or tilted profile slope).

As shown in FIG. 22, the process begins with step S2 where an input WDM optical signal characteristic (e.g., a mean optical signal level measured in sub-bands of the amplification band) and an (initial) target amplification performance are provided to, and/or generated by, the control unit 206 and stored in a memory, for example, the main memory 904. The target amplification performance may be represented by a series of values indicative of a predetermined gain profile that is set by a system operator to achieve a desired system performance. As would be understood by those of ordinary skill in the optical communication art, the gain profile includes both wavelength and amplitude information. Since gain relates to the level of an output signal relative to an input signal, the input signal level is identified either directly or indirectly, as will be discussed below. Moreover, if the system operator intends to have the Raman amplifier operate with a predetermined gain profile, the input WDM optical signal characteristic is first determined in one of several ways, discussed below.

The WDM signal level may be measured directly at an input to the Raman amplifier 200. In this case, the control unit 206 can determine whether the target gain is achieved by comparing the target gain to a ratio of a measured output signal from the Raman amplifier 200 to the level of the optical signal applied to the Raman amplifier 200. As an alternative to a direct measurement of the input signal level, the signal level may be obtained from an output signal level reported to the Raman amplifier 200 from a downstream Raman amplifier (e.g., other amplifiers 207, 208), less an estimated, or measured, amount of attenuation due to fiber loss between the two Raman amplifiers. Still further, the input level may be inferred from a process employed by the control unit 206 in which a signal of known power is input to the Raman amplifier 200 and then an amount of driving current applied to respective pump lasers to produce a predetermined output level measured at the output of the subject Raman amplifier 200 is identified and saved in memory. Subsequently, the amount of amplification may be estimated from a change in the amount of driving current relative to the values stored in memory. This latter process may be performed as an initial step during a built-in test procedure or during a calibration operation, for example. As another alternative, a target output WDM optical signal characteristic may be provided from an external source and stored in memory instead of the target amplification performance. In this case, the target amplification performance is calculated from an input WDM optical signal characteristic and a target output WDM optical signal characteristic and stored in a memory of the controller 501. The target amplification performance and input WDM optical signal characteristic may be provided, stored, and read, for example, from the main memory in the control unit 206 during operational conditions.

After the target amplification performance, as well as associated parameters are obtained in step S2, the process then proceeds to step S4. In step S4, the amplifier parameters to achieve the target amplification performance are determined by contemporaneous calculation/simulation, or by referencing a look-up table that holds parameters that were previously determined and stored for various conditions. In the present discussion, the amplifier parameters will be described as tunable fiber grating control values that are used to tune the tunable fiber gratings 209, 210, 211, 212, by, for example, straining or heating the tunable fiber gratings 209, 210, 211, 212.

While the present discussion has focused on associating tunable fiber grating wavelength tuning control values with a target amplification performance, there are additional operational conditions that the control unit 206 may consider, such as internal losses inherent in the optical signal measurement operation, fiber losses, pump-to-pump interaction or aging of the pump lasers. To compensate for these additional conditions, such as fiber loss (attenuation), sets of tunable fiber grating wavelength tuning control values are pre-set and stored in memory. The sets of tunable fiber grating wavelength tuning control values correspond with various gain profiles that are available for selection so as to compensate for the fiber loss, etc.

Figure 23:
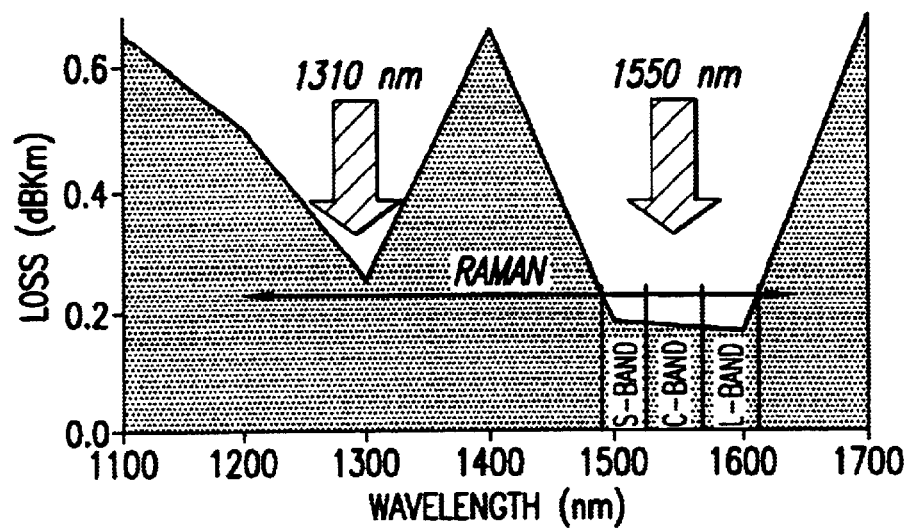
FIG. 23 is a graph illustrating a wavelength-dependency characteristic of fiber loss in an optical fiber.
Figure 24:
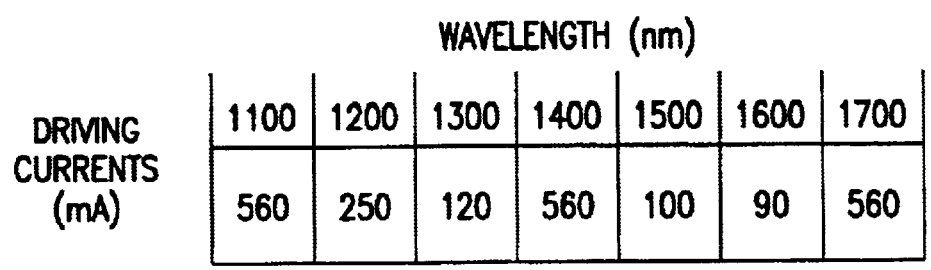
FIG. 24 is a fiber loss data table used by the control unit according to the present invention.

By way of example as shown in the Nov. 28, 2000 publication "Photonics" by CIBC World Markets, FIG. 23 shows that it is known that an amount of attenuation in an optical fiber at 1400 nm is much greater than at 1500 nm. The conventional approach for dealing with this difference in attenuation is to simply use the part of the spectrum that has minimal attenuation. The present inventors take a different approach by employing an amplification profile that compensates for the non-uniform attenuation characteristics in the transmission band. As seen in FIG. 24, the main memory 904 holds a greater driving current (560 mA) for the pump laser having a peak Raman gain at 1400 nm, than the driving current (100 mA) for the pump having a peak Raman gain at 1500 nm, where the fiber loss is much less. Thus, by using a table such as that shown in FIG. 24, the driving currents can be determined so as to achieve the target amplification performance. Other parameters that affect the target profile, such as the tunable fiber grating wavelength tuning control values corresponding to, for example, an amount of strain or heat to apply to the tunable fiber grating 209, 210, 211, 212, can also be stored in a data table in the memory of the controller 501.

There are simulation programs (e.g., OptSim by ARTIS Software) commercially available which can initially calculate the necessary tunable fiber grating wavelength tuning control values to achieve the desired output profile. For example, the optical power around a particular frequency in a WDM system may be expressed by the following equation:

$$\frac{dP_\nu^\pm}{d\nu} = -\alpha_\nu P_\nu^\pm + \varepsilon_\nu P_\nu^\mp + P_\nu^\pm \sum_{\mu>\nu} \frac{g_{\mu\nu}}{A_\mu}(P_\mu^+ + P_\mu^-) + \qquad (1)$$

$$2h\nu \sum_{\mu>\nu} \frac{g_{\mu\nu}}{A_\mu}(P_\mu^+ + P_\mu^-)\left[1 + \frac{1}{\exp\left[\frac{h(\mu-\nu)}{kT}\right]-1}\right] -$$

$$P_\nu^\pm \sum_{\mu<\nu} \frac{\nu}{\mu} \frac{g_{\nu\mu}}{A_\nu}(P_\mu^+ + P_\mu^-) -$$

$$4h\nu P_\nu^\pm \sum_{\mu<\nu} \frac{g_{\nu\mu}}{A_\nu}\left[1 + \frac{1}{\exp\left[\frac{h(\nu-\mu)}{kT}\right]-1}\right]$$

where subscripts $\mu$ and $\nu$ denote optical frequencies, superscripts "+" and "−" denote forward- and backward-propagating waves, respectively, $P_\nu$ is optical power around $\nu$, which is the product of power spectral density at $\nu$ and infinitesimal bandwidth $d\nu$. $\alpha_\nu$ is attenuation coefficient, $\epsilon_\nu$ is Rayleigh backscattering coefficient, $A_\nu$ is effective area of optical fiber at frequency $\nu$, $g_{\mu\nu}$ is a Raman gain parameter at frequency $\nu$ due to the pump at frequency $\mu$, h is Planck's constant, k is Boltzmann constant, and T is temperature. This equation is expected to include almost all conceivable effects observable in real systems, such as pump-to-pump and signal-to-signal Raman interactions, pump depletions due to Raman energy transfer, Rayleigh backscattering, fiber loss, spontaneous emission noise and blackbody radiation noise. In one embodiment of the present invention, the main memory 904 of the controller 501 holds computer readable instructions that have the above equation (1) encoded therein. These instructions are executed by the processor 903 so as to simulate a target amplification performance based on the aggregate amplification effects provided by the different pump lasers 202, 203, 204, 205.

FIGS. 25, 26A, 26B, and 27 will now be referred to when explaining an exemplary process of how to set a target amplification performance including both amplitude and wavelength of step S4 in FIG. 22. FIGS. 25, 26A, 26B and 27 illustrate a superposition principle that is used in one embodiment according to the present invention to determine the appropriate conditions (e.g., center wavelength of pumps, pump output powers) needed to obtain a flat (or arbitrarily shaped) Raman amplification performance.

Figure 25:
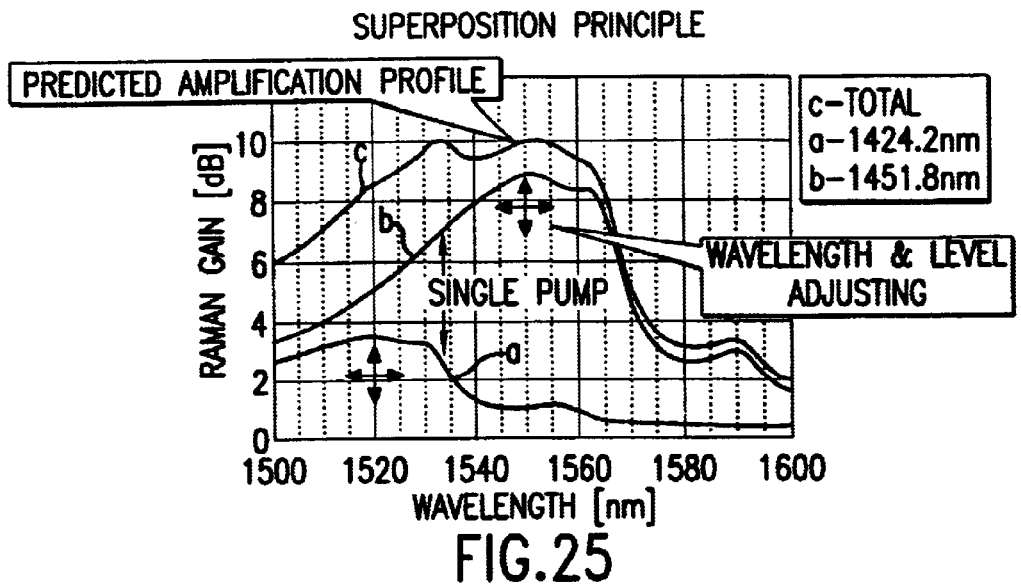
FIG. 25 is a graph illustrating a superposition principle for predicting a Raman amplification profile according to the present invention.

FIG. 25 is a graph showing individual and composite Raman gain profiles versus wavelength for two pump lasers, operating at 1424.2 nm and 1451.8 nm. The pump lasers may be referred to as YYXX lasers (YY being in a range of 13 through 15 and XX being in a range of 00 through 99). As an example, for producing a Raman gain in the S-Band through L-band, the YYXX lasers may be referred to as 14XX pump lasers (e.g., 1400 nm to 1499 nm). The Raman amplification gain profile due to the single pump laser operating at a central wavelength of 1424.2 nm is shown as profile "a" in FIG. 25. Likewise, an amplification profile due to a single pump laser operating at a central wavelength of 1451.8 nm is shown as profile "b". The total Raman amplification profile due to the simultaneous operation of both pumps is shown as profile "c" and is determined via the superposition principle (i.e. the profiles are additive). That is, according to the superposition principle, the amplification profiles due to each of the pumps may be added to achieve a total amplification profile that corresponds to the addition of the two individual profiles.

Figure 26A:
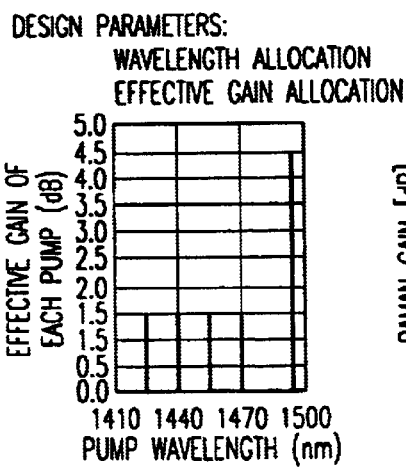
FIGS. 26A and 26B are graphs illustrating a design of a pumping device based on the superposition principle according to the present invention.
Figure 26B:
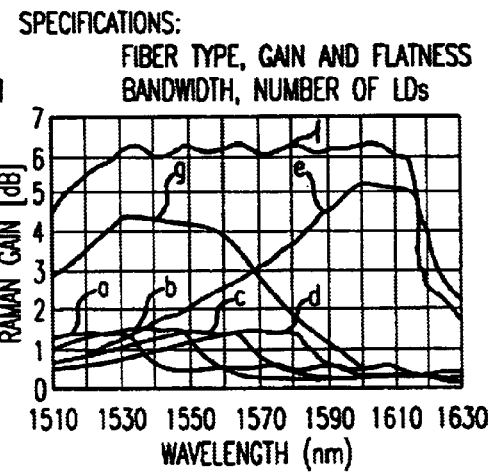
Figure 27:
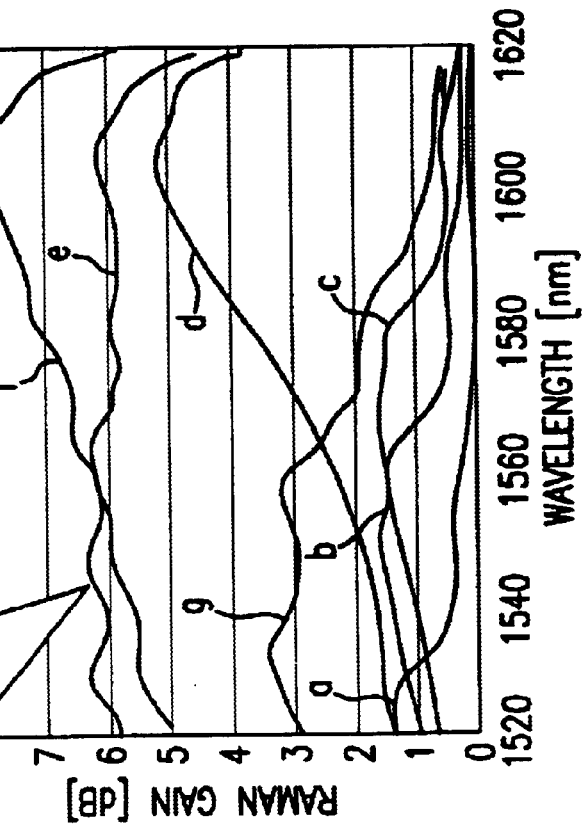
FIG. 27 is a graph illustrating a predicted Raman amplification profile based on the superposition principle and an actual Raman amplification profile.

FIGS. 26A and 26B illustrate another example of the superposition principle as applied to the present invention with regard to creating target amplification performances. As shown in FIG. 26A, four pump lasers are tuned to the shorter wavelengths (i.e., a first group) and set at a first predetermined gain level (or optical output level), and a fifth pump laser (i.e., a second group, having only one pump laser in this example, but more could be included) is set to a higher gain level. The fifth pump laser is tuned to be separated in wavelength from the closest of the pump lasers in the first group by a greater wavelength interval than between that of adjacent members in the first group. Moreover, the pump lasers in the first group are set to approximately equal gain levels and are tuned to be separated from one another by about 20 nm (although a range of 6 nm to 35 nm is a reasonable separate range to minimize appreciable inflection points in the gain profile). In this example, the fifth pump laser is tuned to operate at a central wavelength of 1495.2 nm (29.2 nm above the closest pump laser in the first group, which operates at 1466.0 nm), and is set to impart an effective gain that is almost 3 times higher than that of each of the first group of pumps.

FIG. 26B corresponds with FIG. 26A and illustrates how the superposition principle applies to the amplification profiles produced by the pump lasers in the first group and in the second group. Amplification profiles "a", "b", "c" and "d" correspond with the pump lasers in the first group, which were respectively tuned operate at 1424.2 nm, 1437.9 nm, 1451.8 nm and 1466.0 nm. Profile "g" corresponds with a composite profile for the first group and profile "e" corresponds with profile provided by the pump laser in the second group, namely 1500 nm (although a plurality of pumps, such as two or three, may be tuned to form the second group). Note that the respective amplification peaks occur at a wavelength that is about 100 nm longer than where the source pump operates.

Target amplification gain profiles "c" (in FIG. 25) and "f" (in FIG. 26B) are generated by applying the superposition principle. The resulting shape of the predicted amplification gain profiles may be made substantially flat, as shown, or set to any arbitrary shape, by adjusting the outputs of the pump lasers, and tuning them to have a specific spacing in the central wavelength at which the pump lasers operate. For example, the amplification profile "f" shown in FIG. 26B may be made to tilt so as to have a negative slope throughout the amplification band by reducing the gain of the second group, namely the pump tuned to operate at the central wavelength of 1500 nm. Likewise, the profile could also be tilted to assume a negative slope by increasing the output from group 1 (i.e., gain profile "g"). Conversely, target amplification profiles "c" (FIG. 25) and "f" (FIG. 26B) could be made to have a positive slope by either reducing the output from the first group, and/or increasing the output from the second group. Gain profiles "g" and "e" (FIG. 26B), which are provided by a group of pumps, may be referred to as "element gain profiles." Since there are generally a greater number of pump lasers operating in the group(s) at the shorter wavelengths, it is possible to impart a greater number of higher order gain shape features in the element gain profile for the shorter wavelengths than for the longer wavelengths.

After step S4 is completed, the process proceeds to step S6, where the control unit 206 may then assert control over the optical output of the pump lasers by applying the amplification parameters (e.g., amplitude and wavelength) previously determined to the pump lasers. As an example, when the simulated amplification performance matches the target amplification performance, within a predetermined tolerance, respective drive currents and tunable fiber grating wavelength tuning control values for each pump laser are identified in a look-up table based on the peak amplification output level from each of the pump lasers determined in the simulation. Alternatively, or complementarily, the control unit 206 may be programmed to adjust an amount of attenuation exhibited by programmable attenuators, optically coupled to each of the pump lasers, so as to control the respective optical outputs of the pump lasers, consistent with obtaining the target amplification performance. Thus, the amplifier parameters are associated with an amount of optical energy applied to the optical fiber carrying the fiber as well as the wavelength of the optical energy applied, and need not only be the driving currents applied to the pump lasers.

The transition from step S6 to step S8 in the control process of FIG. 22 is a transition from initiating an amplification performance, that is presumably reasonably close to the target amplification performance, to monitoring and adjusting the actual amplification performance to be within a predetermined tolerance band of the target amplification performance. This monitoring and adjusting portion of the control process begins in step S8, where the control unit 206 monitors the output WDM signal, and perhaps also monitors the actual input WDM signal, as discussed above with regard to FIG. 19.

Step S8 may be accomplished in a variety of ways. One way is to take several measurements across the amplification band, such as one mean power measurement per pump laser. In this scenario, there would be a one-to-one correspondence between the amplifier sub-band and each pump laser. However, there is no restriction on the granularity with which the monitoring step is performed. The greater the resolution (i.e., number of sample points per Hz), the greater the ability to determine the degree to which the actual amplification performance matches that of the target amplification performance. However, after the resolution approaches a level that corresponds with the closest pump laser spacing (e.g., not closer than 6 nm for separate pump sources), little further benefit is achieved unless multiple laser outputs are combined so as to increase the optical output power. At the other extreme, if the resolution is restricted to only a few points, there is a limited ability to determine whether there are inflection points between sample points. Thus, having a resolution that generally corresponds with the pump spacing helps to ensure reliable conformance with the target amplification performance across the entire amplification band, while not wasting processing resources. After obtaining the sample points, the control unit 206 stores the sample points of the output WDM signal, for example in the main memory 904 for subsequent processing.

After step S8, the process proceeds to step S10, where an inquiry is made to determine if the actual (monitored) amplification performance is within a certain tolerance (γ, e.g., 0.5 dB for strict compliance, or 1 dB for less strict compliance) of the target amplification performance, throughout the amplification band. In one embodiment, this determination is made on a sample-by-sample basis, according to the following equation:

$$\text{ABS}[\text{target}-\text{monitored}] \leq \gamma (\text{a certain tolerance})$$

Alternatively, an average of the monitored samples may be combined to develop a mean amplification performance over a predetermined sub-band. In this case, it is possible to reduce the number of calculations required, but also permit the control unit 206 to measure for a compliance of "shape" with regard to the target amplification performance. For example, as will be discussed below, the control unit 206 may control groups of pump lasers to affect a desired amplification performance. Suppose the control of the pump lasers is handled by controlling the pump lasers as two groups. The control unit 206 can then calculate a mean output level for the shorter wavelengths (first group) and another mean output level for the longer wavelengths (second group). This allows the control unit 206 to (1) determine whether the mean amplification performance across the amplification band is within γ; and (2) to determine if an adjustment needs to be made to the slope (i.e., tilt) of the total amplification performance by some amount.

Now, referring to the flowchart of FIG. 22, if the response to the inquiry in step S10 is affirmative (yes) for all sample points (or alternatively, for a predetermined number of sample points or percentage of all sample points), the process returns to step S8. However, if the response to the inquiry in step S10 is negative (no), the process proceeds to step S12.

In step S12, the control unit 206 compares the amount of deviation observed for each of the sample points. If there is not a consecutive pattern of deviations (e.g., adjacent samples that are both outside the predetermined tolerance), then the control unit 206 implements an adjustment process that adjusts (up or down) an optical output from the pump laser and/or the central wavelength of the pump laser whose peak amplification profile is most closely aligned with where the deviation occurred. Moreover, if the control unit observes that the deviation is isolated to a small part of the amplification band, then the control unit 206 adjusts that optical output and/or central wavelength for the pump laser whose peak output most strongly influences that part of the amplification band.

However, if the control unit 206 determines in step S12 that a series of adjacent samples of the monitored amplification profile deviate by more than the predetermined tolerance from the target amplification performance, then the control unit 206 implements a different process. In this latter situation, the control unit 206 creates a "secondary target amplification profile." The shape of this secondary target amplification profile is formed from a difference between the target amplification performance and the monitored amplification profile. Much like with step S4, the control unit 206 then determines (e.g., through simulation or table look-up) a set of amplifier parameters (e.g., pump laser drive currents and/or tunable fiber grating wavelength tuning control values) that can be applied to the pump lasers 202, 203, 204, 205 and/or tunable fiber gratings 209, 210, 211, 212 so as to have the monitored amplification profile more closely match the target amplification profile. Thus, the control unit 206 creates secondary target amplification profile that, when added to the monitored amplification profile, results in a new amplification profile that more reliably falls within the predetermined tolerance of the target amplification profile, across the amplification band.

Once step S12 is completed, the process proceeds to step S14, where the control unit 206 causes the optical outputs and/or the tunable fiber grating wavelength tuning control values of the affected pump lasers to be adjusted by an amount necessary to implement the secondary target amplification profile. The process then returns to step S8 for continued monitoring and adjusting operations.

Setting and maintaining an amplification profile may be accomplished with the control unit 206 by adjusting individual pump laser outputs and/or the central wavelengths at which the individual pump lasers operate. However, control can also be accomplished by adjusting the element profiles of respective groups of pump lasers. As discussed above, each of the element profiles is realized by combining the respective gain profiles of the pump lasers in that group. Then, the element gains themselves may be adjusted to lessen the number of degrees of freedom in the control process when making changes to the total amplification performance. For example, the levels of two element profiles may be adjusted quickly to impart a slope change on the total amplification profile. As discussed above, a positive slope may be created by increasing the gain of the second element and/or decreasing the gain of the element profile for the first element. Conversely, a negative slope may be imparted on the total amplification performance if the profile for the first element is increased and/or the profile for the second element is decreased.

A computer-based simulation process, as discussed above, may be used to efficiently determine a magnitude by which each of the element profiles should be adjusted so as to realize the desired effect. For example, a two step simulation process may be employed where the element profiles are identified via an element analysis (i.e., performing simulations to determine the respective gain levels attributable to each of the pump lasers to achieve the desired element profile). Then, a second step would be performed where the levels of the element profiles are adjusted to provide a desired total amplification profile of a predetermined shape. As one example, the element profiles could be developed during an initial setup mode of operation (e.g., step S4 in FIG. 22) and then the second simulation step would be performed in step S12 to identify an amount by which respective element profiles should be adjusted to maintain the total amplification performance to stay within the predetermined tolerance.

With regard to initially establishing the element profiles, the present inventors observed that since a high effective gain is expected with a lower power required, an element gain profile for the longer wavelength band (second element profile) is temporally set based on the desired target amplification gain profile. Moreover, the second element profile is set at a sufficiently high gain to ensure that the second element profile substantially accounts for the gain required at the longer wavelength portion of the amplification band. When done this way, the burden is then shifted on the control unit 206 to set the first element gain profile to match the difference between the target amplification profile and the second element gain profile. Since there are more pump lasers in the shorter wavelength group (i.e., the first group), there are more pump lasers available to create a more complex shaped first element profile.

Moreover, since the pump lasers of the present invention are tunable, the central wavelengths of the individual pump lasers, as determined by the simulation, may also be tuned by the control unit 206. The present inventors have recognized that by having a tunable Raman amplifier, that generic amplifiers can be installed and tuned after they are installed in order to implement a desired amplification profile. As discussed above, this field tunability allows for a single module design to be used in a variety of systems, and greatly reduces the manufacturing, inventory, and cost problems associated with custom-built equipment.

Figure 28:
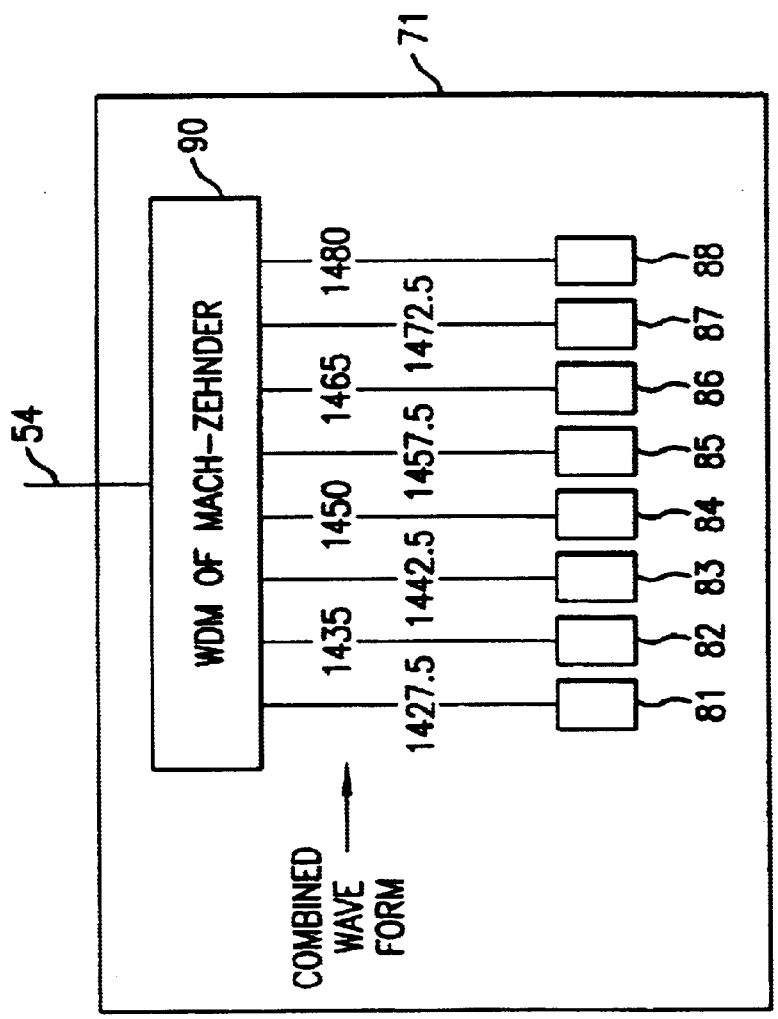
FIG. 28 is a schematic of another pumping device according to the present invention.

When setting the shape for the first element profile, the control unit 206 may take into account additional conditions. For example, one of the additional conditions may be an amount of fiber loss in the optical fiber. This fiber loss may be determined at the time of installation of the Raman amplifier, and thus varies depending on the operational setting for that Raman amplifier. The fiber loss may change over time, perhaps based on a system operator adding another amplifier closer to the subject Raman amplifier, thus decreasing the distance over which the output optical signal must travel before being amplified again. As an example of a further "additional condition", the first element profile may be adapted to compensate for pump-to-pump interactions that may be experienced. FIG. 28 illustrates how pump-to-pump interactions will tend to inflate the total amplification performance at the longer wavelengths (profile "f"). By having the control unit 206 account for these additional conditions, it is possible to have the control unit 206 alter the shape of the respective element profiles, such that the total amplification performance is optimized, despite the existence of the additional conditions in which that Raman amplifier will operate.

As another example of how the control unit 206 may adjust the element profiles as a simplified control mechanism (as compared with simultaneously adjusting all of the pump lasers), suppose a tilted gain is observed when a flat gain is targeted. In this situation, the control unit 206 may correct for the tilted gain by adjusting the optical output of the first group of pumps and/or the second group of pumps. One adjustment process is to make incremental changes to the driving current for each pump until the total gain profile becomes readjusted to the relatively flat total gain profile "f" in FIG. 26B. The driving current increments are then stored in a memory, for example, the main memory 904 for quick retrieval when making adjustments to the total amplification profile in future situations. Alternatively, the Raman amplifier may have several "hot spare" pumps which can be activated and tuned to provide amplification at a particular wavelength to remove the tilt.

The control unit 206 may be purposefully configured to impart a tilted gain by adjusting the levels of the element profiles. For example, a flat gain across the amplification band may be appropriate if the communication parameters in the optical communication link are uniform across the spectral band. However, loss in an optical fiber is wavelength dependent, and thus, some channels of the WDM signal may be attenuated more than others when transiting between cascaded amplifiers. In this case, the control unit 206 may offset this operating condition by "pre-emphasizing" the optical signals that tend to be attenuated more by adjusting the element profiles to create a tilted total.

A numeric example will now be provided as a further explanation about how a simplified control process implemented in the control unit 206 can use groups of lasers to set and maintain an amplification gain performance within a predetermined tolerance of a target amplification performance. Assume a power level of respective WDM optical signals, e.g., channels 1–10, is uniform at −20 dBm. Also assume a net target gain applied by the Raman amplifier is about 10 dB, considering the internal losses imparted by the tap coupler and the WDM coupler. Consequently, the actual per channel output power level from the Raman amplifier should be uniform and have a value of about −10 dBm (i.e., −20 dBm+10 dB). The control unit 206 may keep as a stored value an indication that the output signal level, per channel is −10 dBm. Thus, if the control unit 206, during its monitoring operation determines that the output signal per channel is above or below that −10 dBm signal level by more than a specified amount, the control unit 206 can increase or decrease the element profile by an appropriate amount to counteract the deviation from the expected output level. For example, the control unit 206 may determine the following actual output power levels and corresponding deviations from the target value of −10 dBm:

| Channel # | Actual output power level | Deviation from target |
|---|---|---|
| Channel 1: | −15.0 dBm | 5.0 dBm |
| Channel 2: | −14.5 dBm | 4.5 dBm |
| Channel 3: | −14.0 dBm | 4.0 dBm |
| Channel 4: | −13.5 dBm | 3.5 dBm |
| Channel 5: | −13.0 dBm | 3.0 dBm |
| Channel 6: | −12.5 dBm | 2.5 dBm |
| Channel 7: | −12.0 dBm | 2.0 dBm |
| Channel 8: | −11.5 dBm | 1.5 dBm |
| Channel 9: | −11.0 dBm | 1.0 dBm |
| Channel 10: | −10.5 dBm | 0.5 dBm |

The control unit 206 will then make the determination that a series (i.e., more than one) deviations exist between sample points and thus will adjust an element profile up or down in gain level. By observing the series of deviations, the control unit 206 has in effect determined the "secondary target amplification profile." The control unit may thus compensate for this deviation by increasing the element gain of the first group so as to create a more tilted total amplification profile that more closely matches the target amplification profile. Further adjustments to the first element profile may then be made by adjusting optical outputs of the pump lasers within the first group, if necessary.

Alternatively, the control unit 206 may refer to the memory to identify drive current adjustments that have previously been associated with the secondary target amplification profile that is presently observed. Moreover, the memory holds sets of drive current adjustment values for the respective pumps in the first and second groups that are prearranged to create particular secondary target amplification profiles. Since only a limited number of pre-stored secondary target amplification profiles can be held in memory, the control unit 206 performs a least-squares analysis, based on the observed secondary target amplification profile to select a "closest" pre-stored secondary target amplification profile. Other pattern recognition processes may be used as well to select appropriate pre-stored secondary target amplification profiles, for the purpose of retrieving the drive current settings, or, alternatively the tunable fiber grating wavelength tuning control value settings, associated with the pre-stored secondary target amplification profiles.

Alternatively, the control unit 206 can be configured to determine an average or mean value of the deviations and verify if this average or mean value is within an allowable tolerance. For example, the control unit 206 may determine that the average value of the deviations is zero, which in some instances may indicate that the amplification performance has been satisfied. If it is not within tolerance however, the control unit 206 would increase/decrease the element gains as appropriate to more closely close the gap between the actual output level profile and the target level profile (i.e., −10 dBm in this example).

Further, the deviations shown above correspond to a difference between the actual output power level and the target output power level. Note, however, the control unit 206 may determine the drive currents from the superposition principle, as discussed above.

Raman amplifiers will be placed in service in a variety of different operational conditions that may influence how an optimum target gain profile is identified for that operational environment. Information about the operational conditions (such as the pump-to-pump interaction shown as the difference between profiles "f" and "g" in FIG. 27) is provided to the control unit 206 at step S2 (FIG. 22) for selecting the optimum target profile. The source of this information may be found during equipment installation, or periodic recalibration. When a target gain profile "g" is initially given in step S2, yet an actual gain profile is observed like "f", this difference in actual from predicted performance is found in steps S8 and S10. The control unit 206 may observe this deviation as being attributable to the existence of pump-to-pump interaction, that had not originally been considered in steps S2 and S4 when establishing the target amplification performance. Once this observation is made, the process of FIG. 22 may reestablish a new target profile in steps S2 and S4 that consider the existence of pump-to-pump interaction, rather than just simple superposition. In this case, with the modified process for developing the target amplification performance, the observed variation from target amplification performance to the monitored amplification performance should narrow, thus requiring less adjustment to maintain the predetermined gain profile.

This additional condition information (which in this case is the realization that there is pump-to-pump interaction) is also considered in steps S10 and S12 (FIG. 22) when performing the monitoring and analyzing process steps. The information is useful since the additional conditions will be reflected in the target amplification profile, or in observed, consistent deviations from the target amplification profile. The output level or central wavelengths of the pumps in each group may then be changed as necessary so as to maintain the target amplification performance (step S14).

For example, the control unit 206 may incrementally increase or decrease an output power or tune the central wavelength of each pump in the first group so as to effect the element amplification profile of the first group. If the observed total gain profile is still not within the allowable tolerance of the target gain profile after this incremental increase or decrease, the control unit 206 may again incrementally increase or decrease the output power or tune the central wavelength of each group of pumps.

A look-up table, such as that shown in Table 1, may be used to implement this incremental approach. That is, the control unit 206 may select a first profile #1 for the set of four pumps in the first group and read the driving currents from the table for each pump (i.e., a driving current of 500 mA for each pump). If the actual amplification profile does not equal the target amplification profile, the control unit may select profile #2 for the four pumps in the first group. This incremental approach may be continued until the actual amplification profile is within the allowable tolerance of the target amplification profile.

TABLE 1

| Group 1 (four pumps) | | | | |
|---|---|---|---|---|
| Pump 1 | Pump 2 | Pump 3 | Pump 4 | Profile Number |
| 500 mA | 500 mA | 500 mA | 500 mA | #1 |
| 490 mA | 490 mA | 490 mA | 490 mA | #2 |
| 480 mA | 480 mA | 480 mA | 480 mA | #3 |

In addition, the look-up Table 1 may also be modified to store different drive currents and/or different tunable fiber grating wavelength tuning control values corresponding to different types of amplification profiles.

For example, the look-up Table 2 shown below may be used by the control unit 206 to provide various element gain profiles for a specified group of pumps. The values in Table 2 were selected as examples to show that different sets of values may be selected.

TABLE 2

| Group 1 (four pumps) | | | | |
|---|---|---|---|---|
| Pump 1 | Pump 2 | Pump 3 | Pump 4 | Profile Number |
| 560 mA | 311 mA | 122 mA | 244 mA | #1 |
| 560 mA | 500 mA | 440 mA | 330 mA | #2 |
| 480 mA | 480 mA | 480 mA | 480 mA | #3 |

In this example, the control unit 206 may determine that the gain profile #2 is suitable to offset a fiber loss characteristic (i.e., another "additional" condition"). The control unit 206 may then read the necessary driving currents from the table to achieve a desired amplification profile for the first group of pumps. The control unit 206 may select the best profile (i.e., one that minimizes a difference between an actual output signal level and a target output signal level, considering the effects of any additional conditions such as fiber loss) from the table based on a variety of factors. For example, the control unit 206 may select profile #3 that provides the actual amplification performance, due to both the first and second groups having a profile 5 dB below a target gain profile. The control unit 206 may also determine this drop in gain occurs in the wavelengths corresponding to the pumps in the first group. The control unit 206 may then select profile #1 from Table 2 (which has previously been determined as the best profile to offset a loss of 5 dB or less, for example). Once profile #1 is selected, the driving currents associated with profile #1 are then retrieved from memory and applied to the respective pump lasers.

Using the control unit 206 and a special arrangement of the pumping device, the target amplification performance may be changed. In the examples that follow, the change of target amplification performance is explained in the context of attempting to provide a same system-level performance for an input WDM signal even though a system parameter has changed. FIGS. 28–46 illustrate different examples of the control unit 206 exerting control over the pump lasers so as to produce a target amplification gain profile that yields a same overall system performance for an input WDM signal, even though the communication conditions may have changed.

FIG. 28 is a schematic of another pumping device 71 according to the present invention, which includes "slots" for eight pump lasers 81–88 coupled by a Mach-Zehnder interferometer 90. Each of the pumps 81–88 may have their central wavelength and driving current set by the control unit 206. Alternatively, the control unit 206 may simply not apply driving currents to one or more of the pumps 81–88. This alternative embodiment enables the production of a "generic pumping device" that may be fully configured/reconfigured after it is placed in a particular operational situation. In this way, each amplifier need not be custom fit to a particular place in a communication network, but rather the generic amplifier may be remotely configured by, for example, the remote device controller 121 that downloads operational parameters to the Raman amplifier. In this case, it is possible that at least some fraction of the pump lasers will not be used by the control unit 206 to create the target amplification performance. Although not shown in FIG. 28, the control unit 206 asserts control over the pump lasers 81–88 by way of the bus 120 so as to tune the central wavelengths and set the drive currents of the pump lasers 81–88.

In this example, pumps 85 and 87 are turned off, and the total power of the pumps included in the first group, tuned by the control unit 206 to operate at the shortest wavelength side (i.e., the total power due to pumps 81, 82, 83 and 84) is greater than a total power due to the pumps in the second group tuned by the control unit 206 to operate at the longer wavelength side (i.e., the total power due to pumps 86 and 88). This provides a flat amplification profile since the control unit 206 adjusts the levels of the pump lasers in the first group and the second group to form element profiles that result in a flat profile when combined. In FIG. 28, the pumps in each of the respective groups produce the same output power, but the total output power due to the pumps tuned by the control unit 206 to operate at the longer wavelength side is set to be sufficiently high to maintain the flat gain profile even though only a subset of the pumps is used.

After the element profiles are established, the control unit 206 may monitor the actual WDM signal and control each operating pump by tuning the central wavelength and/or setting the drive current so as to maintain the target amplification gain profile. Alternatively, the control unit 206 may monitor and control the actual amplification profile with respect to two groups of pumps.

Figure 29:
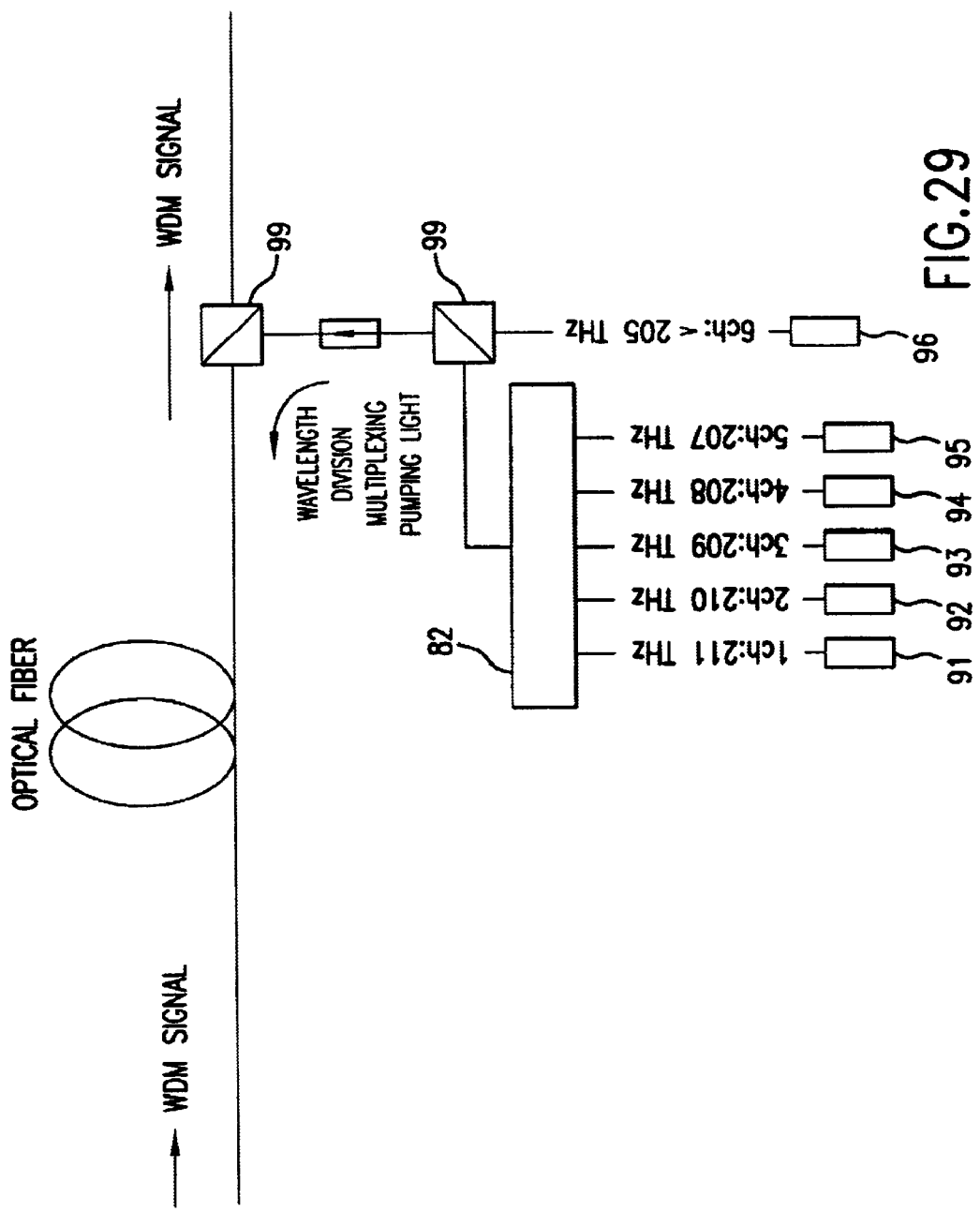
FIG. 29 is a schematic for explaining another Raman amplification example according to the present invention.

The amplification bandwidth can be expanded or contracted by tuning the central wavelengths and/or changing the contributions from pump lasers tuned to operate at the shortest and longest wavelengths in the group of pump lasers. FIG. 29 illustrates another example in which this can be accomplished. It should be noted that in FIG. 29, the center frequencies of the pump lasers are shown, rather than the central wavelengths. As shown, the center frequency of the first pump 91 is tuned to operate at 211 THz (a wavelength of 1420.8 nm) and the center frequency of the fifth pump is tuned to operate at 95 is 207 THz (a wavelength of 1448.3 nm). The pumps 91–95 are tuned by the control unit 206 to be spaced apart from each other at an interval of 1 THz and the light output from the pumps 91–95 are combined via the WDM combiner 82 to form a shorter wavelength group. This combined light is then combined via a coupler 99 with light output from the longer wavelength group that includes a pump 96 operating at a frequency of 205 THz (a wavelength of 1462.4 nm), which is spaced apart from the fifth pump 95 by 2 THz.

Figure 30:
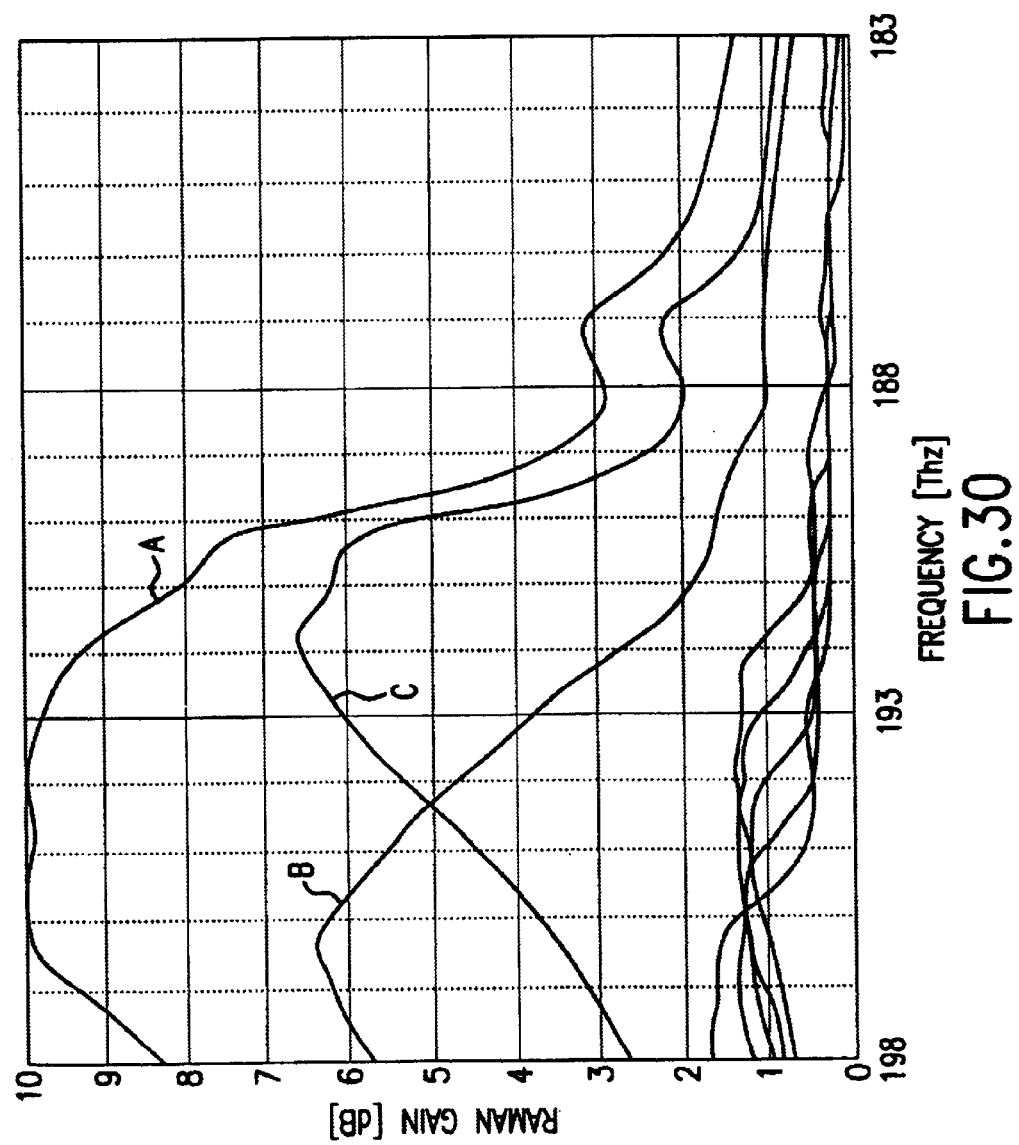
FIG. 30 is a graph illustrating amplification profiles of the pumping device in FIG. 29.

FIG. 30 illustrates Raman amplification profiles for the pumps 91–96 shown in FIG. 29. The curve "A" represents a total amplification profile due to all of the pumps 91–96, the curve "B" represents a sum of the amplification profiles due to a group of shorter wavelengths of the first five pumps 91–95, and the curve "C" represents an amplification profile due to the sixth pump 96. The thin lines in FIG. 31 correspond to amplification profiles for each of the first five pumps 91–95. By multiplexing the light output from the pumps 91–95 spaced at intervals of 1 THz, a smooth curve extending rightwardly and downwardly is formed (i.e., curve "B"). In addition, by adding the curve "B" to an amplification profile extending rightwardly and upwardly (in FIG. 30) due to the light output from the sixth pump 96 (i.e., curve "C"), a total Raman amplification profile is substantially flat as shown by the curve "A". Further, as shown by the thin lines in FIG. 30, a projection of a first amplification curve and a recess of another amplification curve mutually cancel each other when the interval is 1 THz.

Figure 31:
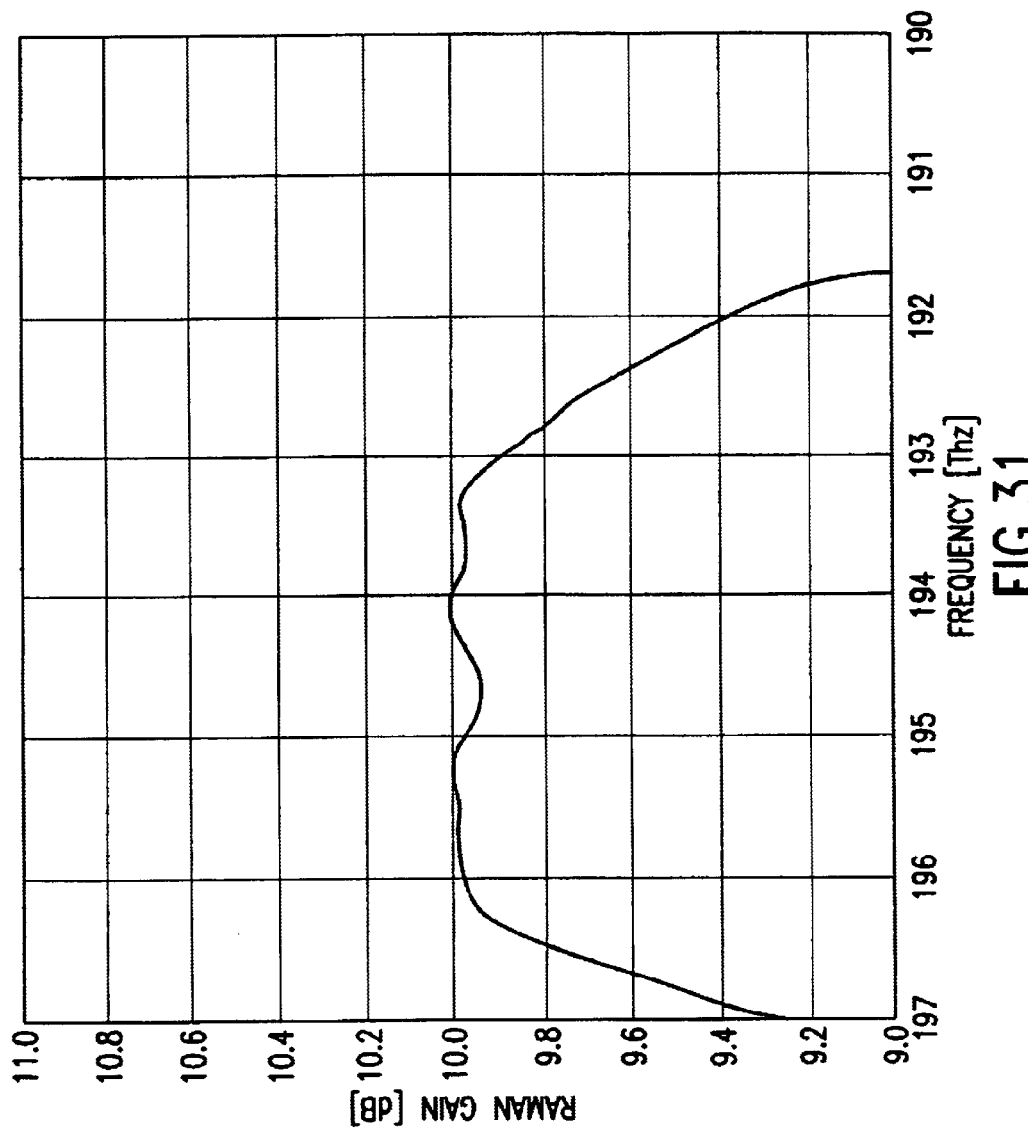
FIG. 31 is a graph illustrating an enlarged view of a total amplification profile of the pumping device in FIG. 29.

FIG. 31 is a graph illustrating an enlarged view of the total amplification curve "A" shown in FIG. 30. As shown, the amplification bandwidth at 10 dB extends from about 196 THz (a wavelength of 1526.6 nm) to about 193 THz (a wavelength of 1553.3 nm) and a gain deviation of about 0.1 dB is achieved.

Figure 32:
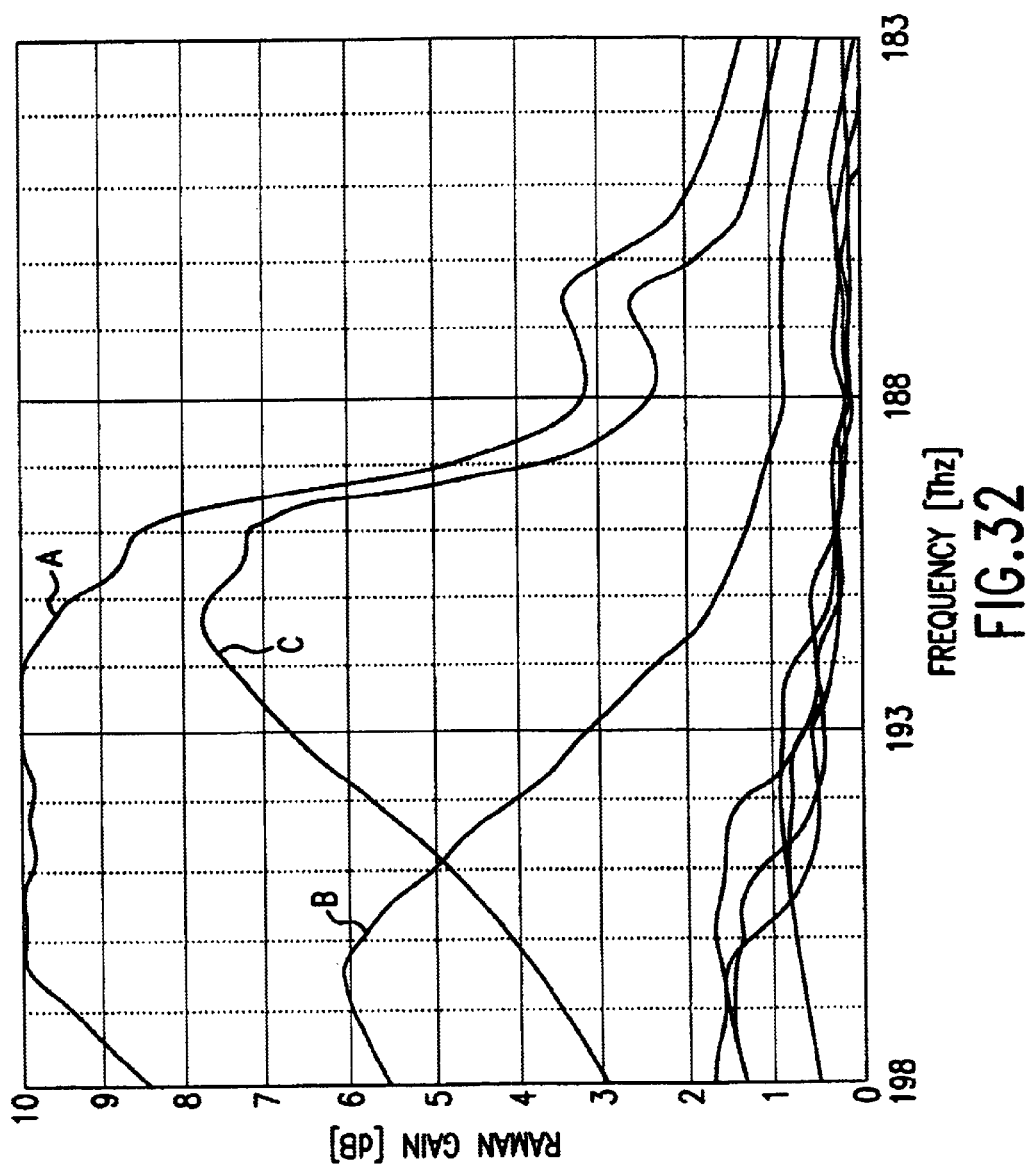
FIG. 32 is a graph illustrating amplification profiles for a variation of the pumping device in FIG. 29.

FIG. 32 shows amplification profiles when the center frequency of the pump 96 in FIG. 29 is tuned by the control unit 206 to be spaced apart from the fifth pump 95 by 2.5 THz (rather than being spaced apart from the fifth pump 95 by 2.0 THz as in FIG. 29). Similar to FIG. 30, the curve "A" represents the total amplification profile, the curve "B" represents the sum of amplification profiles due to the first five pumps 91–95, and the curve "C" represents an amplification profile of the sixth pump 96. Further, the thin lines represent individual amplification profiles of the first five pumps 91–95.

Figure 33:
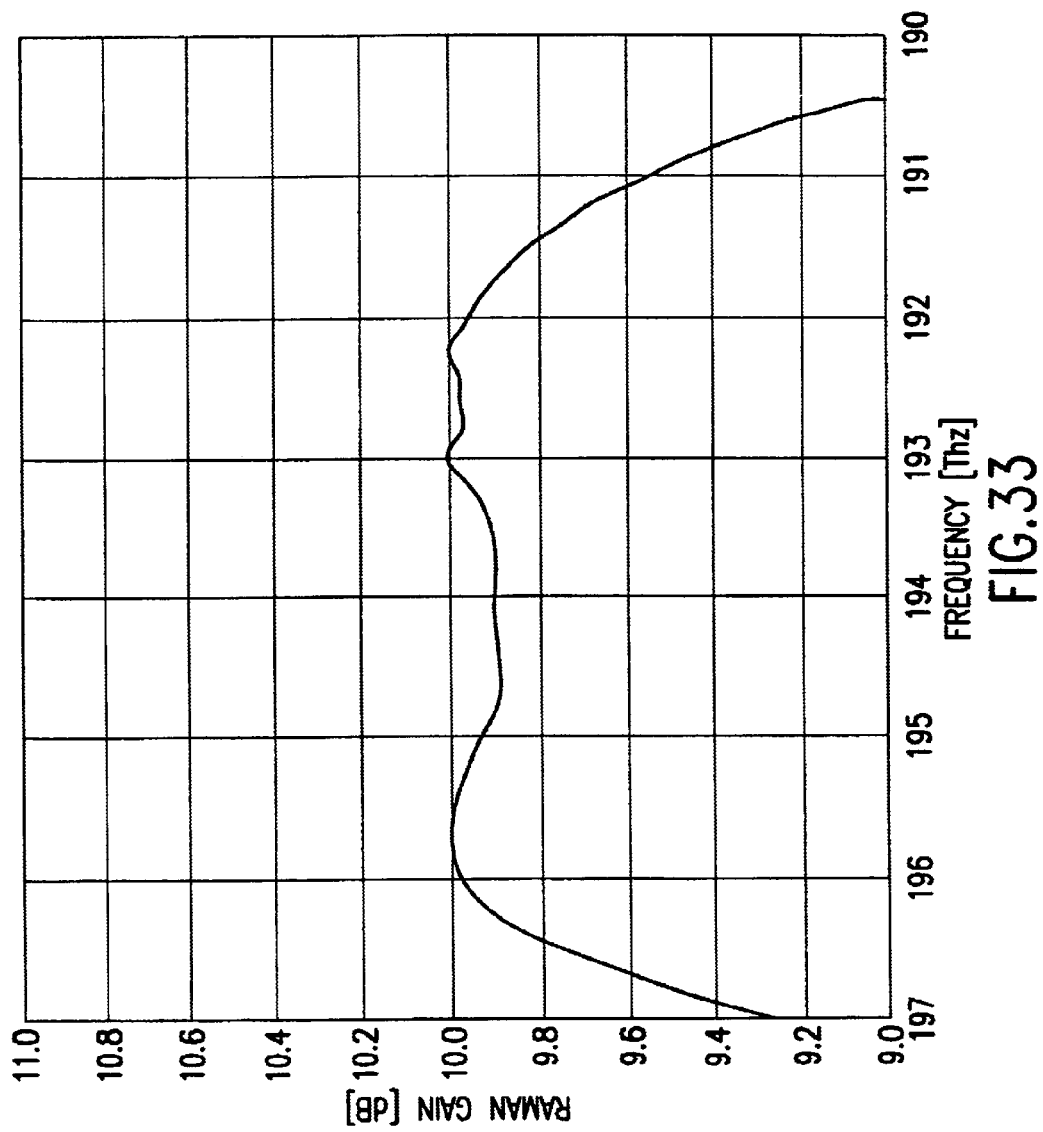
FIG. 33 is a graph illustrating an enlarged view of a total amplification profile of the pumping device shown in FIG. 29.

FIG. 33 is an enlarged view of the total amplification curve "A" shown in FIG. 32. As shown, the peak amplification is at 10 dB, the amplification bandwidth extends from about 196 THz (a wavelength of 1529.6 nm) to about 192 THz (a wavelength of 1561.4 nm) and an amplification deviation of about 0.1 dB is achieved. Further, the amplification bandwidth is wider than that in FIG. 31, but a larger ripple occurs at a middle portion of the bandwidth. The ripple is caused because the interval between the fifth pump 95 and the sixth pump 96 is larger (i.e., 2.5 THz rather than 2.0 THz). Thus, in FIG. 33, a larger amplification bandwidth is achieved, but there is a larger ripple at a middle portion of the bandwidth. The expansion in bandwidth can be controlled by tuning spare pump lasers to intervals below the center frequency of the pump laser that produce the shortest wavelength used to develop profile "B", and above a center frequency of longest wavelength used to develop profile "C" in FIG. 30. While having spare pumps available is more expensive than not including spare pumps, the Raman amplifier is quickly and easily reconfigured from, for example, a remote device controller 121 to adjust an amplification bandwidth.

Figure 34:
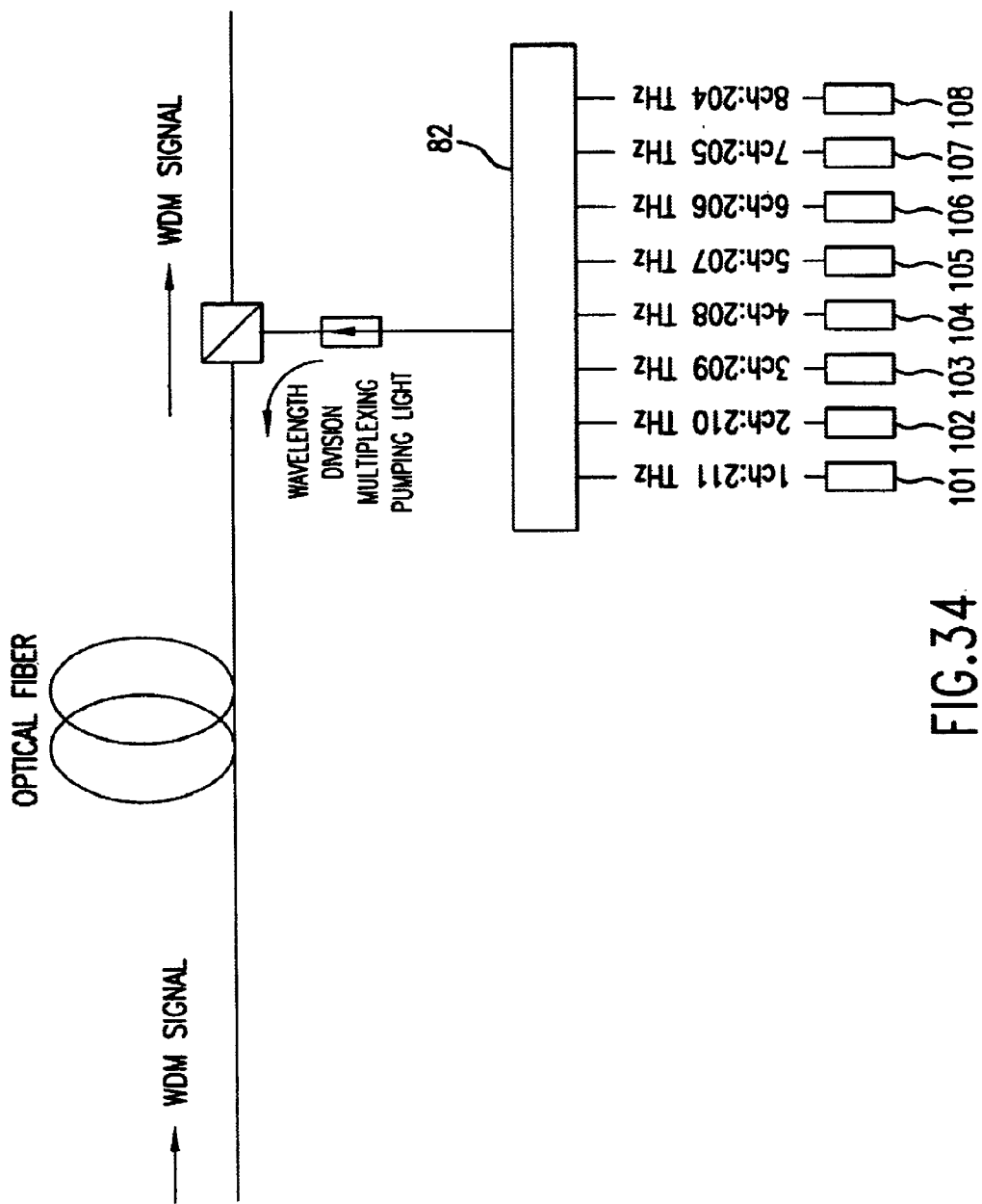
FIG. 34 is a schematic for illustrating yet another Raman amplification example according to the present invention.

FIG. 34 is a schematic illustrating yet another Raman amplifier example according to the present invention. In this example, the frequency of the first pump 101 is tuned by the control unit 206 to operate at 211 THz (a wavelength of 1420.8 nm) and the frequencies of the second to eighth pumps 102–108 are tuned by the control unit 206 to operate from 210 THz (a wavelength of 1427.6 nm) to 204 THz (a wavelength of 1469.6 nm). Each of pumps 101–108 is tuned by the control unit 206 to be spaced apart from each other by an interval of 1 THz. Note again, however, that one or more of the pumps (e.g., pumps 106, 107) may not used (although they may remain in the Raman amplifier to enable for dynamic reconfiguration of the amplification bandwidth, discussed above). In addition, the wavelength interval between adjacent operating pumps is tuned by the control unit 206 to be within an inclusive range from 6 nm to 35 nm. Further, the number of pumps tuned to operate at the shorter wavelength side (with respect to the middle wavelength between the shortest and longest center wavelengths) is greater than the number of pumps tuned to operate at the longer wavelength side. That is, the pumps are tuned such that the central frequency between the first pump 101 and eighth pump 108 is at about 207.5 THz. Thus, pumps 101–104 (i.e., four pumps) are tuned to operate on the shorter wavelength side and pumps 105 and 108 (i.e., two pumps) are tuned to operate on the longer wavelength side.

Figure 35:
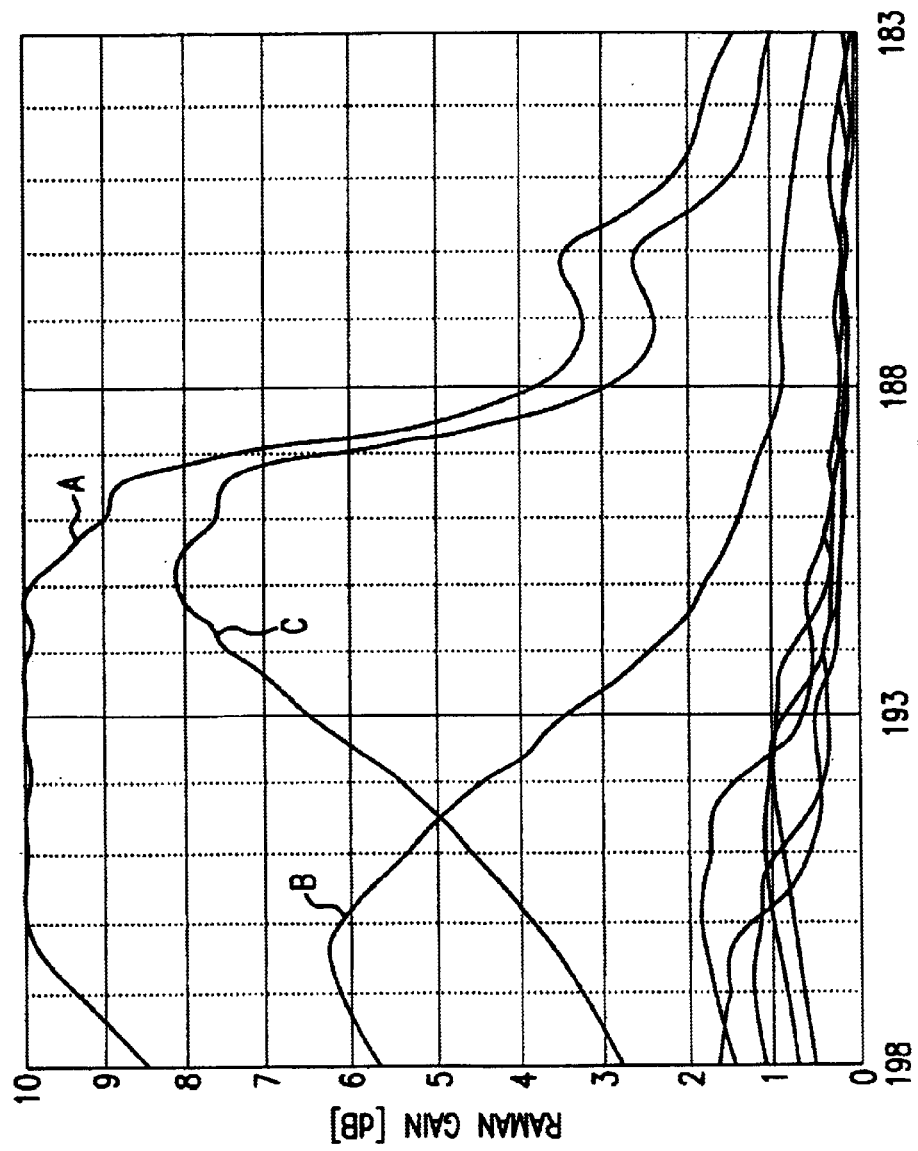
FIG. 35 is a graph illustrating amplification profiles of the pumping device in FIG. 34.

FIG. 35 illustrates Raman amplification profiles that are produced when the pumps 101–105 and 108 shown in FIG. 34 are used. The curve "A" represents the total amplification profile, the curve "B" represents the sum of amplification profiles due to the first five pumps 101–105, and the curve "C" represents an amplification profile due to the eighth pump 108. In addition, the thin lines represent individual amplification profiles of the first five pumps 101–105.

Figure 36:
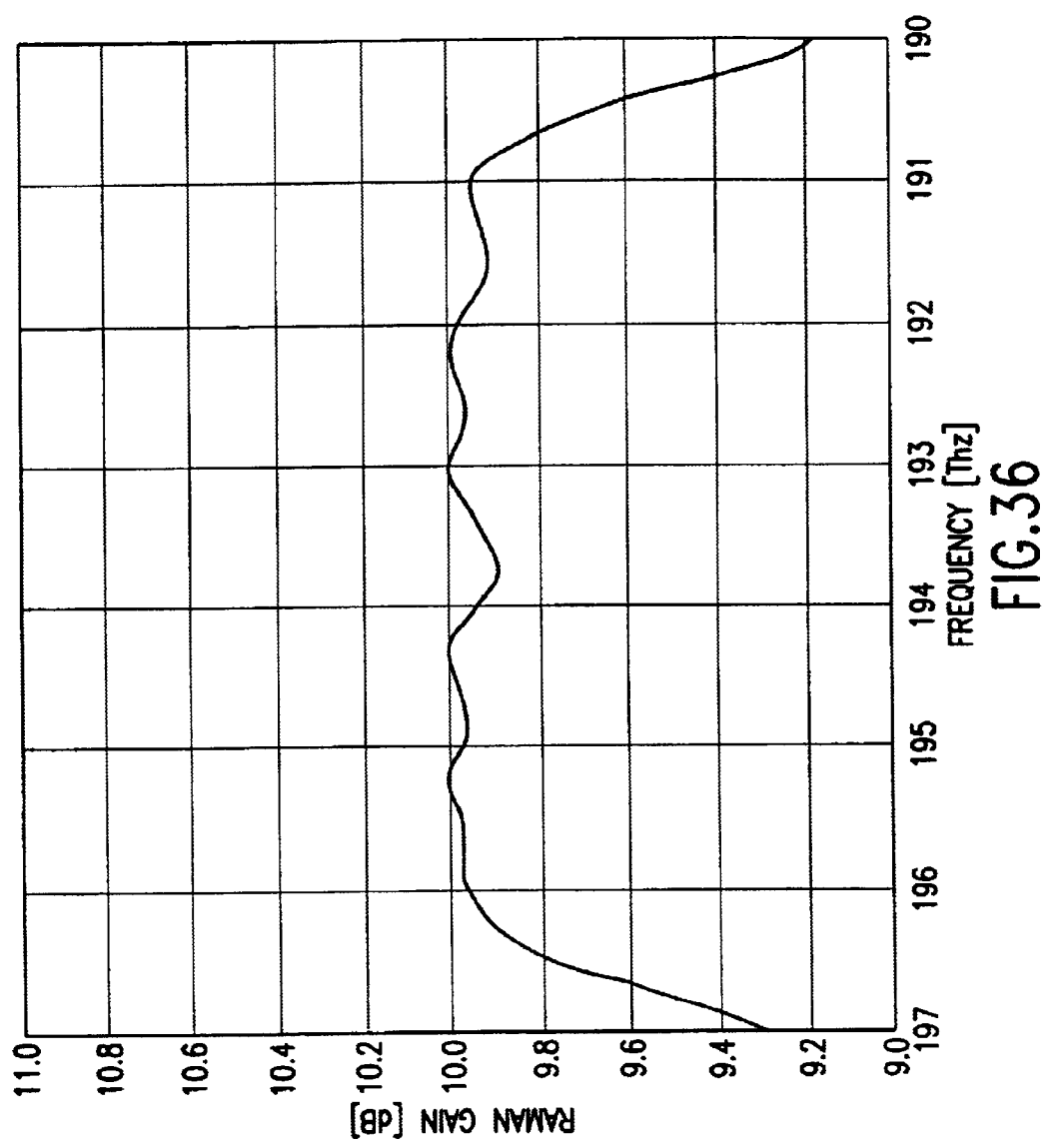
FIG. 36 is an enlarged view of the total amplification profile shown in FIG. 35.

FIG. 36 is an enlarged view of the total amplification curve "A" in FIG. 35. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Note the amplification bandwidth is wider than the amplification bandwidths shown in FIGS. 31 and 33. The reason is because the eighth pump 108 is tuned to be spaced at a larger interval (i.e., 3 THz) from the adjacent operating pump 105.

Figure 37:
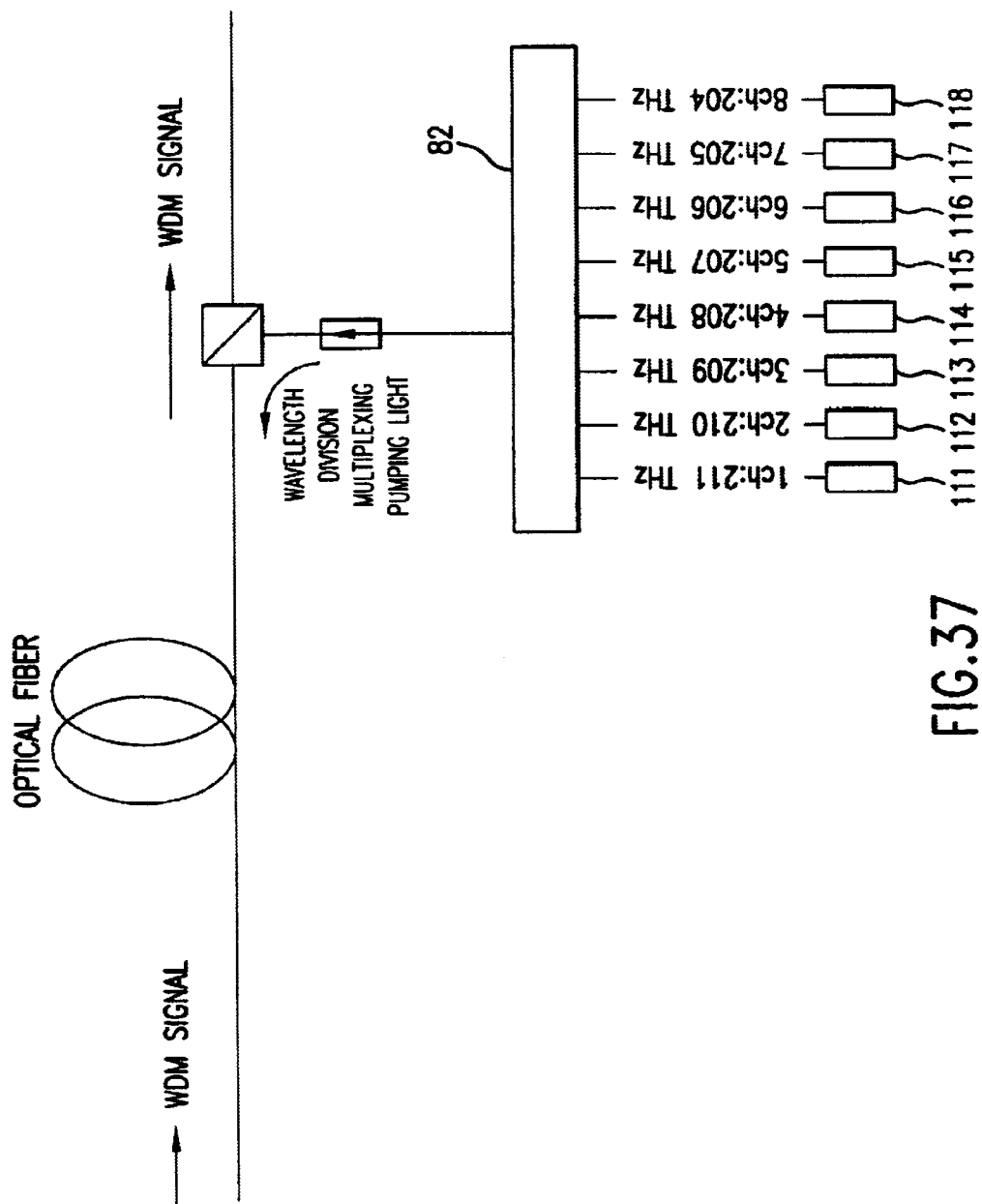
FIG. 37 is a schematic for explaining still another Raman amplification example according to the present invention.

FIG. 37 is a schematic illustrating still another Raman amplification example according to the present invention. The frequency of the first pump 111 is tuned by the control unit 206 to operate at 211 THz (a wavelength of 1420.8 nm) and the frequencies of the second to eighth pumps 112 to 118 are tuned by the control unit 206 to operate from 210 THz (a wavelength of 1427.6 nm) to 204 THz (a wavelength of 1469.6 nm). In addition, each of the pumps is tuned to be spaced at an interval of 1 THz. In this example, the fifth and sixth pumps 115 and 116 are not used. Further, the interval between operating adjacent pumps is tuned to be within an inclusive range of 6 nm to 35 nm, and the number of pumps tuned to operate on the shorter wavelength side is greater than the number of pumps tuned to operate on the longer wavelength side.

Figure 38:
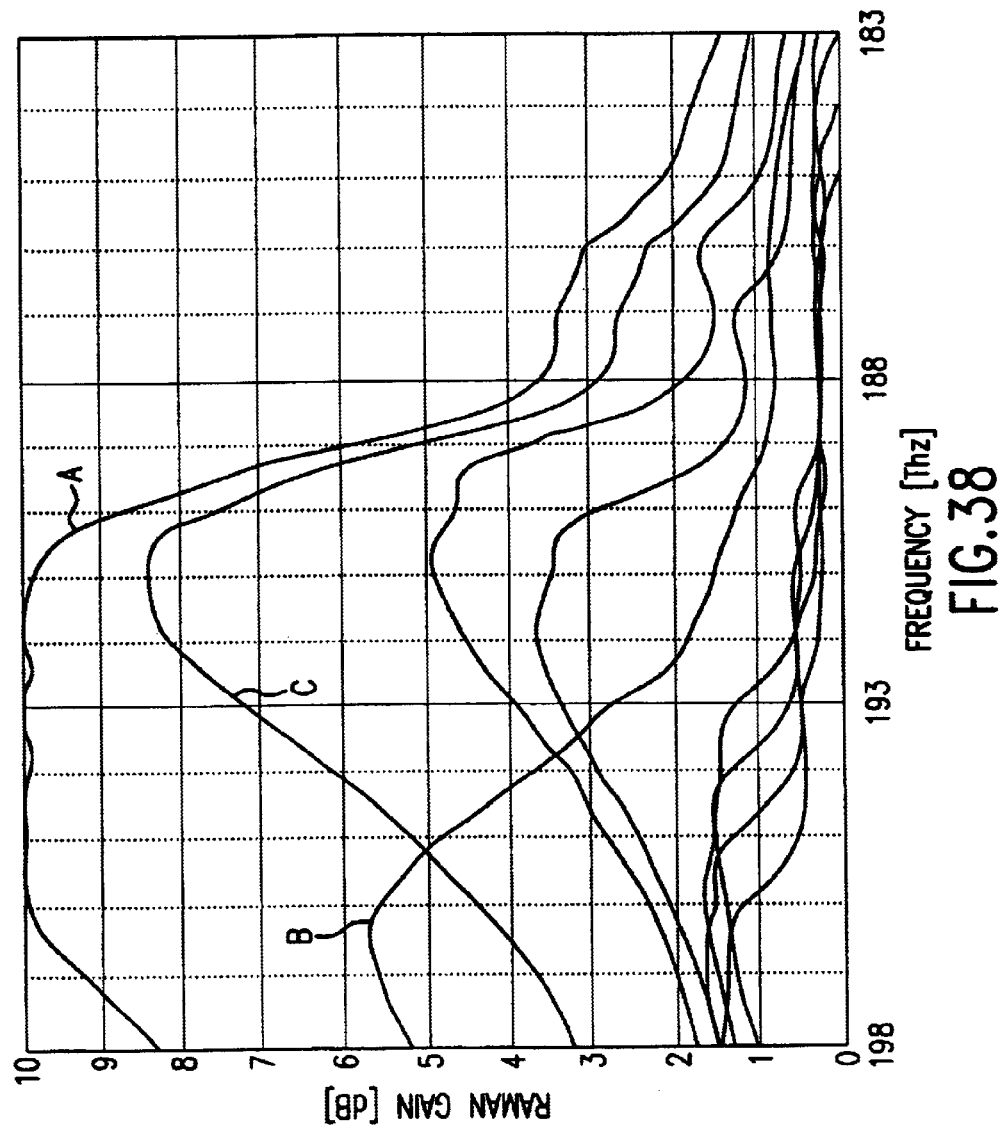
FIG. 38 is a graph illustrating amplification profiles of the pumping device in FIG. 28.

FIG. 38 illustrates Raman amplification profiles for the pumps 111–114 and 117–118 shown in FIG. 37. The curve "A" represents the total amplification profile, the curve "B" represents the sum of the amplification profiles due to the first four pumps 111–114, and the curve "C" represents the sum of the amplification profiles due to the seventh and eighth pumps 117 and 118. The thin lines represent the amplification profiles due to each of the operating pumps 111–114 and 117–118.

Figure 39:
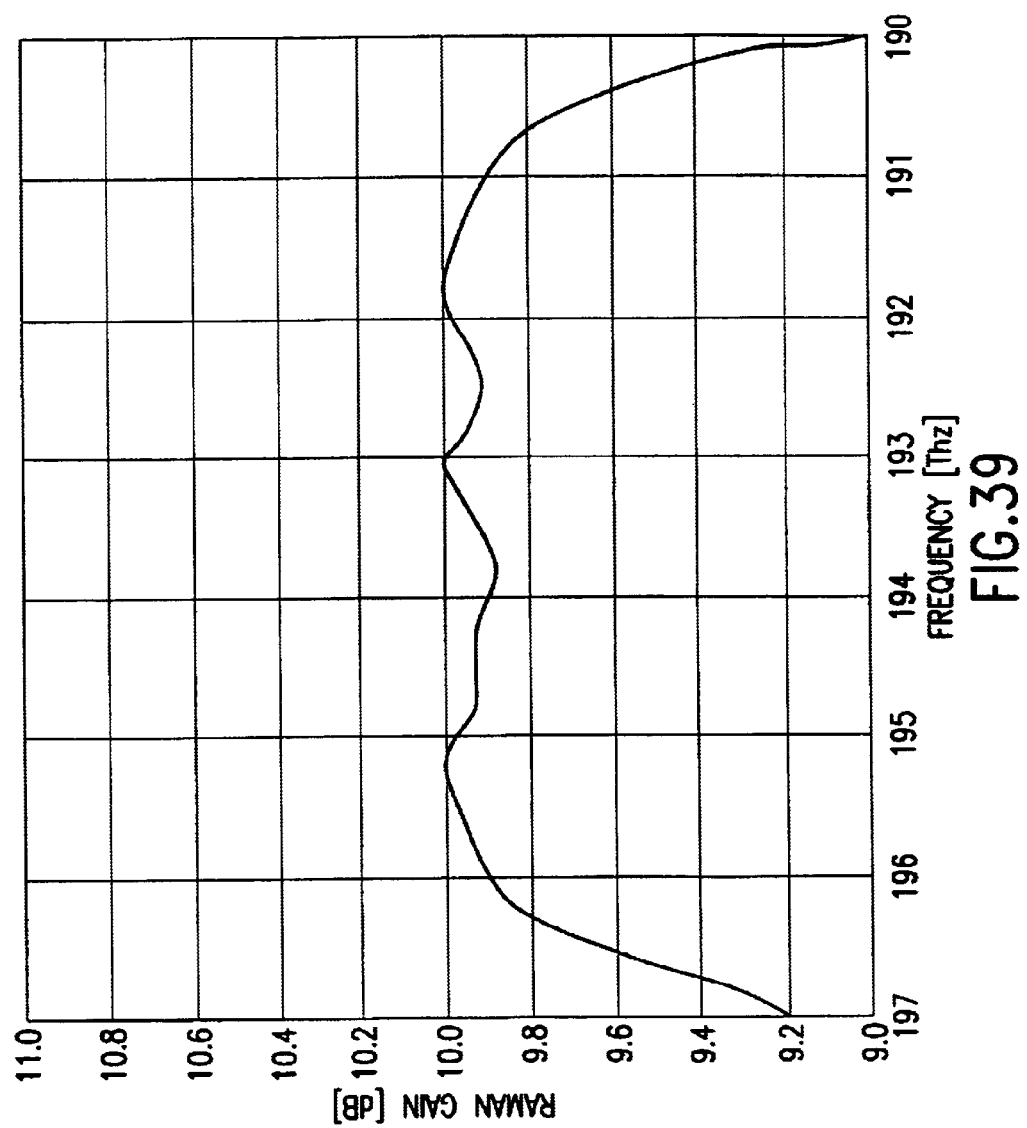
FIG. 39 is a graph illustrating an enlarged view of a total amplification profile shown in FIG. 38.

FIG. 39 is an enlarged view of the total amplification curve "A" in FIG. 38. As shown, the peak amplification is at 10 dB, the amplification bandwidth extends from about 196 THz (a wavelength of 1529.6 nm) to about 191 THz (a wavelength of 1569.6 nm) and the amplification deviation is about 0.1 dB. Further, in this example, note the amplification curve "C" in FIG. 38 is formed from the individual amplification profiles of pumps 117 and 118, whereas the amplification curve "C" in FIG. 35 is formed from the single pump 108. In addition, the maximum gain created by the pumps 117 and 118 is about 5 dB (see FIG. 37), whereas the maximum gain created by the single pump 108 is about 8 dB. Thus, in FIG. 38, the two pumps 117 and 118 can be driven at a smaller output power compared to driving a single pump.

Figure 40:
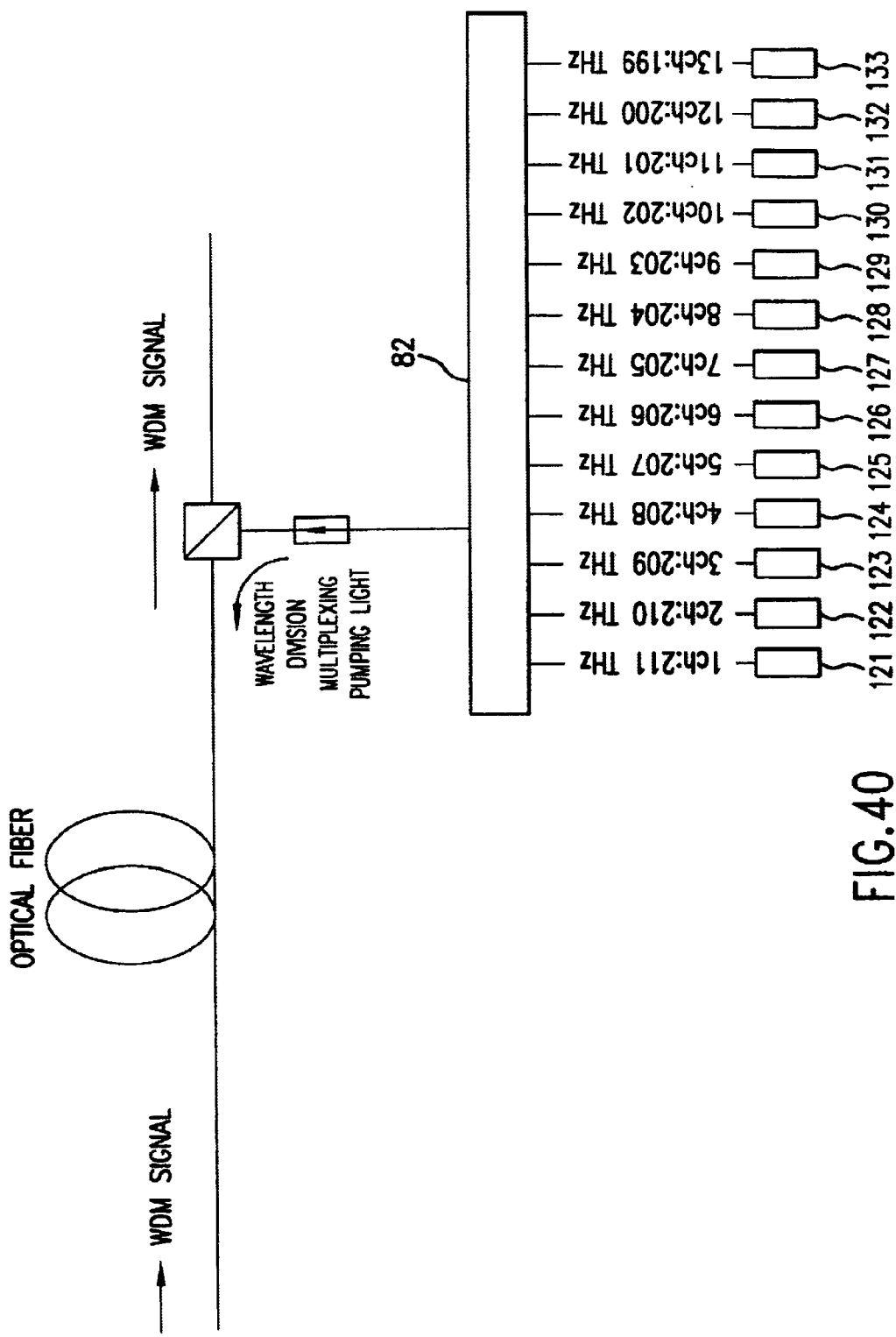
FIG. 40 is a schematic for explaining another Raman amplification example according to the present invention.

FIG. 40 is a schematic illustrating still another Raman amplification example according to the present invention. In this example, the pumping device includes a set of thirteen pumps 121–133. Each of the pumps is tuned by the control unit 206 to be separated by 1 THz and the first pump 121 is tuned to have a center frequency of 211 THz (a wavelength of 1420.8 nm) and the thirteenth pump 133 is tuned to have a center frequency of 199 THz (a wavelength of 1506.5 nm). The eleventh and twelfth pumps 131 and 132 are not used (e.g., the control unit 206 does not apply a driving current to the pumps 131 and 132). In addition, the interval between adjacent operating pumps is tuned to be within an inclusive range of 6 nm to 35 nm, and the number of pumps tuned to operate on the shorter wavelength side is greater than the number of pumps tuned to operate on the longer wavelength side.

Figure 41:
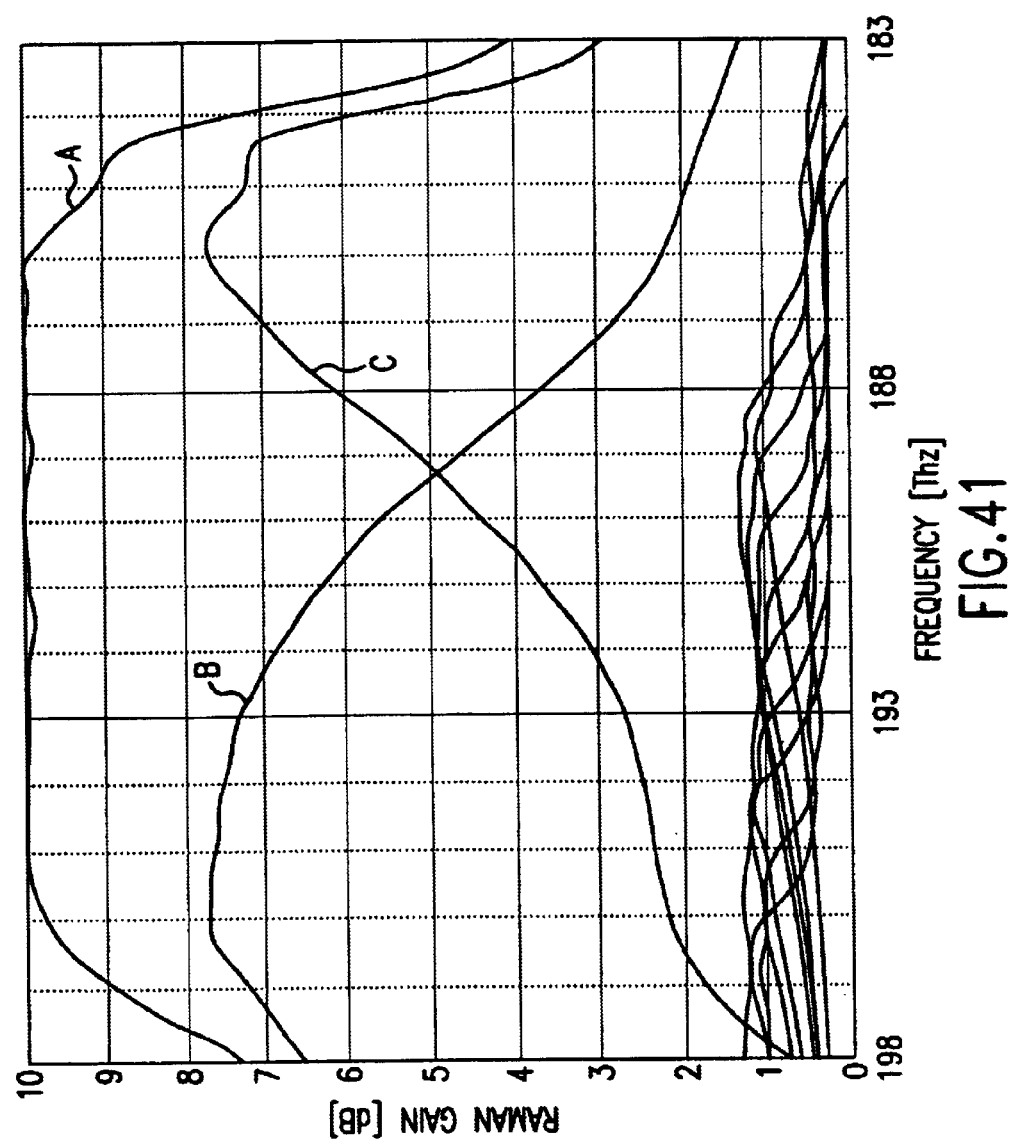
FIG. 41 is a graph illustrating amplification profiles for a pumping device including a bank of thirteen pumps.
Figure 42:
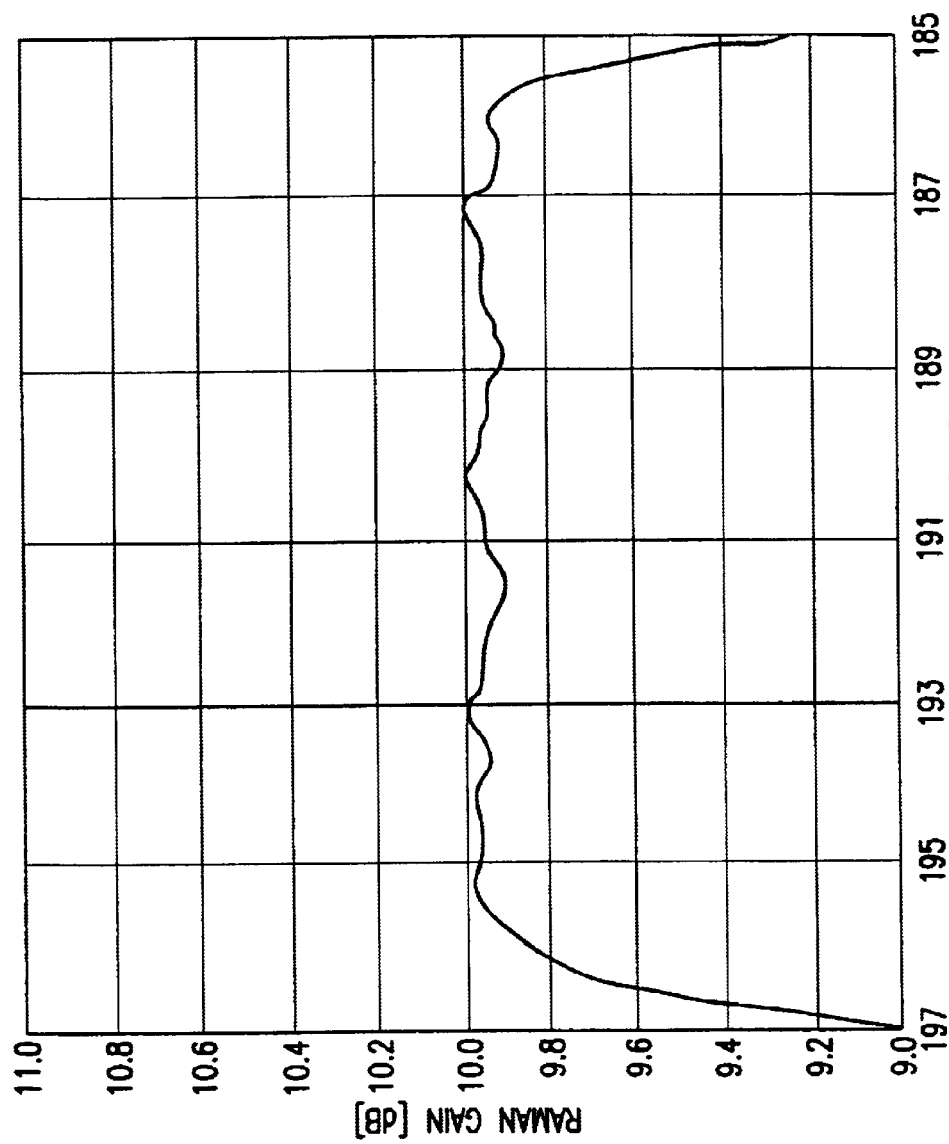
FIG. 42 is a graph illustrating an enlarged view of a total amplification profile shown in FIG. 41.

In FIG. 41, the curve "A" represents the total amplification profile, the curve "B" represents the sum of the amplification profiles due to the first to tenth pumps, and the curve "C" represents the amplification profile of the thirteenth pump. Further, the thin lines represent the individual amplification profiles of the first to tenth pumps. FIG. 42 is an enlarged view of the total amplification curve "A" in FIG. 41. As shown, the peak amplification is at 10 dB, the amplification bandwidth extends from about 196 THz (a wavelength of 1529.6 nm) to about 186 THz (a wavelength of 1611.8 nm) and the gain deviation is about 0.1 dB. Thus, by tuning additional pumps to operate toward the longer wavelength, the gain profile can be expanded. When target performance is changed from the one in FIG. 35 to 38, the pump configuration should be changed from the one in FIG. 34 to the one in FIG. 37. The change in bandwidth, as discussed with regard to the embodiments of FIGS. 28, 29, 34, 37 and 40 can be accomplished by the control unit 206 (not shown in these figures) switching spare pumps into/ out-of the pumping circuit and tuning their center frequencies accordingly. The control unit 206 may implement the change in bandwidth in response to a command message sent from, for example, the remote device controller 121, by way of the network 122.

Figure 43:
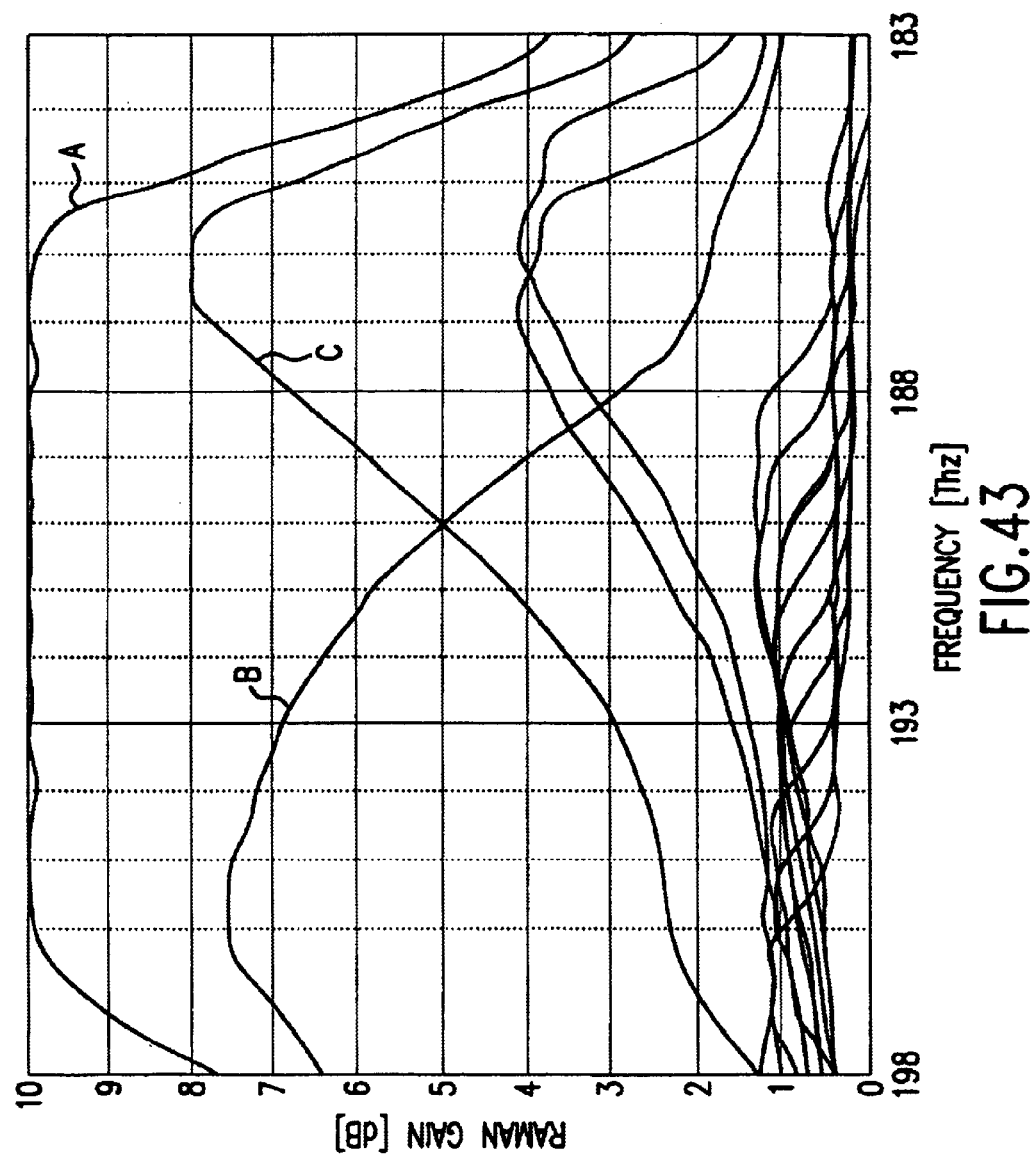
FIG. 43 is a graph illustrating amplification profiles for a variation of the pumping device in FIG. 41.

FIG. 43 illustrates amplification profiles for an example in which the pumps 130 and 131 are not used (rather than the pumps 131 and 132), as determined by the control unit 206. In addition, the interval between the adjacent operating pumps is tuned to be within an inclusive range of 6 nm to 35 nm, and the number of pumps tuned to operate on the shorter wavelength side is greater than the number of pumps tuned to operate on the longer wavelength side. In FIG. 43, the curve "A" represents the total amplification profile, the curve "B" represents the sum of amplification profiles due to the first to ninth pumps, and the curve "C" represents the sum of the amplification profiles of the twelfth and thirteenth pumps. The thin lines represent the individual amplification profiles of the operating pumps.

Figure 44:
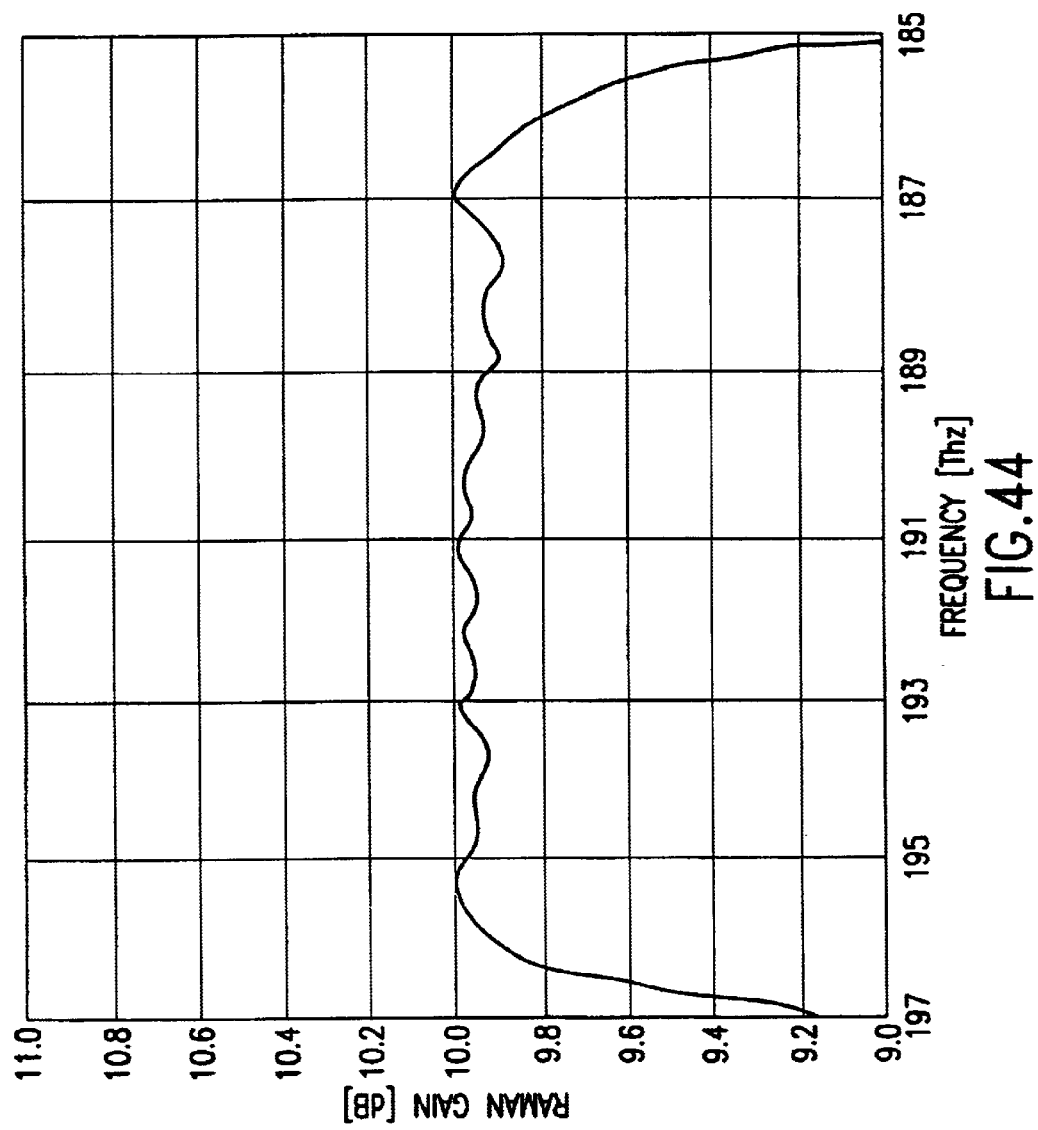
FIG. 44 is a graph illustrating an enlarged view of a total amplification profile illustrated in FIG. 43.

FIG. 44 is an enlarged view of the total amplification curve "A" in FIG. 43. As shown, the peak amplification is at 10 dB, the amplification extends from about 196 THz (a wavelength of 1529.6 nm) to about 186 THz (a wavelength of 1611.8 nm) and the amplification deviation is about 0.1 dB. Further, as evident from a comparison of the curves "C" in FIGS. 41 and 43, two pumps can be driven at a lower output value (as in FIG. 43), rather than by driving a single pump at a higher output power (as in FIG. 41).

Figure 45:
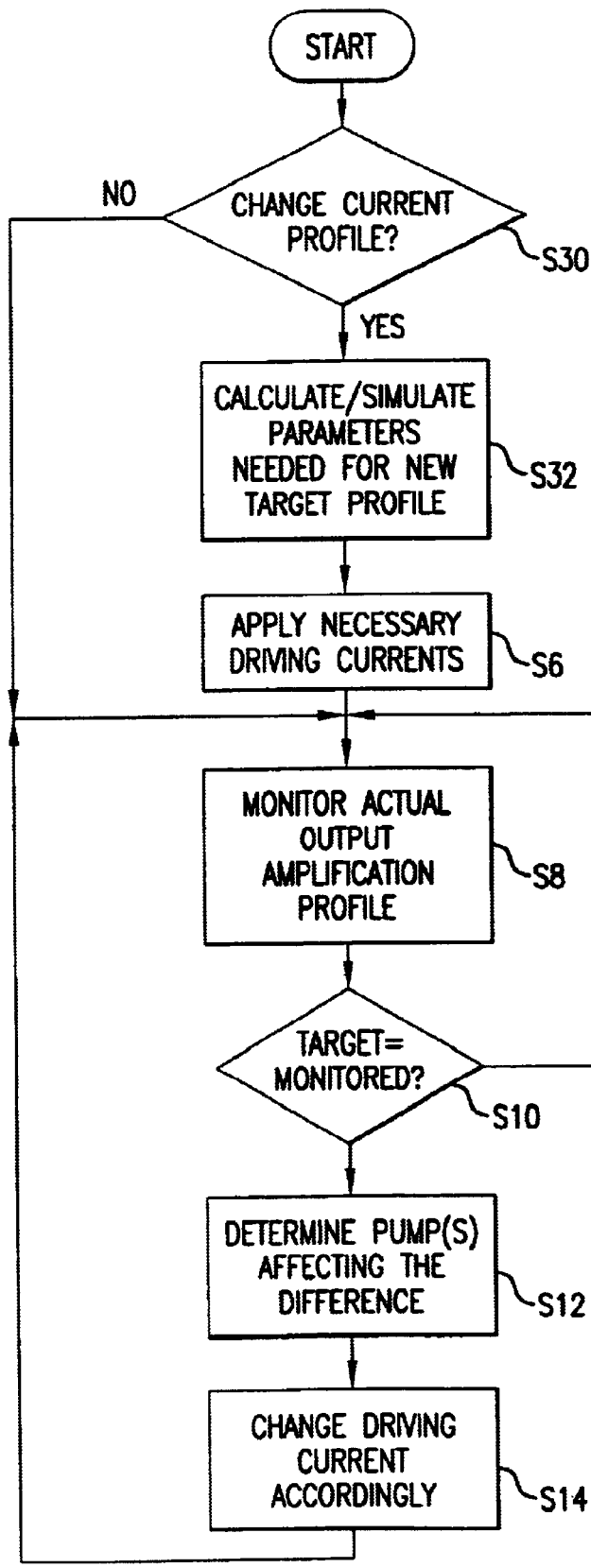
FIG. 45 is a flowchart illustrating yet another control operation according to the present invention.

FIG. 45 is a flowchart illustrating an operational procedure of the control unit 206 according to the second aspect of the present invention. Steps S6, S8, S10, S12 and S14 are the same as that described in FIG. 22, and accordingly a detailed description of these steps will be omitted. The difference between the operational procedure shown in FIG. 45 and that shown in FIG. 22 is the control unit 206 changes an existing amplification profile (step S30) to a new target amplification performance with a different amplification bandwidth. For example, an amplification bandwidth may need to be increased so as to accommodate additional channels (e.g., as the network grows in capacity). In this instance, a network engineer may instruct the control unit 206 (e.g., via the keyboard and mouse, or remotely via the remote device controller 121) to increase (or decrease) the amplification bandwidth.

The control unit 206 then determines the parameters to produce the new target profile (step S32). For example, as discussed above with reference to the total amplification profiles shown in FIGS. 31, 33, 36, 39, 42 and 44, an amplification bandwidth may be increased by tuning the pumps to increase the wavelength separation of the pump having a largest central wavelength from the pump having the next largest central wavelength. That is, the amplification bandwidth in FIG. 31 is produced by the arrangement shown in FIG. 29 (in which the pump 96 is tuned to be separated by 2 THz from the pump 95), the amplification bandwidth in FIG. 32 is produced by tuning pumps 96 and 95 so as to separate the pump 96 from the pump 95 by 2.5 THz, and the amplification bandwidth in FIG. 36 is produced by tuning pumps 108 and 105 so as to separate the pump 108 (see FIG. 35) from the pump 105 by 3 THz. Thus, the control unit 206 may dynamically change the wavelength spacings between pumps by tuning the center wavelengths of the pumps so as to change an existing amplification profile. For example, assume a pumping device includes seven pumps each tuned to be separated at a wavelength interval of 1 THz. Then, according to the second aspect of the present invention, the control unit 206 may only apply driving current to the first through fifth pumps and the seventh pump. This would result in a similar arrangement as that in shown in FIG. 29.

In another example, the control unit 206 may determine a certain pump is not operating at a required output power, and then turn on or off certain pumps to offset the failing pump. For example, with reference to FIG. 34, assume the eighth pump 108 is not properly producing a gain of 8 dB, but rather is producing a gain of 5 dB. In this instance, the control unit 206 may apply a driving current to seventh pump 107 (which was previously turned off) so the pump 107 produces a gain of 5 dB. Note this example is similar to that shown in FIG. 37, in which two adjacent pumps may be operated to produce a gain of 5 dB each, rather than one pump operating at a gain of 8 dB. That is, the fifth pump 105 may be turned off in order to operate like the pumping device shown in FIG. 37.

Thus, the control unit 206 may be configured to change an existing Raman amplification profile to have a different amplification bandwidth. This change may be initiated via an external command from a network engineer (locally or remotely) or may be requested by the control unit 206 itself. That is, as discussed above, the control unit 206 may determine a certain pump is not producing the required gain (i.e., via the monitoring capabilities of the control unit 206) and then change an existing amplification profile.

Turning now to FIG. 46, which is a schematic for illustrating an operational procedure according to the another aspect of the present invention. In more detail, FIG. 46 illustrates three cascaded Raman amplifiers 30, 32 and 34, which are remotely controlled by the remote device controller 121. In this example, the remote device controller 121 may change a total amplification profile in a first Raman amplifier to effect changes in a next Raman amplifier. For example, the remote device controller 121 may determine a pump (or pumps) in the Raman amplifier 32 is not operating. The remote device controller 121 may then increase a corresponding pump output power (or tune the center frequency) operating in the Raman amplifier 30 to offset the effect caused by the pump which does not operate in the Raman amplifier 32. Note that the remote device controller 121 may also increase a corresponding pump output power (or tune the center frequency) in the Raman amplifier 34 to offset the effect caused by the pump not operating in the Raman amplifier 32. That is, the remote device controller 121 is capable of controlling an entire operation of a plurality of cascaded Raman amplifiers such that an overall operation of the network is enhanced.

In addition, the remote device controller 121 may be connected to each of the Raman amplifiers via an Internet connection (as discussed previously). Thus, a network engineer may effectively monitor the network via the remote device controller 121. The remote device controller 121 may include a web site that is accessible from other locations as well, via an Internet Browser, such as MICROSOFT EXPLORER. In this case, the operational status of each Raman amplifier 30, 32, and 34 may be monitored continuously. Each Raman amplifier 30, 32, and 34 may include a built-in reporting mechanism that provides periodic status messages to the remote device controller 121. Alternatively, the remote device controller can download a Java, ActiveX, or other executable file to each of the Raman amplifiers 30, 32, and 34, which may then operate to collect status data for automatic report-back to the remote device controller 121. In this way, a network operator may observe the different target amplification profiles being employed in the respective Raman amplifiers 30, 32, 34 and take corrective action to help balance operations at a system level, to optimize performance at the system level.

The remote device controller 121 and respective Raman amplifiers each employ communications interfaces and processing software to enable the uploading and downloading of active content for inspection by network operators and technicians located at any of amplifiers or controller 121, but also at remote locations via the world wide web. How the world wide web operates, including communication tools such as web browsers and web pages is discussed at pages 122–166 of Gralla, P., "How The Internet Works", Que, 1999, the entire contents of which are incorporated herein by reference. Similarly, the transfer of active content between network resources in discussed in Gralla, pages 170–210, the entire contents of which are incorporated herein by reference.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, an type of disk including floppy disks, optical disks, CD-ROMs, and magneto-optical disks, ROMs, RAMs, EPROMs, EEPROMs, magnetic or optical cards, or any type of pure software inventions (e.g., word processing, accounting, Internet related, etc.) media suitable for storing electronic instructions.

Obviously, additional numerous modifications and variations of the present invention are possible in light of the above teachings. It is therefore to be understood that within the scope of the appended claims, the present invention may be practiced otherwise than as specifically described herein.

What is claimed is:

1. A tunable multimode pump source for a Raman amplifier, comprising:
    a laser module configured to emit light having multiple longitudinal modes;
    an optical fiber aligned to receive the light from the laser module;
    a tunable fiber grating coupled to said optical fiber and having a predetermined reflectance bandwidth with a center reflectance wavelength that is controllably tunable over a predetermined tuning range, said predetermined reflectance bandwidth being configured to reflect at least a portion of said light back to said laser module so as to stabilize a center light wavelength of the light and restrict a bandwidth of the light to the multiple longitudinal modes that fall within the predetermined reflectance bandwidth; and
    a tuning mechanism configured to impart a predetermined mechanical strain on said tunable fiber grating in an amount that causes said center reflectance wavelength to shift from a first wavelength within said predetermined tuning range to a second wavelength within said predetermined tuning range.

2. The tunable multimode pump source of claim 1, wherein:
    said grating is formed in said optical fiber.

3. The tunable multimode pump source of claim 2, wherein:
    said grating is a fiber Bragg grating.

4. The tunable multimode pump source of claim 1, wherein:
    said predetermined reflectance bandwidth being smaller than a lasing bandwidth of said laser module.

5. The tunable multimode pump source of claim 4, wherein:
    said predetermined reflectance bandwidth being less than or equal to 2 nm.

6. The tunable multimode pump source of claim 5, wherein:
    predetermined reflectance bandwidth being in an inclusive range of 0.5 nm to 1 nm.

7. The tunable multimode pump source of claim 1, wherein:
    the center reflectance wavelength of said tunable fiber grating is continuously tunable over said predetermined tuning range.

8. The tunable multimode pump source of claim 1, wherein:
    said predetermined tuning range is at least 60 nm.

9. The tunable multimode pump source of claim 8, wherein:
    said predetermined tuning range is at least 40 nm.

10. The tunable multimode pump source of claim 9, wherein:
    said predetermined tuning range is at least 20 nm.

11. The tunable multimode pump source of claim 10, wherein:
    said predetermined tuning range is at least 10 nm.

12. The tunable multimode pump source of claim 11, wherein:
    said predetermined tuning range is at least 2 nm.

13. The tunable multimode pump source of claim 1, wherein:
    said tuning mechanism includes
        a piezoelectric element, and
        a lever package mechanically coupled to the piezoelectric element;
    said tunable fiber grating being mechanically coupled to said lever package such that when a predetermined voltage is applied to said piezoelectric element, the lever package imparts a tensile strain on the tunable fiber grating.

14. The tunable multimode pump source of claim 13, wherein:
    said tuning mechanism includes a processor-based controller that produces said predetermined voltage which causes the center reflectance wavelength to shift from the first wavelength to said second wavelength.

15. The tunable multimode pump source of claim 1, wherein:
    said tuning mechanism includes
        a piezoelectric element, and
        a lever package mechanically coupled to the piezoelectric element; and
    said tunable fiber grating being mechanically coupled to said lever package such that when a predetermined voltage is applied to said piezoelectric element, the lever package imparts a compressive strain on the tunable fiber grating.

16. The tunable multimode pump source of claim 15, wherein:
    said tuning mechanism includes a processor-based controller that produces said predetermined voltage which causes the center reflectance wavelength to shift from the first wavelength to said second wavelength.

17. The tunable multimode pump source of claim 1, wherein:
    said tuning mechanism includes
        a movable platform to which said tunable fiber grating is mechanically coupled at one portion thereof; and
        another portion of said tunable fiber grating being mechanically coupled to another platform, such that when said movable platform is moved a predetermined distance from said another platform, a predetermined amount of strain is imparted on said tunable fiber grating.

18. The tunable multimode pump source of claim 17, wherein:
    when the movable platform is moved in one direction a predetermined compressive strain is placed on said tunable fiber grating; and when the movable platform is moved in another direction a predetermined tensile strain is placed on said tunable fiber grating.

19. The tunable multimode pump source of claim 17, wherein:
said tuning mechanism includes an electro-mechanical device that converts a control signal into a mechanical force that moves said movable platform by the predetermined distance.

20. The tunable multimode pump source of claim 1, wherein:
said tuning mechanism includes a heating mechanism configured to change a temperature of said tunable fiber grating by a predetermined amount so as to shift said center reflectance wavelength from said first wavelength to said second wavelength.

21. The tunable multimode pump source of claim 1, further comprising:
a semiconductor optical amplifier disposed between the tunable fiber grating and another fiber grating, wherein
the tunable fiber grating and the another fiber grating are sampled fiber gratings.

22. A tunable Raman amplifier for amplifying a WDM optical signal in an amplification medium, comprising:
a tunable multimode pump source that includes
a laser module configured to emit light having multiple longitudinal modes,
an optical fiber aligned to receive the light from the laser module, and
a tunable fiber grating coupled to said optical fiber and having a predetermined reflectance bandwidth with a center reflectance wavelength that is controllably tunable over a predetermined tuning range, said predetermined reflectance bandwidth being configured to reflect at least a portion of said light back to said laser module so as to stabilize a center light wavelength of the light and restrict a bandwidth of the light to the multiple longitudinal modes that fall within the predetermined reflectance bandwidth;
an optical coupler configured to optically interconnect the tunable multimode pump source with the amplification medium so as to apply thereto the light with the multiple longitudinal modes that fall within the predetermined reflectance bandwidth; and
a tuning mechanism configured to controllably alter a reflectance characteristic of said tunable fiber grating and change said center reflectance wavelength from a first wavelength to a second wavelength within the predetermined tuning range, wherein said tuning mechanism is configured to impart a predetermined mechanical strain on said tunable fiber grating in an amount that causes said center reflectance wavelength to shift from a first wavelength within said predetermined tuning range to a second wavelength within said predetermined tuning range.

23. The Raman amplifier according to claim 22, further comprising:
a controller having
a memory configured to hold computer-readable instructions; and
a processor configured to execute said computer-readable instructions and generate a control signal for application to said tuning mechanism so as to change the center reflectance wavelength from the first wavelength to the second wavelength.

24. The Raman amplifier according to claim 23, wherein:
said controller having an interface configured to receive a control instruction from an external device to change an amplification bandwidth of the Raman amplifier;
said processor being configured to form the control signal in response to said control instruction so as to cause the tuning mechanism to change the center reflectance wavelength by a predetermined amount so as to change the amplification bandwidth to correspond with that specified in the control instruction from the external device.

25. The Raman amplifier according to claim 22, further comprising:
a tap coupler configured to provide to the processor a sampled WDM output signal from the Raman amplifier, wherein
the processor is configured to determine from said sampled WDM output signal when the center reflectance wavelength is not within a predetermined tolerance of at least one of said first wavelength and said second wavelength and form the control signal to reset the center reflectance wavelength to said at least one of said first wavelength and said second wavelength.

26. The Raman amplifier according to claim 22, further comprising:
a tap coupler configured to provide to the processor a sampled WDM output signal from the Raman amplifier, wherein
the processor is configured to determine from said sampled WDM output signal when a four wave mixing product is present in a signal bandwidth of the WDM optical signal, and
when the four wave mixing product is present to prepare the control signal to adjust the center reflectance wavelength so as to remove the four wave mixing product from the signal bandwidth of the WDM optical signal.

27. The Raman amplifier according to claim 22, further comprising:
another laser module configured to emit mulitmode light at the second wavelength, wherein
said processor is configured to prepare said control signal with an indication to change the center reflectance wavelength to said second wavelength in response to receiving an indication that said another laser module has failed.

28. The Raman amplifier according to claim 22, further comprising:
another tunable multimode pump source, wherein
said controller is configured to prepare a second control signal so as to control an optical output power of at least one of said tunable multimode pump source and the another tunable multimode pump source so as to adjustably control a predetermined gain profile of said Raman amplifier over a predetermined amplification bandwidth.

29. The Raman amplifier according to claim 28, wherein:
said predetermined gain profile has not more than 1 dB ripple throughout a signal bandwidth of said WDM optical signal.

30. The Raman amplifier of claim 28, wherein:
said processor is configured to identify said second wavelength and a level of said optical output power so as to produce said predetermined gain profile by way of said at least one of simulation and a table lookup procedure.

31. The Raman amplifier of claim 24, wherein:

said interface being configured to connect to the Internet for receiving information from at least one of the remote computer and an adjacent Raman amplifier connected to said Raman amplifier by way of the amplification medium.

32. The Raman amplifier of claim 31, wherein:

said computer readable instructions include at least one of Java and ActiveX instructions received via the Internet.

33. The Raman amplifier of claim 24, wherein:

said processor is configured to receive via said interface an operational condition regarding an operational status of an adjacent Raman amplifier so as to cause said processor to identify another wavelength to tune the tunable fiber grating so as to offset a change in an amplification performance of said adjacent Raman amplifier.

34. The Raman amplifier of claim 32, further comprising:

another laser module optically coupled to said tunable fiber grating and configured to emit light having multiple longitudinal modes in another wavelength band than that produced by said laser module, wherein
  the light from the other laser module is reflected by said tunable fiber grating when the center reflectance wavelength is tuned outside of a lasing bandwidth of said laser module.

35. The Raman amplifier of claim 34, wherein:

said processor is configured to select light from at least one of said laser module and said another laser module to be applied to said tunable fiber grating.

36. The Raman amplifier of claim 34, further comprising:

a controllable switch that is configured to selectably switch light from at least one of said laser module and said another laser module to be applied to said tunable fiber grating.

37. The Raman amplifier of claim 22, wherein:

said grating is a Bragg grating formed in said optical fiber.

38. The Raman amplifier of claim 22, wherein:

the tuning mechanism is configured to continuously tune the center reflectance wavelength of said tunable fiber grating over said predetermined tuning range.

39. The Raman amplifier of claim 22, wherein:

said predetermined tuning range is at least 60 nm.

40. The Raman amplifier of claim 39, wherein:

said predetermined tuning range is at least 40 nm.

41. The Raman amplifier of claim 40, wherein:

said predetermined tuning range is at least 20 nm.

42. The Raman amplifier of claim 41, wherein:

said predetermined tuning range is at least 10 nm.

43. The Raman amplifier of claim 42, wherein:

said predetermined tuning range is at least 2 nm.

44. The Raman amplifier of claim 23, wherein said tuning mechanism includes
  a piezoelectric element, and
  a lever package mechanically coupled to the piezoelectric element; and
said tunable fiber grating being mechanically coupled to said lever package such that when a predetermined voltage is applied to said piezoelectric element, the lever package imparts a tensile strain on the tunable fiber grating, which causes the center reflectance wavelength to shift from the first wavelength to said second wavelength.

45. The Raman amplifier of claim 23, wherein said tuning mechanism includes
  a piezoelectric element, and
  a lever package mechanically coupled to the piezoelectric element; and
said tunable fiber grating being mechanically coupled to said lever package such that when a predetermined voltage is applied to said piezoelectric element, the lever package imparts a compressive strain on the tunable fiber grating.

46. The Raman amplifier of claim 45, wherein said tuning mechanism includes a processor-based controller that produces said predetermined voltage which causes the center reflectance wavelength to shift from the first wavelength to said second wavelength.

47. The Raman amplifier of claim 23, wherein said tuning mechanism includes
  a movable platform to which said tunable fiber grating is mechanically coupled at one portion thereof, and
another portion of said tunable fiber grating being mechanically coupled to another platform, such that when said movable platform is moved a predetermined distance from said another platform, a predetermined amount of strain is imparted on said tunable fiber grating.

48. The Raman amplifier of claim 47, wherein:

when the movable platform is moved in one direction a predetermined compressive strain is placed on said tunable fiber grating; and when the movable platform is moved in another direction a predetermined tensile strain is placed on said tunable fiber grating.

49. The Raman amplifier of claim 47, wherein:

said tuning mechanism includes an electro-mechanical device that converts a control signal into a mechanical force that moves said movable platform by the predetermined distance.

50. The Raman amplifier of claim 23, wherein:

said tuning mechanism includes a heating mechanism configured to change a temperature of said tunable fiber grating by a predetermined amount so as to shift said center reflectance wavelength from said first wavelength to said second wavelength.

51. The Raman amplifier of claim 22, further comprising:

a semiconductor optical amplifier disposed between the tunable fiber grating and another fiber grating, wherein the tunable fiber grating and the another fiber grating are sampled fiber gratings.

52. A reconfigurable Raman amplifier for amplifying a WDM optical signal in an amplification medium, comprising:

a plurality of tunable multimode pump sources that each include
  a laser module configured to emit light having multiple longitudinal modes,
  an optical fiber aligned to receive the light from the laser module, and
  a tunable fiber grating coupled to said optical fiber and having a predetermined reflectance bandwidth with a center reflectance wavelength that is controllably tunable over a predetermined tuning range, said predetermined reflectance bandwidth being configured to reflect at least a portion of said light back to said laser module so as to stabilize a center light wavelength of the light and restrict a bandwidth of the light to the multiple longitudinal modes that fall within the predetermined reflectance bandwidth;

an optical coupler configured to apply the light from the plurality of tunable multimode pump sources to the amplification medium;

a memory configured to hold therein predetermined center wavelength values that describe different center reflectance wavelengths for said plurality of tunable multimode pump sources to produce a predetermined gain profile in said amplification medium; and a tuning mechanism configured to receive a control signal for said tuning mechanism to tune said plurality of tunable multimode pump sources to said different center reflectance wavelengths so as to implement said predetermined gain profile in said amplification medium.

53. The reconfigurable Raman amplifier of claim 52, wherein:

each of said plurality of tunable multimode pump sources being configured as a generic tunable multimode pump source that can be tuned to any of said different center reflectance wavelengths.

54. The reconfigurable Raman amplifier of claim 53, wherein:

the tuning mechanism is configured to initially tune the plurality of tunable multimode pump sources to said different center reflectance wavelengths once said Raman amplifier is installed for use in an operational environment.

55. A method for adjusting an amplification profile of a Raman amplifier having a multimode pump source coupled to a tunable fiber grating, comprising steps of:

receiving at a tuning mechanism an amplification profile requirement;

retrieving from memory a parameter associated with tuning said tunable fiber grating to a predetermined center reflectance wavelength associated with achieving said amplification profile requirement; and applying a tuning signal to said tuning mechanism so as to change a center reflectance wavelength of said tunable fiber grating to said predetermined center reflectance wavelength.

56. The method of claim 55, further comprising steps of:

comparing said amplification profile requirement to an amplification profile exhibited by said Raman amplifier; and applying said tuning signal to said tuning mechanism when it is determined in said comparing step that said amplification profile exhibited by said Raman amplifier is within a predetermined tolerance of said amplification profile requirement.

57. The method of claim 55, further comprising a step of:

adjusting an optical output power of said multimode pump source so as to achieve said amplification gain profile requirement.

58. A controller for adjusting an amplification profile of a Raman amplifier having a multimode pump source optically coupled to a tunable fiber grating, comprising:

means for receiving an amplification profile requirement from at least one of a remote source and a memory;

means for retrieving from memory a parameter associated with tuning a tunable fiber grating to a predetermined center reflectance wavelength associated with achieving said amplification gain profile requirement; and means for applying a tuning signal to a tuning mechanism and tuning said tunable fiber grating so as to change a center reflectance wavelength thereof to said predetermined center reflectance wavelength.

59. The controller of claim 58, further comprising:

means for comparing said amplification profile requirement to an amplification profile exhibited by said tunable Raman amplifier; and means for applying said tuning signal to said tuning mechanism when it is determined by said means for comparing that said amplification profile exhibited by said Raman amplifier is within a predetermined tolerance of said amplification profile requirement.

60. The controller of claim 58, further comprising:

means for adjusting an optical output power of said multimode pump source so as to achieve said amplification gain profile requirement.

61. An optical communication system comprising:

a first Raman amplifier;

a second Raman amplifier;

a controller that is configured to monitor an amplification profile of said first Raman amplifier and send a control signal to said second Raman amplifier so as to instruct said second Raman amplifier to alter a shape of an adjustable amplification profile thereof so as to compensate for a detected imperfection in said amplification profile of said first Raman amplifier; and an optical fiber configured to transport a WDM optical signal therethrough, said first Raman amplifier being configured to optically amplify said WDM optical signal with the first predetermined amplification profile, wherein said second Raman amplifier being configured to optically amplify said WDM optical signal with the adjustable amplification profile, said second Raman amplifier including
a tunable multimode pump source having
a laser module configured to emit light having multiple longitudinal modes,
another optical fiber aligned to receive the light from the laser module, and
a tunable fiber grating coupled to said optical fiber and having a predetermined reflectance bandwidth with a center reflectance wavelength that is controllably tunable over a predetermined tuning range, said predetermined reflectance bandwidth being configured to reflect at least a portion of said light back to said laser module so as to stabilize a center light wavelength of the light and restrict a bandwidth of the light to the multiple longitudinal modes that fall within the predetermined reflectance bandwidth.

* * * * *